US009913142B2

(12) United States Patent
Folse et al.

(10) Patent No.: US 9,913,142 B2
(45) Date of Patent: Mar. 6, 2018

(54) DEVICE-LEVEL AUTHORIZATION FOR VIEWING CONTENT

(71) Applicant: Apple Inc., Cupertino, CA (US)

(72) Inventors: Jennifer L. C. Folse, San Francisco, CA (US); Jonathan Lochhead, Scotts Valley, CA (US); Florian Gruenke, San Francisco, CA (US); William M. Bachman, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/272,397

(22) Filed: Sep. 21, 2016

(65) Prior Publication Data
US 2017/0359722 A1   Dec. 14, 2017

Related U.S. Application Data

(60) Provisional application No. 62/348,978, filed on Jun. 12, 2016.

(51) Int. Cl.
*H04L 29/06* (2006.01)
*H04W 12/06* (2009.01)
*G06F 3/0484* (2013.01)
*G06F 3/0482* (2013.01)

(52) U.S. Cl.
CPC ........... *H04W 12/06* (2013.01); *H04L 63/083* (2013.01); *H04L 63/101* (2013.01); *G06F 3/0482* (2013.01); *G06F 3/0484* (2013.01)

(58) Field of Classification Search
CPC ......... G06F 21/6218; G06F 2221/2141; G06F 21/629
See application file for complete search history.

(56) References Cited

U.S. PATENT DOCUMENTS

| 5,483,261 | A  | 1/1996  | Yasutake        |
|-----------|----|---------|-----------------|
| 5,488,204 | A  | 1/1996  | Mead et al.     |
| 5,825,352 | A  | 10/1998 | Bisset et al.   |
| 5,835,079 | A  | 11/1998 | Shieh           |
| 5,880,411 | A  | 3/1999  | Gillespie et al.|
| 6,188,391 | B1 | 2/2001  | Seely et al.    |
| 6,310,610 | B1 | 10/2001 | Beaton et al.   |

(Continued)

FOREIGN PATENT DOCUMENTS

| JP | 2000-163031 A | 6/2000  |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jason K Gee
(74) *Attorney, Agent, or Firm* — Morrison and Foerster LLP

(57) ABSTRACT

In some embodiments, an electronic device organizes and selectively grants access to its authorization with a primary content provider to applications downloaded on the electronic device for viewing content from secondary content providers. In some embodiments, an electronic device prompts a user to download applications associated with a primary content provider in response to the user authorizing the electronic device with the primary content provider.

49 Claims, 72 Drawing Sheets

(56) References Cited

U.S. PATENT DOCUMENTS

| | | |
|---|---|---|
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,814,023 B1 | 10/2010 | Rao et al. |
| 8,205,240 B2 | 6/2012 | Ansari et al. |
| 8,479,122 B2 | 7/2013 | Hotelling et al. |
| 2004/0168184 A1 | 8/2004 | Steenkamp et al. |
| 2006/0080352 A1 | 4/2006 | Boubez et al. |
| 2006/0197753 A1 | 9/2006 | Hotelling |
| 2007/0186254 A1 | 8/2007 | Tsutsui et al. |
| 2009/0158325 A1 | 6/2009 | Johnson |
| 2009/0161868 A1* | 6/2009 | Chaudhry ............ H04L 9/3213 380/258 |
| 2011/0231280 A1* | 9/2011 | Farah .................... G06Q 10/10 705/26.8 |
| 2012/0198020 A1 | 8/2012 | Parker et al. |
| 2012/0324504 A1 | 12/2012 | Archer et al. |
| 2013/0097009 A1 | 4/2013 | Akadiri |
| 2014/0006635 A1 | 1/2014 | Braness et al. |
| 2014/0075574 A1* | 3/2014 | Zheng .................... G06F 21/31 726/28 |
| 2014/0224867 A1 | 8/2014 | Werner et al. |
| 2016/0066004 A1 | 3/2016 | Lieu et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Danish Search Report dated Nov. 3, 2016, for Application No. PA 2016 70581, one page.

International Search Report dated Aug. 7, 2017, for PCT Application No. PCT/US2017/31764 filed May 9, 2017, three pages.

Additional Danish Search Report dated Apr. 4, 2017, for Application No. PA 2016 70581, two pages.

* cited by examiner

700

Receive, via the one or more input devices, a sequence of one or more inputs that authorizes the electronic device with a primary content provider based on a user subscription to the primary content provider, the primary content provider having access to content from a plurality of secondary content providers that is accessible on the electronic device via a plurality of applications associated with the secondary content providers — 702

After authorizing the electronic device with the primary content provider, display, on the display, a settings user interface of the electronic device from which access to the authorization of the electronic device with the primary content provider can be granted or denied to one or more applications on the electronic device — 704

While displaying the settings user interface, receive, via the one or more input devices, a sequence of one or more inputs that grant access to the authorization of the electronic device to a first application of the plurality of applications associated with a first secondary content provider — 706

The settings user interface is not a user interface of the first application — 708

DEVICE-LEVEL AUTHORIZATION FOR VIEWING CONTENT

CROSS-REFERENCE TO RELATED APPLICATIONS

This application claims benefit of U.S. Provisional Patent Application No. 62/348,978, filed Jun. 12, 2016, which is hereby incorporated by reference it its entirety.

FIELD OF THE DISCLOSURE

This relates generally to electronic devices that allow for multi-application authorization for viewing content, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device has potential to access content (e.g., music, movies, etc.), and user interaction with such a device entails authorizing the electronic device to access the content, and thus making the content available for the user to watch. Enhancing these interactions improves the user's experience with the device and decreases user interaction time, which is particularly important where input devices are battery-operated.

SUMMARY OF THE DISCLOSURE

The embodiments described in this disclosure are directed to one or more electronic devices that allow for the authorization of the electronic device for viewing content to be shared amongst multiple applications for viewing the content, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7L are flow diagrams illustrating a method of organizing application authorization for accessing content in accordance with some embodiments of the disclosure.

DETAILED DESCRIPTION

Figure 1A:
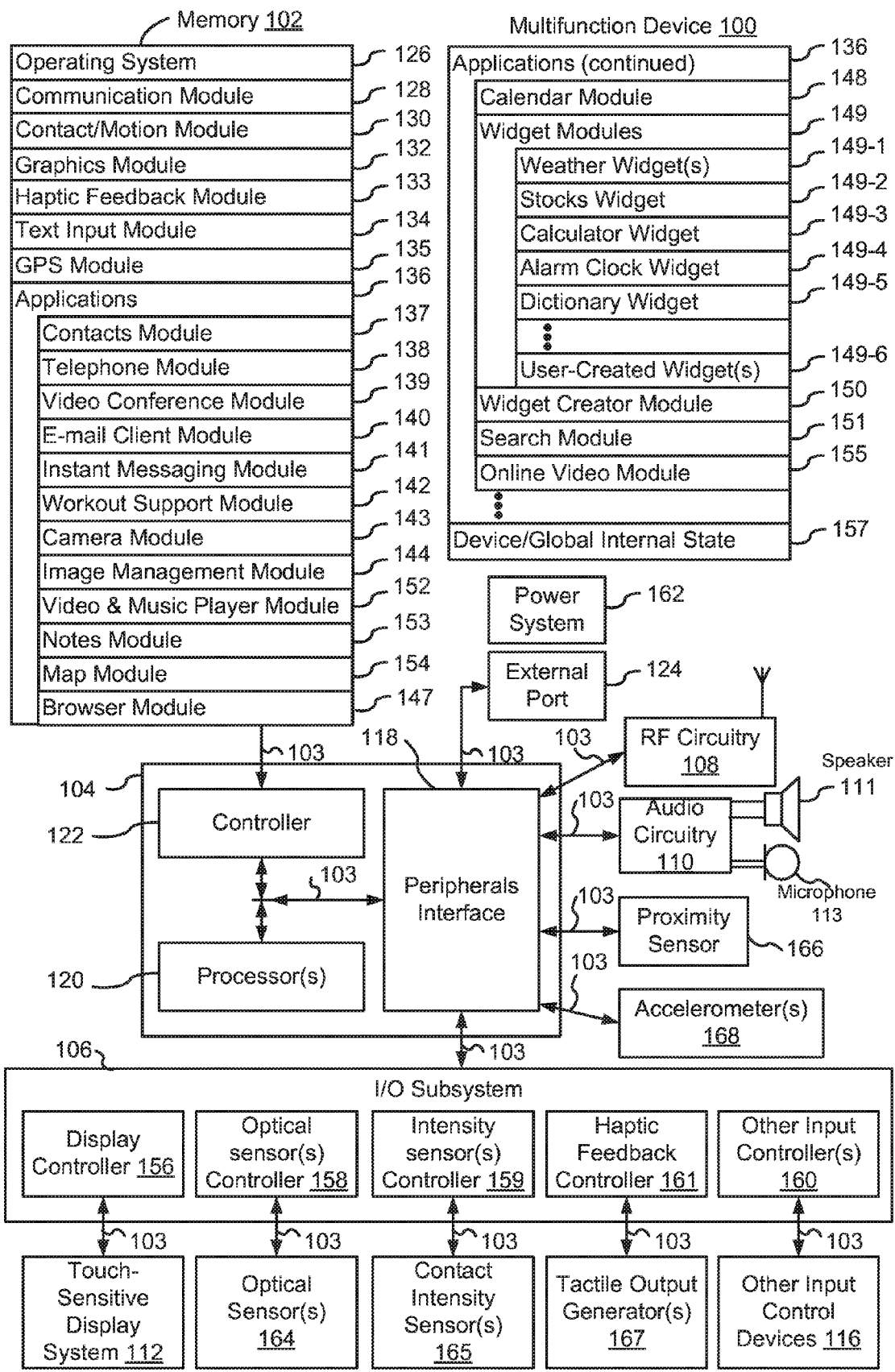
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
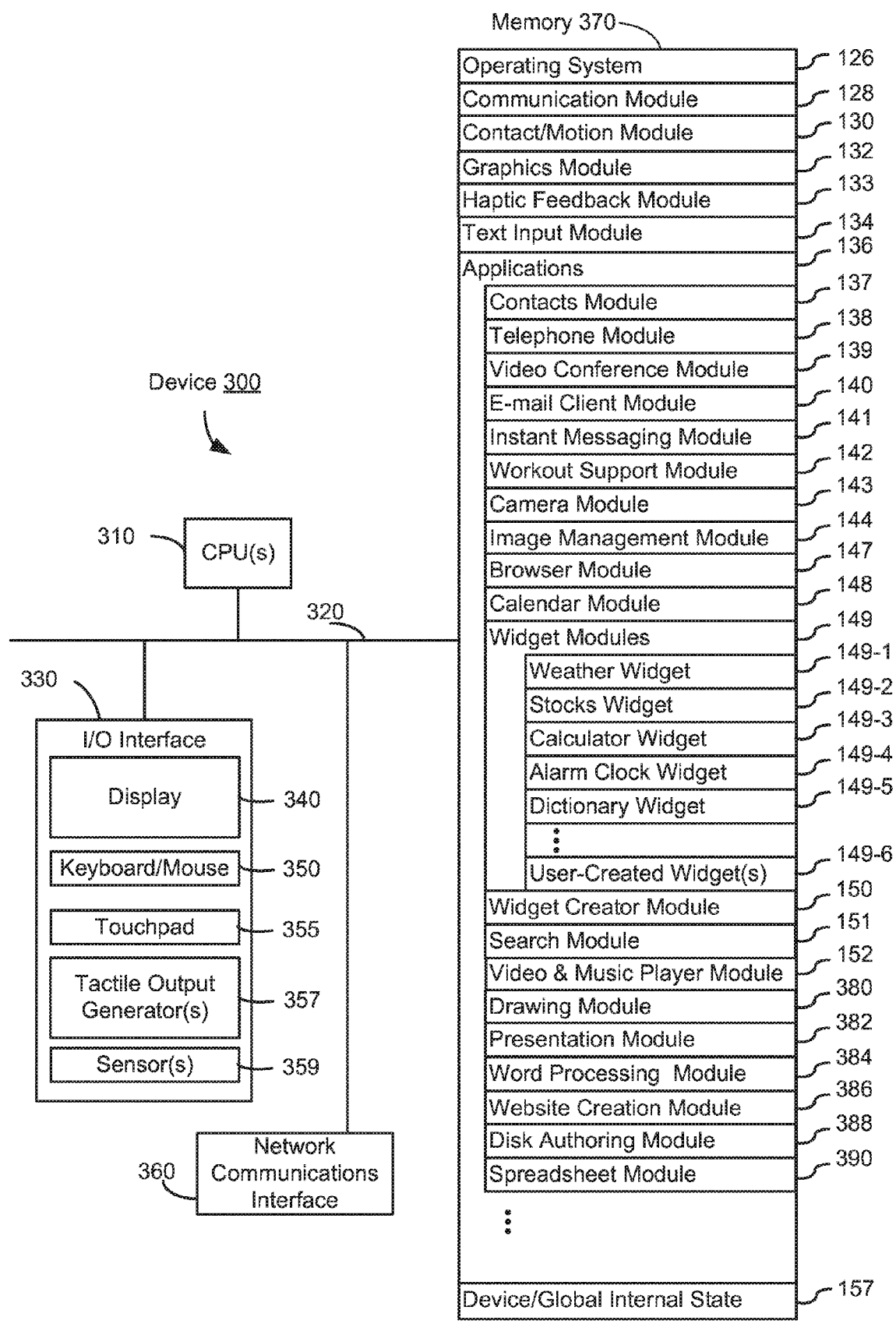
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;

video and music player module 152, which merges video player module and music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
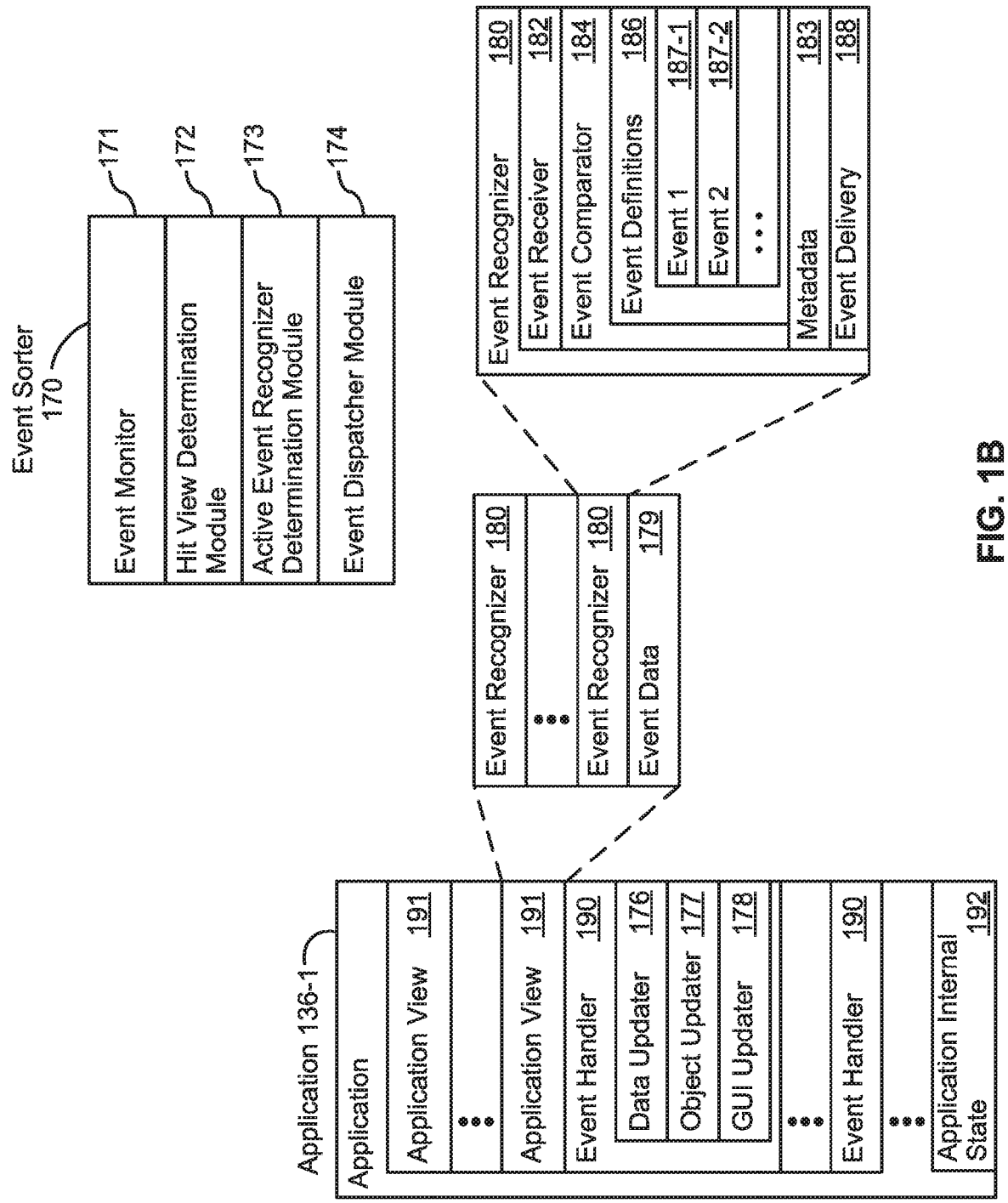
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
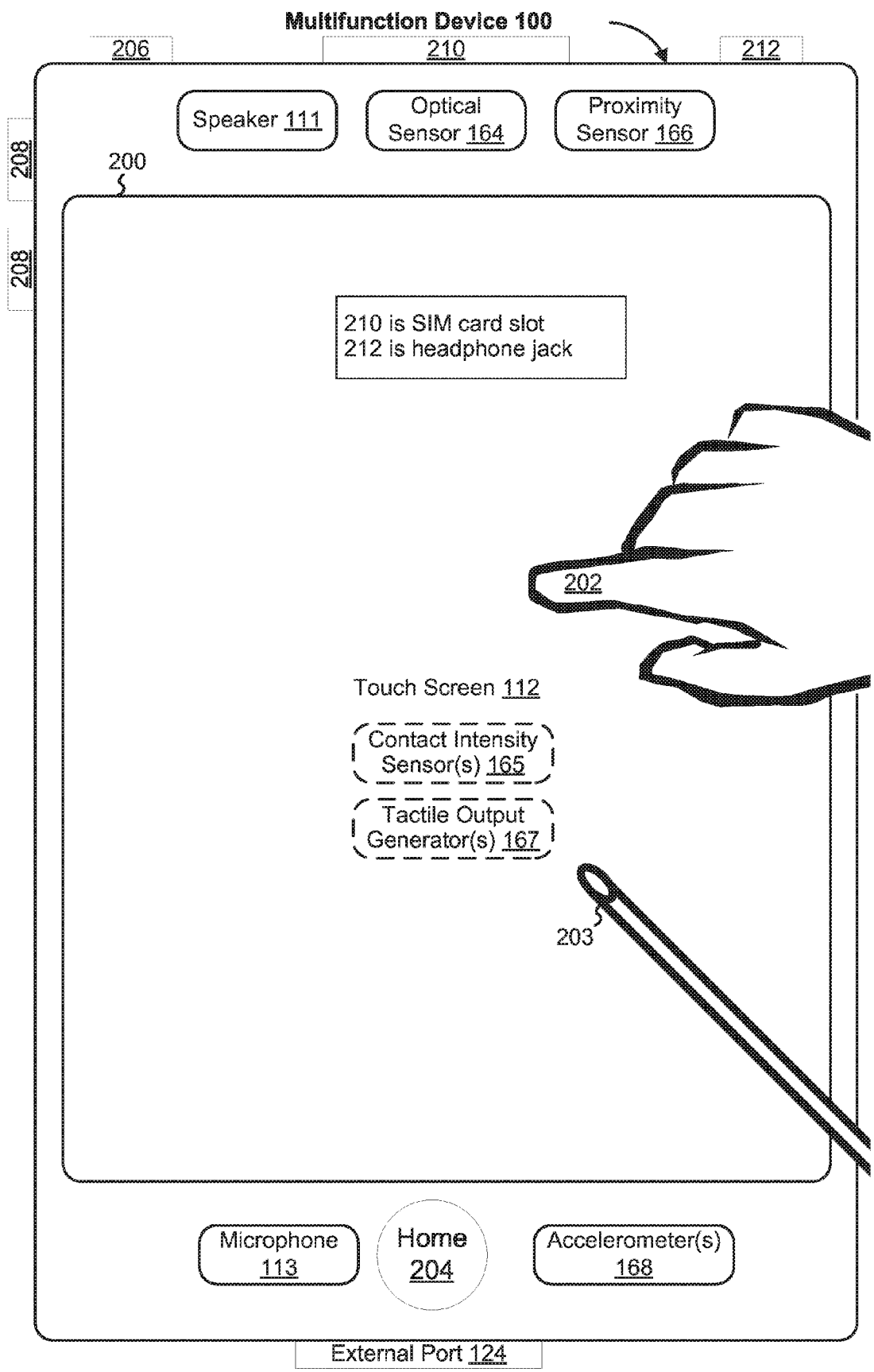
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval;

to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
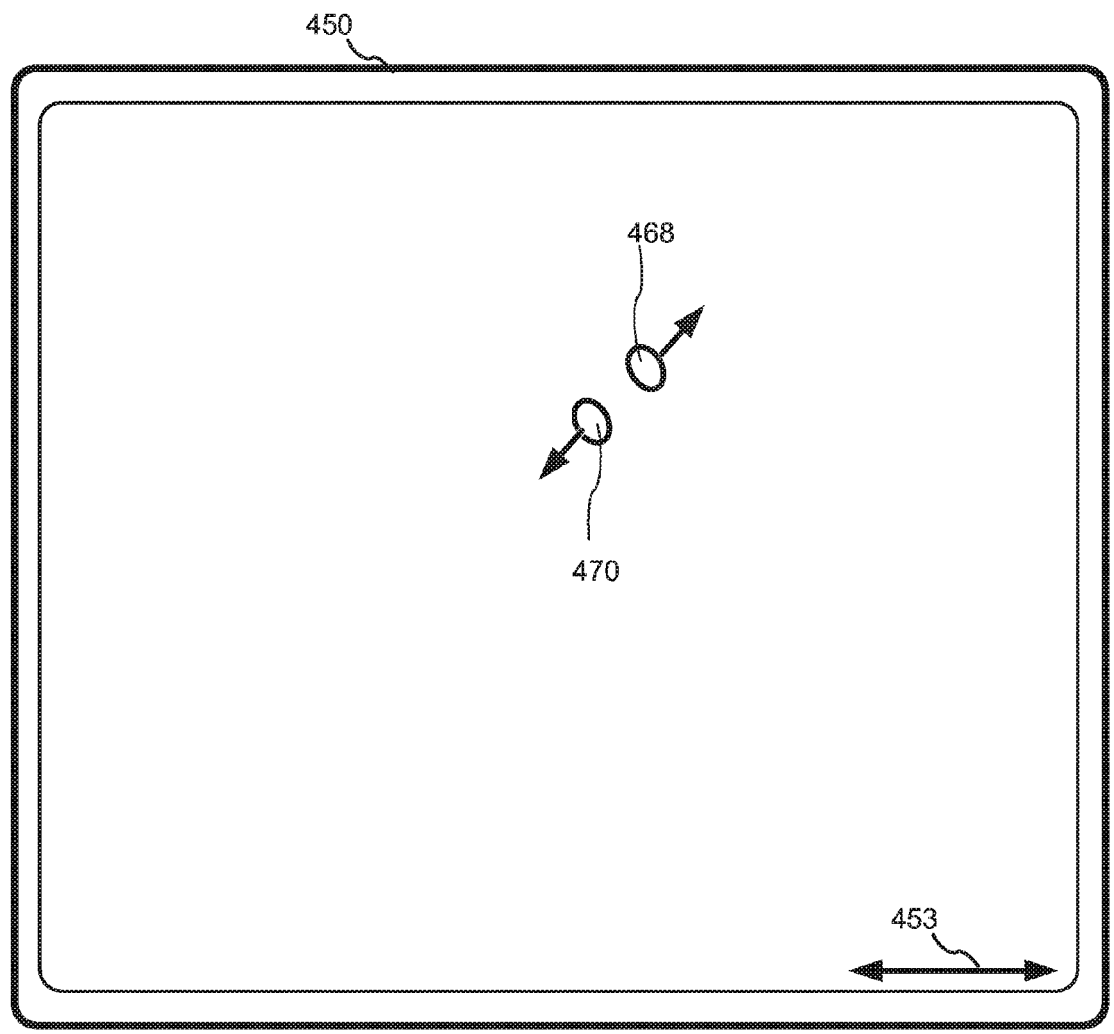
FIG. 4 illustrates an exemplary user interface for a multifunction device with a touch-sensitive surface that is separate from the display in accordance with some embodiments of the disclosure.
Figure 4:
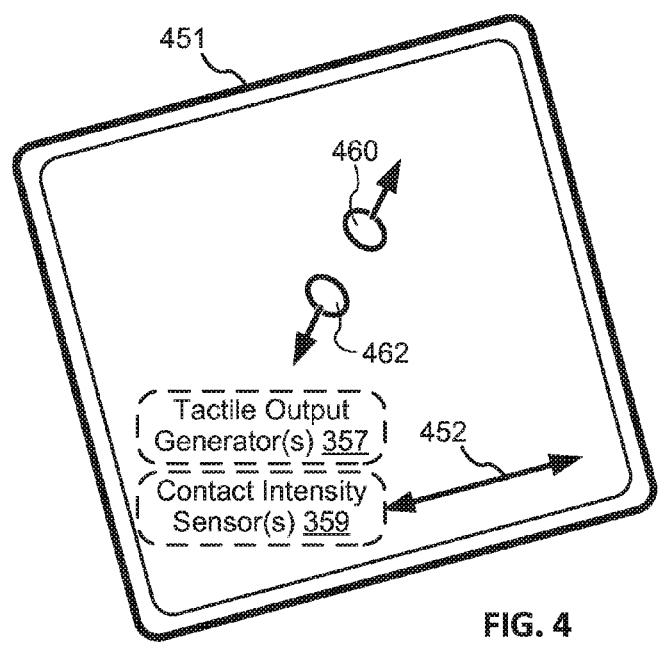

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
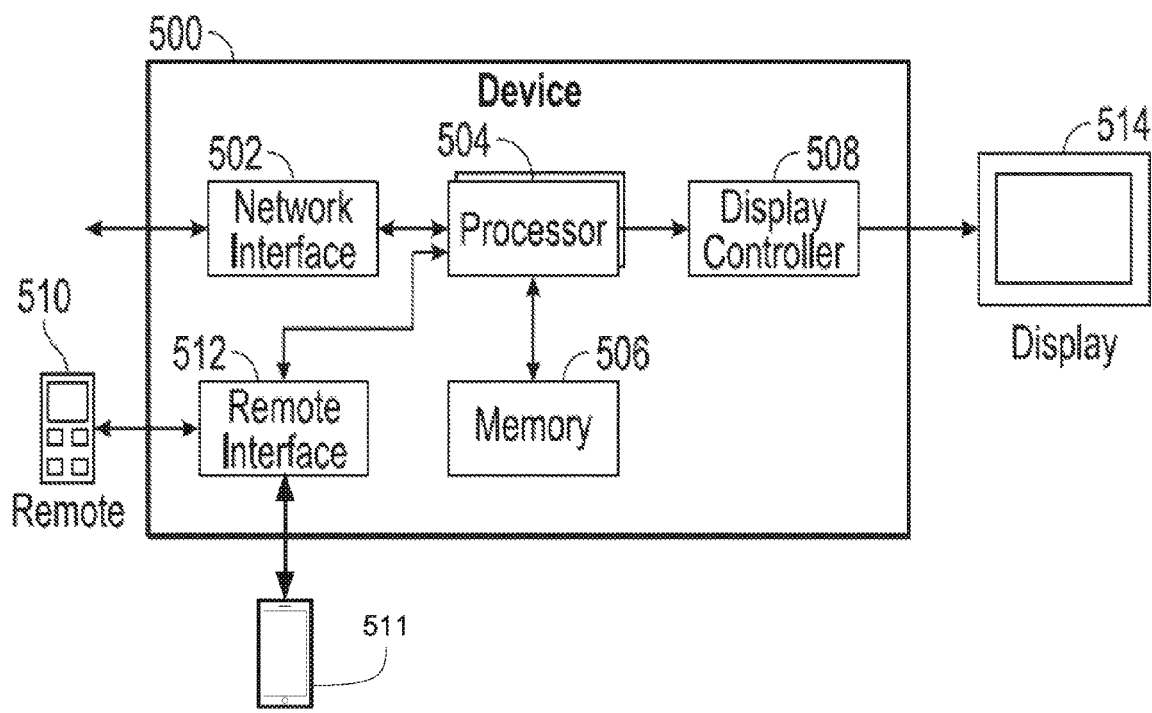
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
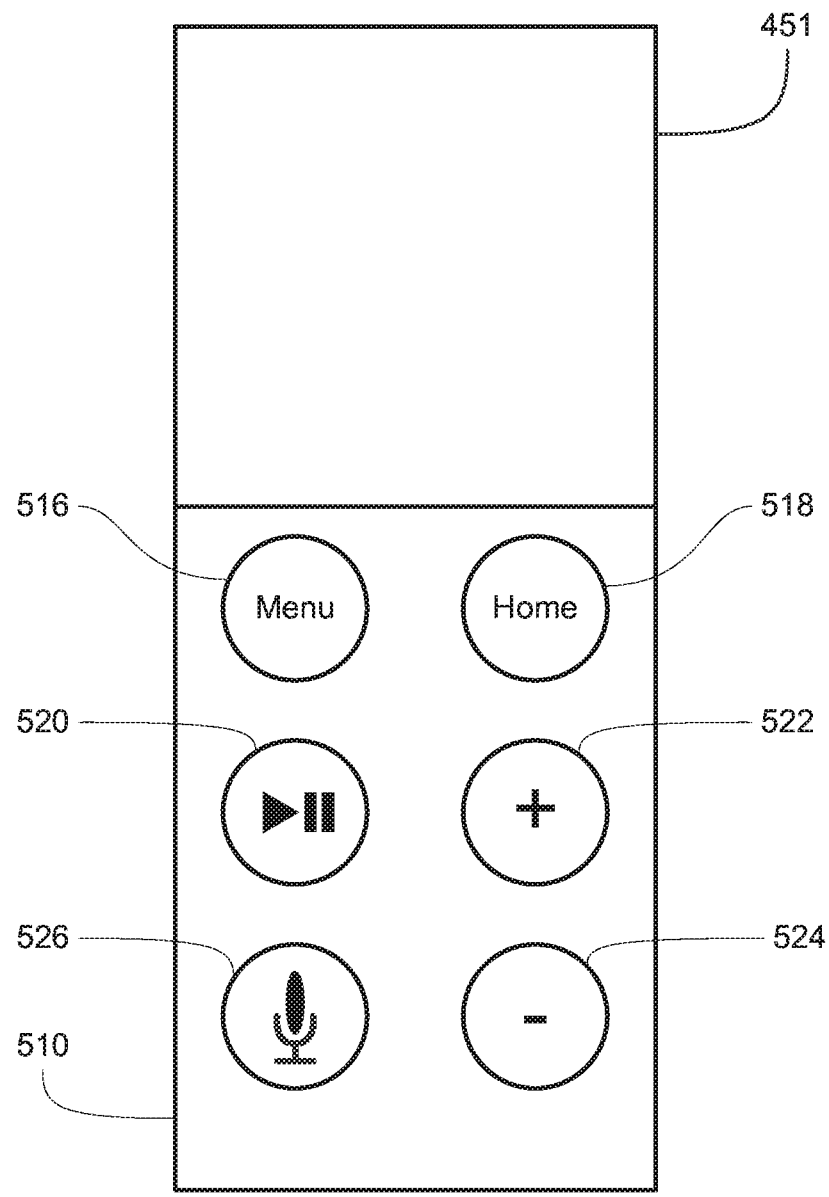

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

User Interfaces and Associated Processes

Organizing Content Access Authorization

Users interact with electronic devices in many different manners, including interacting with content (e.g., music, movies, etc.) that may be available (e.g., stored or otherwise accessible) on the electronic devices. In some circumstances, a user may authorize an electronic device to access the content, thus making the content available for the user to watch. In some embodiments, the authorization of the electronic device is optionally utilized by multiple applications on the electronic device for accessing content associated with those applications. The embodiments described below provide ways in which electronic devices organize application authorization for accessing content, thereby enhancing users' interactions with electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6HH illustrate exemplary ways in which an electronic device organizes application authorization for accessing content in accordance with some embodiments of the disclosure. The embodiments in these figures are used to illustrate the processes described below, including the processes described with reference to FIGS. 7A-7L.

It should be noted that the examples illustrated in FIGS. 6A-6HH are directed to electronic devices that display information on non-touch-sensitive displays, though it is understood that the electronic devices may instead display information on displays having touch-sensitive capability (e.g., touch screens). For example, the electronic devices may include touch screens, or the electronic devices may be capable of outputting display information for display on separate touch screens, as previously described in this disclosure—in such circumstances, the displays described below optionally correspond to the touch screens mentioned above, and the inputs described below are optionally detected on the touch screens.

In some embodiments, media (e.g., recorded sports games, recorded movies, live sports games, etc.) is available to an electronic device via one or more applications installed on the device. For example, the electronic device optionally has applications associated with HBO and ESPN downloaded on it, via which the electronic device accesses media from secondary content providers such as HBO (e.g., movies) and ESPN (e.g., sports), respectively. Such applications optionally require a user of the electronic device to have an account with a primary content provider, such as a cable or satellite provider that provides access to a bundle of content from a plurality of different secondary content providers for a fixed monthly or yearly fee, and to authorize the applications with the account with the primary content provider before allowing the electronic device to access media from those applications. In some implementations this authorization generally occurs on a per-application basis, however when each application is performing its own authorization the user may have to navigate through a large number of authorization processes (one for each app) which may all be organized slightly differently with different requirements and different steps for authorization. This process is complex and many users will give up before completing the authorization for all of the secondary content providers with media that the user is entitled to access via a subscription with the primary content provider. The examples of the disclosure are directed to authorizing an electronic device with a primary content provider such that various applications on the electronic device are able to use that authorization to provide the electronic device with access to media, without requiring separate authorization of each application with the primary content provider, to make the process of authorizing access to media from different secondary content providers more efficient, thus improving the machine-person interface.

Figure 6A:
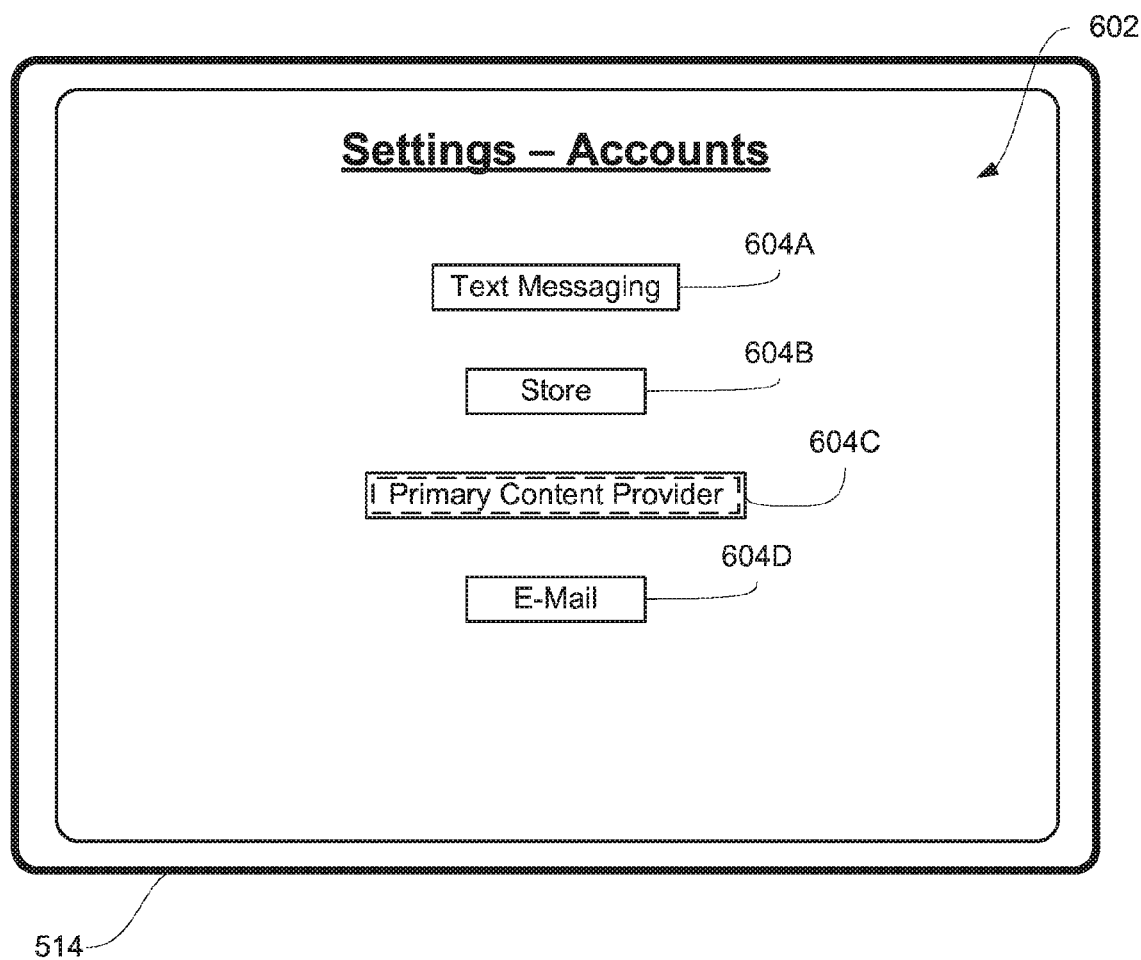
FIGS. 6A-6HH illustrate exemplary ways in which an electronic device organizes application authorization for accessing content in accordance with some embodiments of the disclosure.

FIG. 6A illustrates exemplary display 514. Display 514 optionally displays one or more user interfaces that include various content. In the example illustrated in FIG. 6A, display 514 displays settings user interface 602 of an electronic device (e.g., electronic device 500 of FIG. 5A) of which display 514 is a part, or to which display 514 is connected. Settings user interface 602 is optionally a user interface of the operating system of the electronic device, and provides the user of the electronic device the ability to control various settings of the electronic device. For example, in FIG. 6A, settings user interface 602 is displaying a part of the settings of the electronic device where various account information for use with the electronic device is controlled. These accounts include accounts for text messaging, purchases, e-mail and content or media. Accordingly, selection of button 604A allows the user to control account information for text messaging on the electronic device, selection of button 604B allows the user to control account information for purchases (e.g., from an application store) on the electronic device, selection of button 604D allows the user to control account information for e-mail services on the electronic device, and selection of button 604C allows the user to control account information for a primary content provider (e.g., a cable or satellite provider, as opposed to a secondary content provider such as HBO or ESPN from which the primary content provider has access to content) on the electronic device, for example.

Figure 6B:
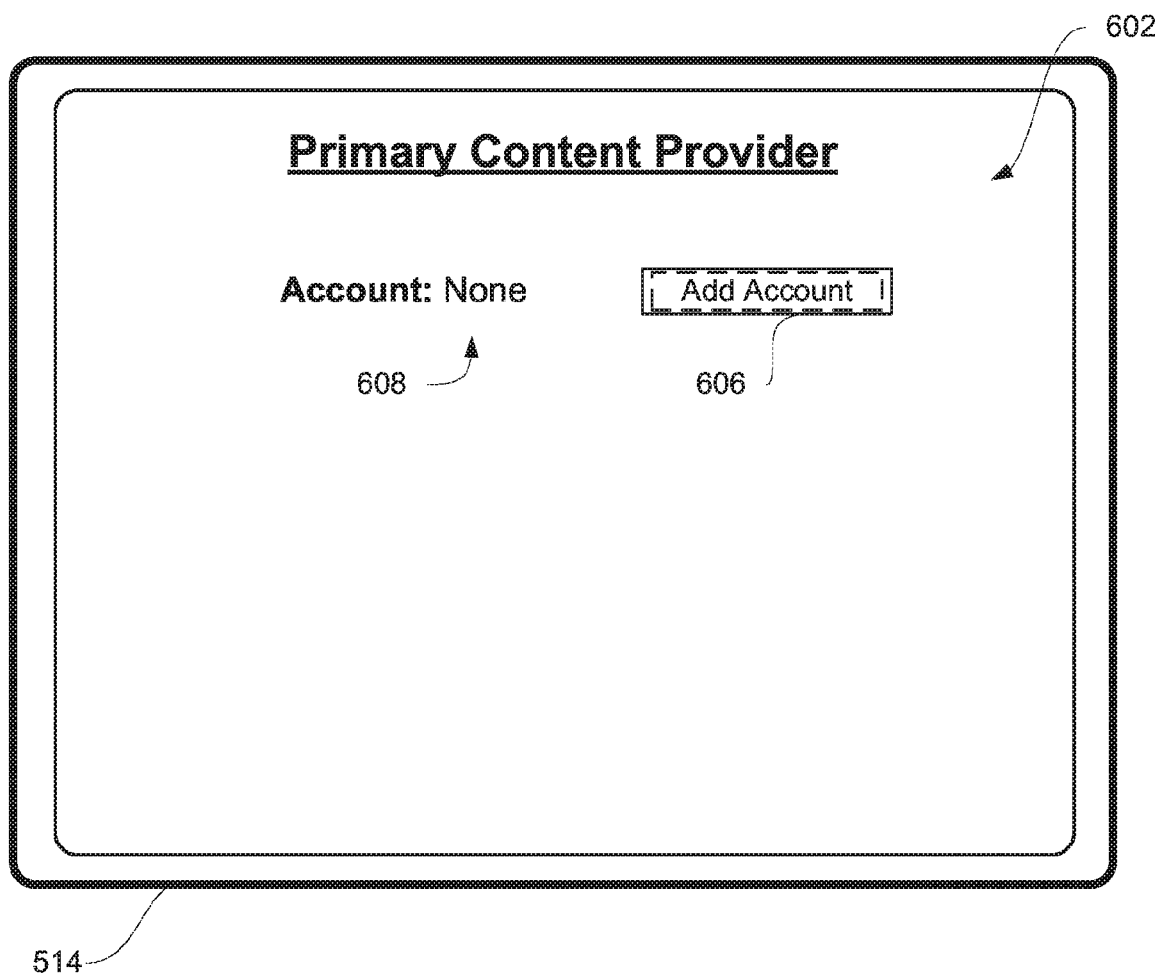

In FIG. 6A, the user has selected button 604C (e.g., using remote 510 in FIG. 5B), as shown by the dashed lines. In response to the selection of button 604C, the electronic device optionally displays settings user interface 602 for controlling the primary content provider account information on the electronic device, as shown in FIG. 6B. In FIG. 6B, the electronic device has not yet been authorized with a primary content provider, as shown at 608. The settings user interface 602 includes button 606 for adding an account with a primary content provider to the electronic device (e.g., authorizing the electronic device with a primary content provider).

Figure 6C:
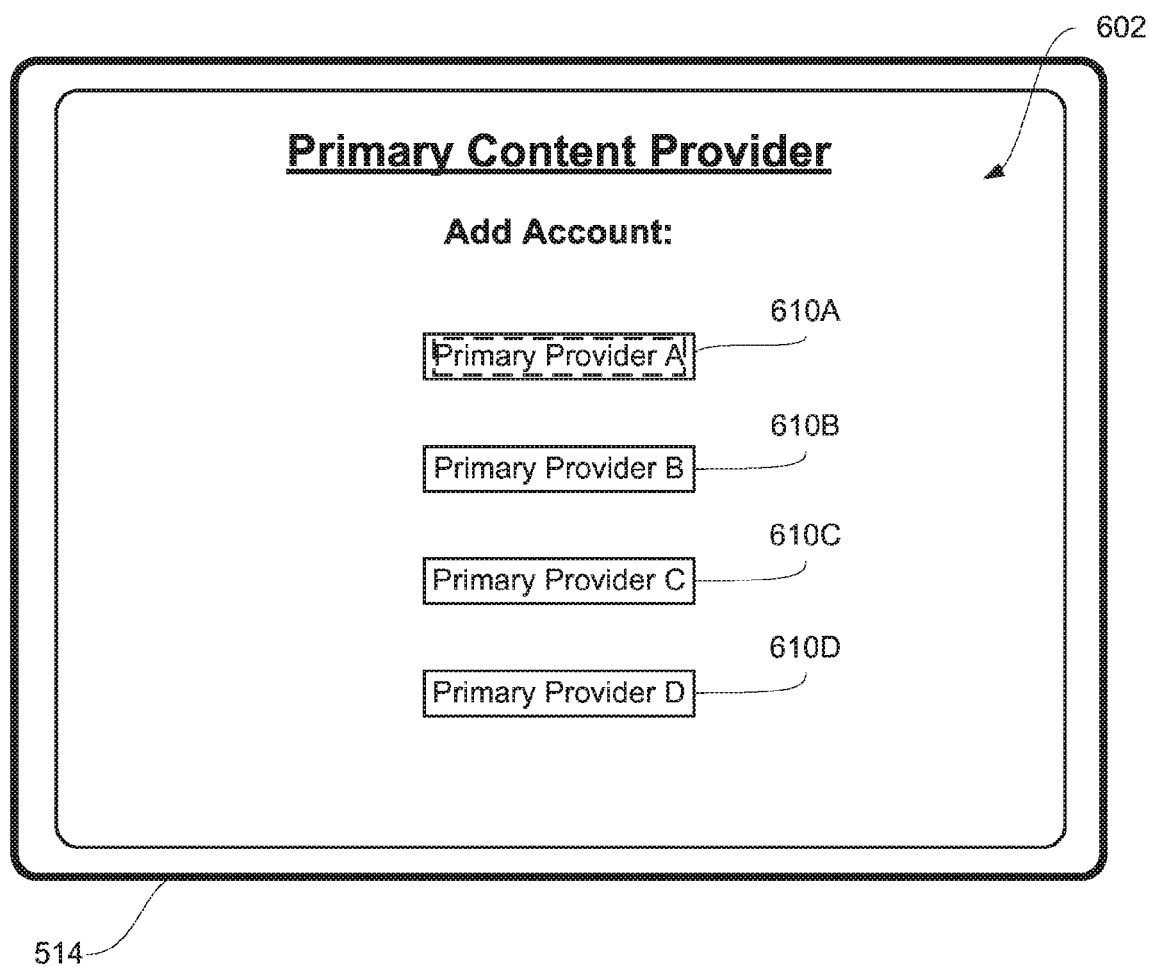

In FIG. 6B, the user has selected button 606. In response to the selection of button 606, the electronic device optionally displays settings user interface 602 for adding an account with a primary content provider to the electronic device, as shown in FIG. 6C. For example, in FIG. 6C, settings user interface 602 includes buttons 610A-610D corresponding to different primary content providers. In response to a user selection of one of buttons 610A-610D, the user optionally provides account information for the selected primary content provider to authorize the electronic device with that primary content provider.

Figure 6D:
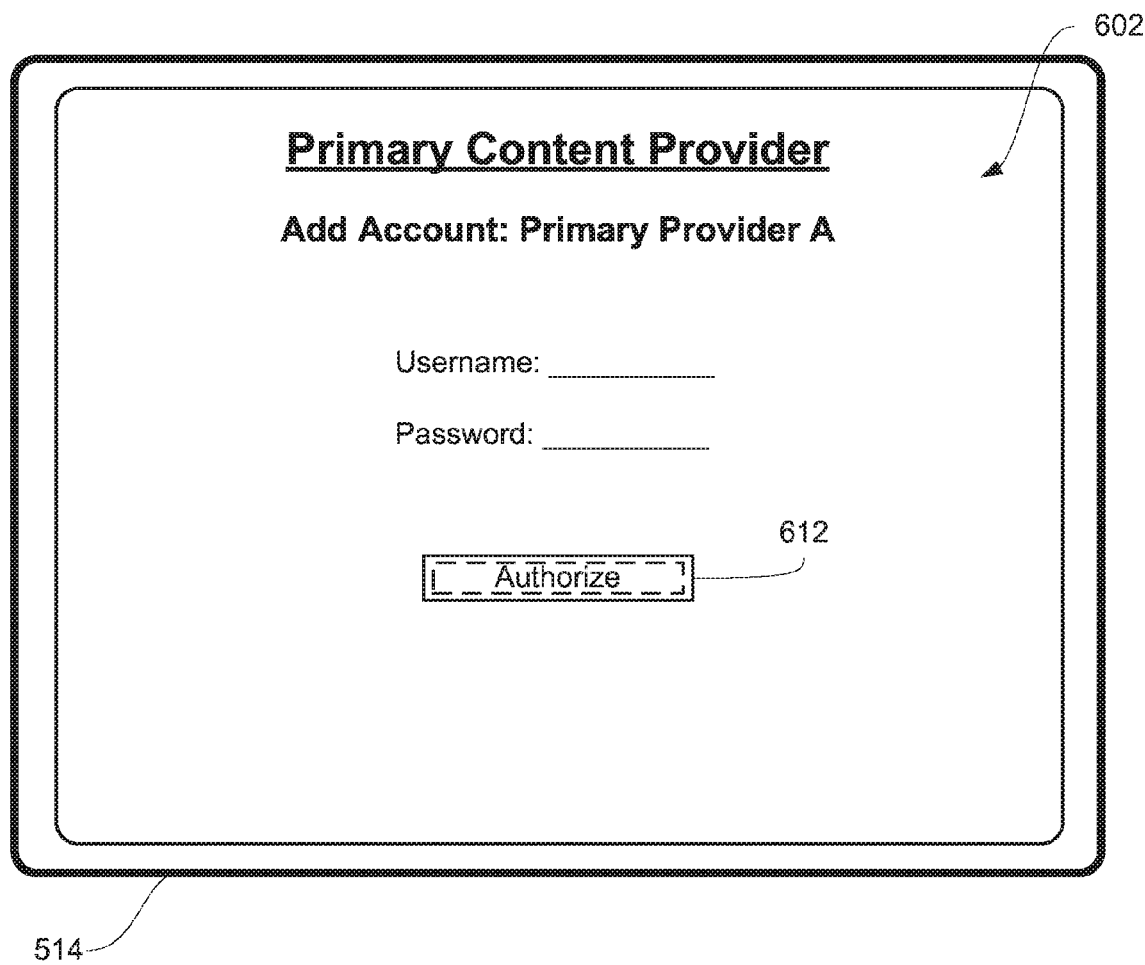
Figure 6E:
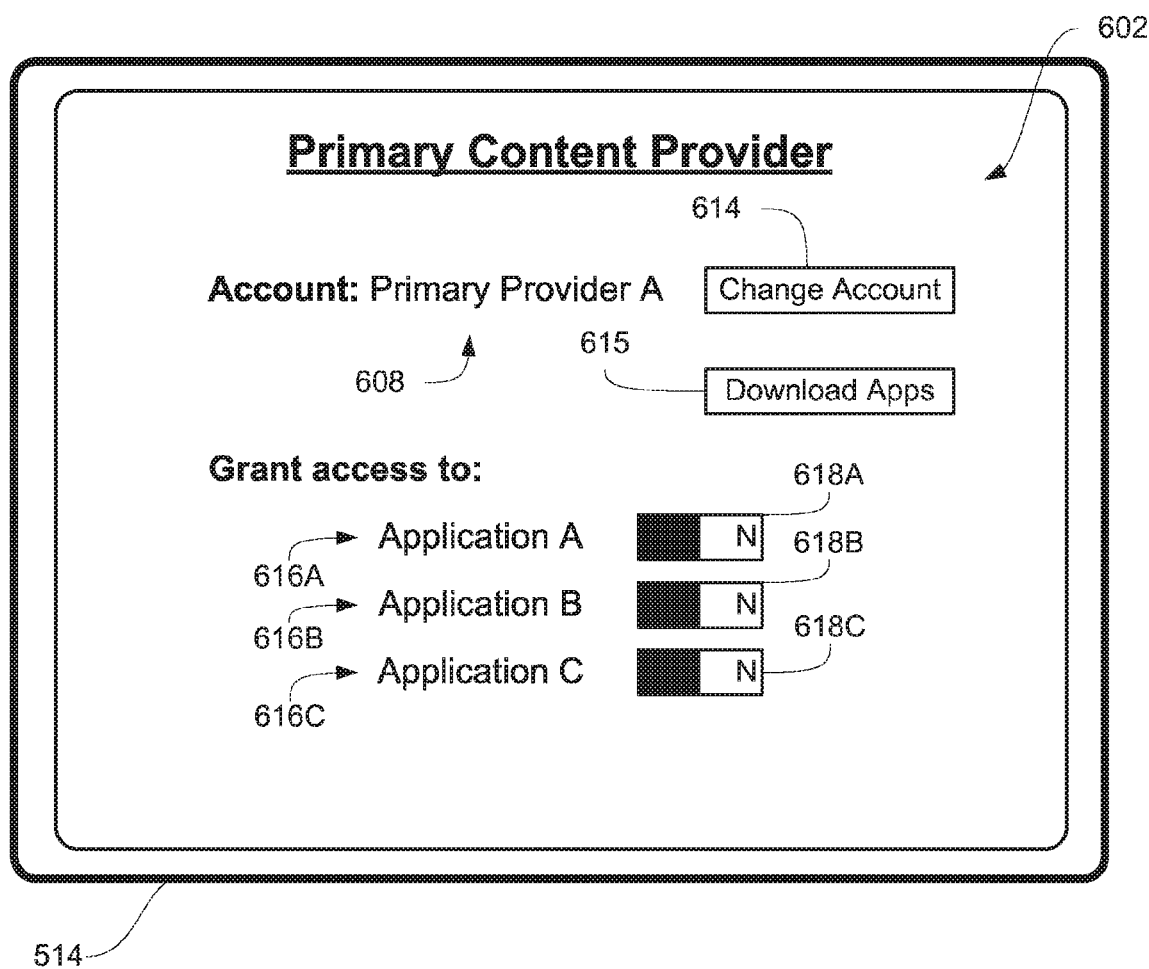

In FIG. 6C, the user has selected button 610A. In response to the selection of button 610A, the electronic device optionally displays settings user interface 602 for inputting user authentication credentials with primary content provider A (the content provider corresponding to button 610A), as shown in FIG. 6D. For example, the user is optionally required to enter a username and password for primary content provider A. Once the user has entered this information, the user optionally selects button 612 to authorize the electronic device with primary content provider A, as shown in FIG. 6D. In response to the selection of button 612, the electronic device is optionally authorized with primary content provider A, as shown in FIG. 6E. In some embodiments, if a user selects a primary content provider with which to authorize the device that does not support device-level authorization with that primary content provider through the user interfaces of the operating system of the electronic device, such selection causes the electronic device to display a link to instructions from the selected primary content provider (e.g., on the primary content provider's website) as to how to authorize the applications on the electronic device to access content from their corresponding secondary content providers via that primary content provider.

As shown in FIG. 6E, once the electronic device is authorized with primary content provider A, the settings user interface 602 for controlling the primary content provider account information on the electronic device shows that the electronic device is authorized with primary content provider A, at 608. Additionally, the settings user interface 602 includes button 614 for changing the primary content provider with which the electronic device is authorized, and also includes button 615 for downloading applications to the electronic device that are associated with primary content provider A; for example, applications that are associated with secondary content providers that are associated with primary content provider A (e.g., secondary content providers, to the content of which primary content provider A has access). The settings user interface 602 in FIG. 6E also includes controls for granting (or denying) applications on the electronic device access to the authorization of the electronic device with primary content provider A, so that those applications are able to provide the electronic device access to their corresponding media without requiring the user to separately authorize each application.

For example, settings user interface 602 in FIG. 6E optionally includes representations of applications installed on the electronic device (e.g., representations 616A, 616B and 616C corresponding to applications A, B and C, respectively), and controls for granting or denying those applications access to the authorization of the electronic device with primary content provider A (e.g., controls 618A, 618B and 618C). Applications A, B and C are optionally already installed on the electronic device, and are optionally associated with primary content provider A (e.g., are associated with secondary content providers, to the content of which primary content provider A has access).

By default, applications A, B and C are optionally denied access to the authorization of the electronic device with primary content provider A when the electronic device is first authorized with primary content provider A through settings user interface 602, as indicated by controls 618A, 618B and 618C. However, the user of the electronic device is optionally able to grant applications A, B and/or C access to the authorization of the electronic device with primary content provider A by toggling controls 618A, 618B and 618C. For example, in FIG. 6F, the user has granted application B access to the authorization of the electronic device with primary content provider A—applications A and C continue to be denied such access. In some embodiments, the controls 618 include controls for providing secondary content providers with access to the authorization of the electronic device with primary content provider A for secondary content providers that have apps installed on the device and secondary content providers that do not have apps installed on the device. In circumstances where the user elects to provide a secondary content provider with access to the authorization of the electronic device with primary content provider, but does not have the corresponding application for the secondary content provider installed on the device, the device optionally prompts the user to install the corresponding application for the secondary content provider (e.g., "would you like to install Application B on this device?"). In some embodiments, an affirmative response to the prompt initiates a process for installing the corresponding application (e.g., starts to download and install the application or switches the user to an application store user interface on an application store page for the corresponding application where the use can provide authorization to download the application with a small number of inputs) so as to enable the user to quickly install applications that correspond to secondary content providers that have apps available for use with the authorization of the primary content provider.

Figure 6F:
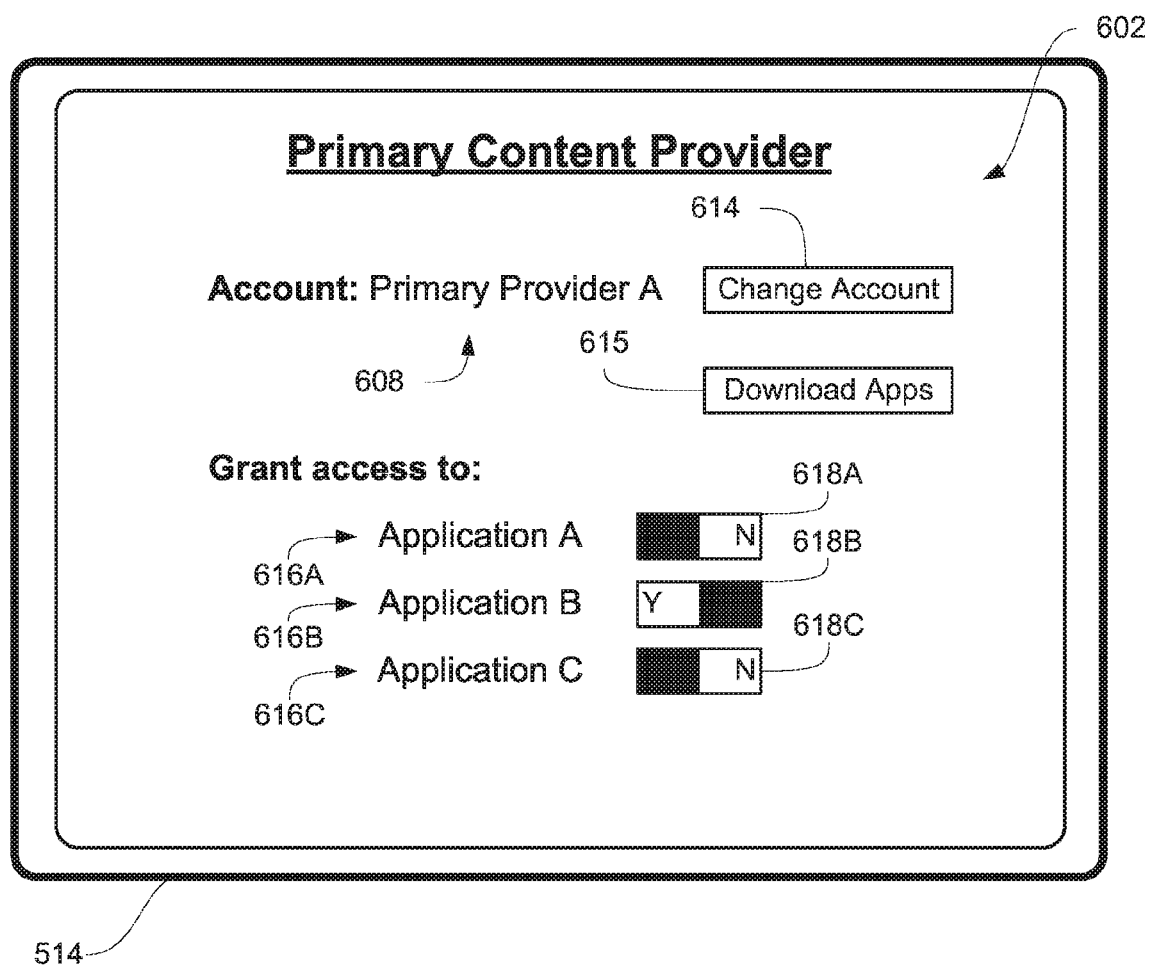
Figure 6G:
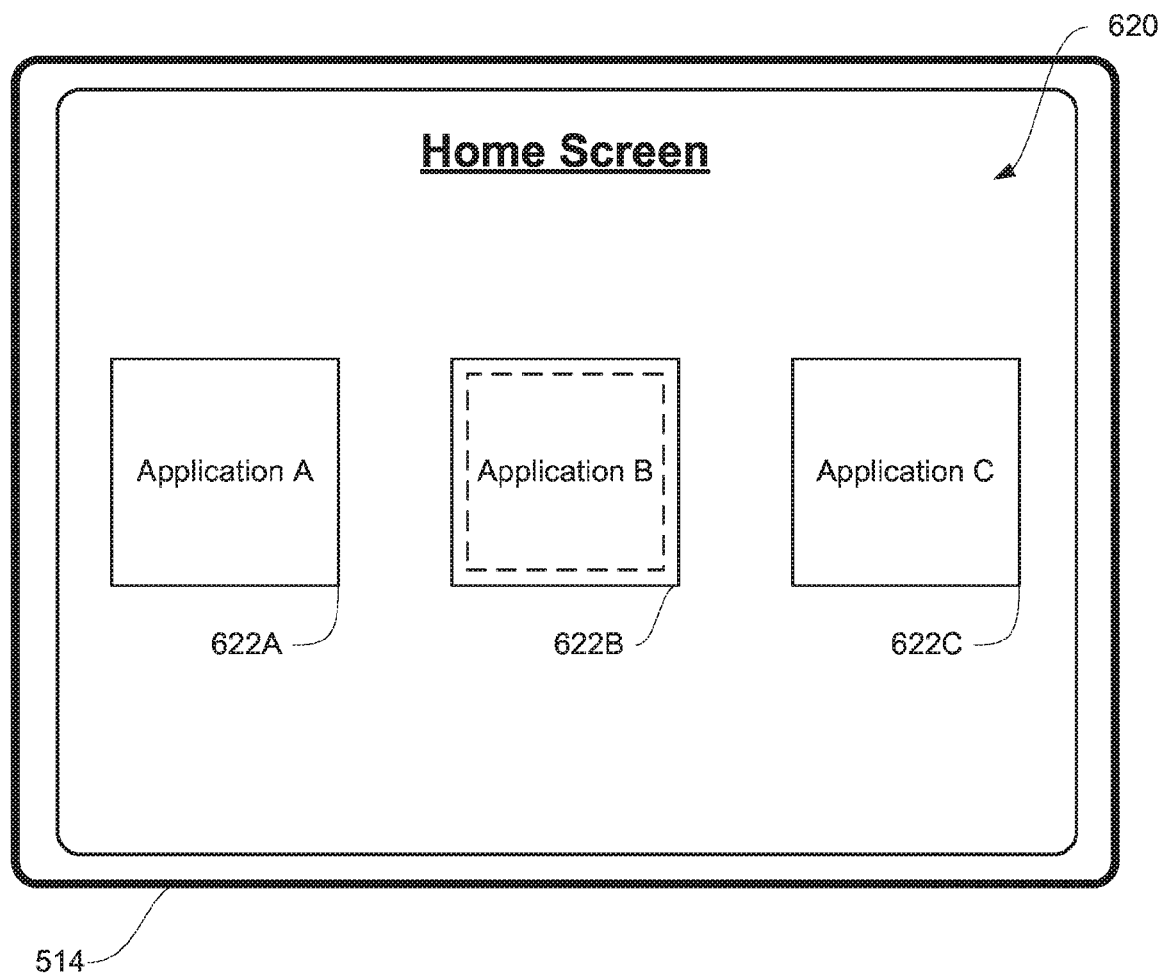

Because application B has been granted access to the authorization of the electronic device with primary content provider A, the electronic device is able to access media from application B, without needing to separately authorize application B with primary content provider A. For example, in FIG. 6G, the electronic device is displaying home screen 620 of the electronic device, which includes icons for applications A (e.g., icon 622A), B (e.g., icon 622B) and C (e.g., icon 622C), each icon selectable to launch that application on the electronic device. In some embodiments, home screen 620 includes selectable icons for launching other applications, as well, including applications not associated with primary content provider A, or any primary content provider (e.g., calendar application, calculator application, etc.). In FIG. 6G, the user has selected icon 622B to launch application B on the electronic device.

Figure 6H:
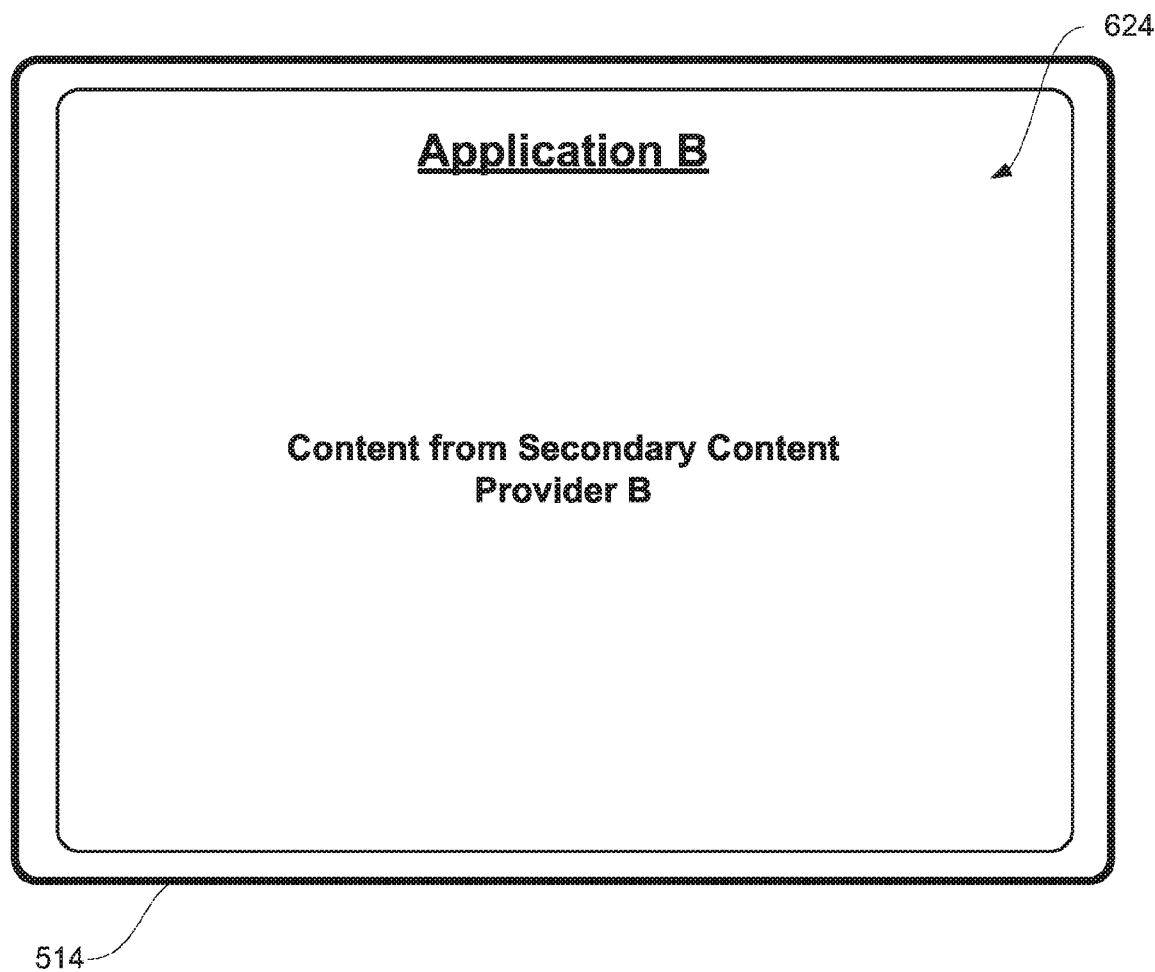

In FIG. 6H, in response to the selection of icon 622B in FIG. 6G, the electronic device launches application B and displays user interface 624 of application B. User interface 624 is optionally a user interface of application B from which content from secondary content provider B (associated with application B) is accessible on the electronic device. As shown in FIG. 6H, because the user has granted application B access to the authorization of the electronic device with primary content provider A, the user was able to launch application B and access content from secondary content provider B without being required to separately authorize application B with primary content provider A.

Figure 6I:
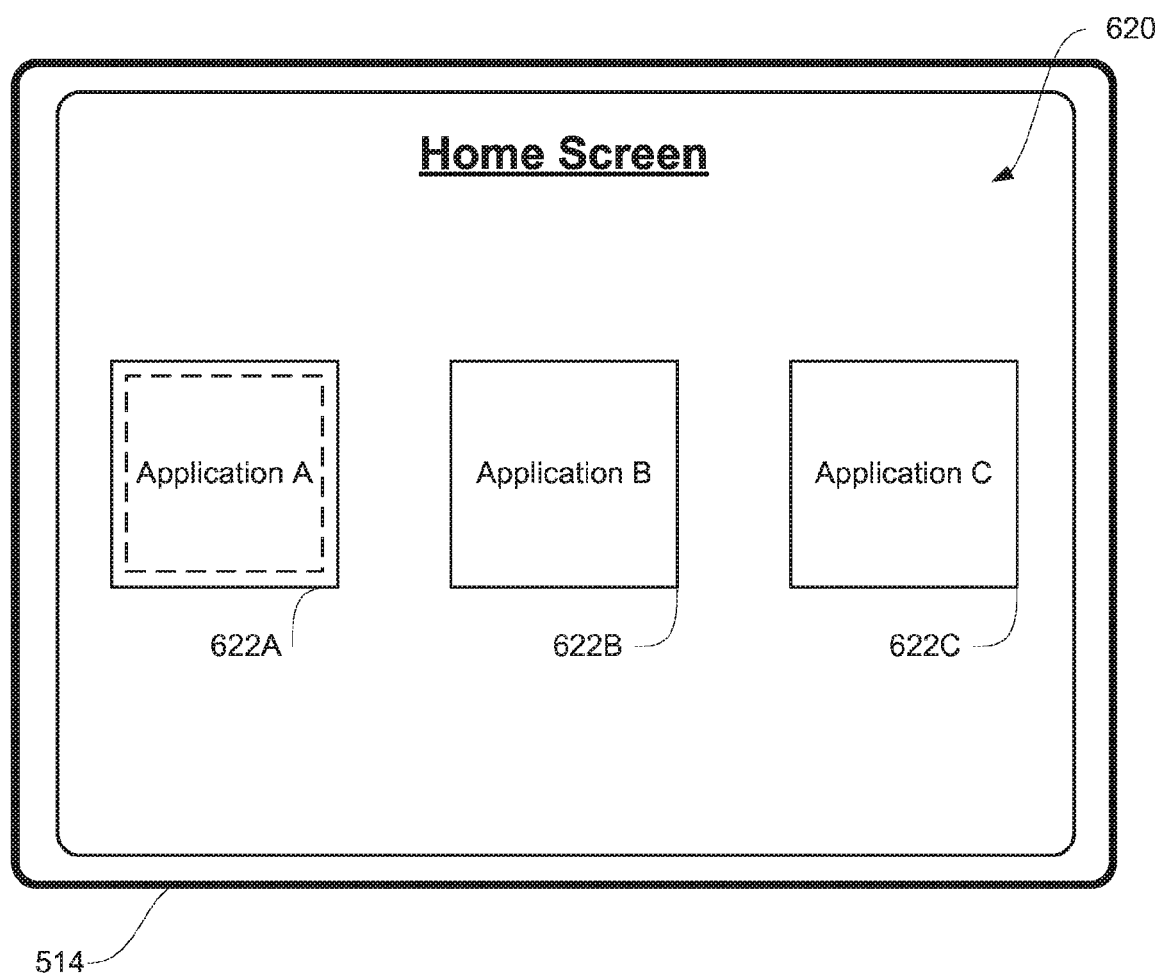
Figure 6J:
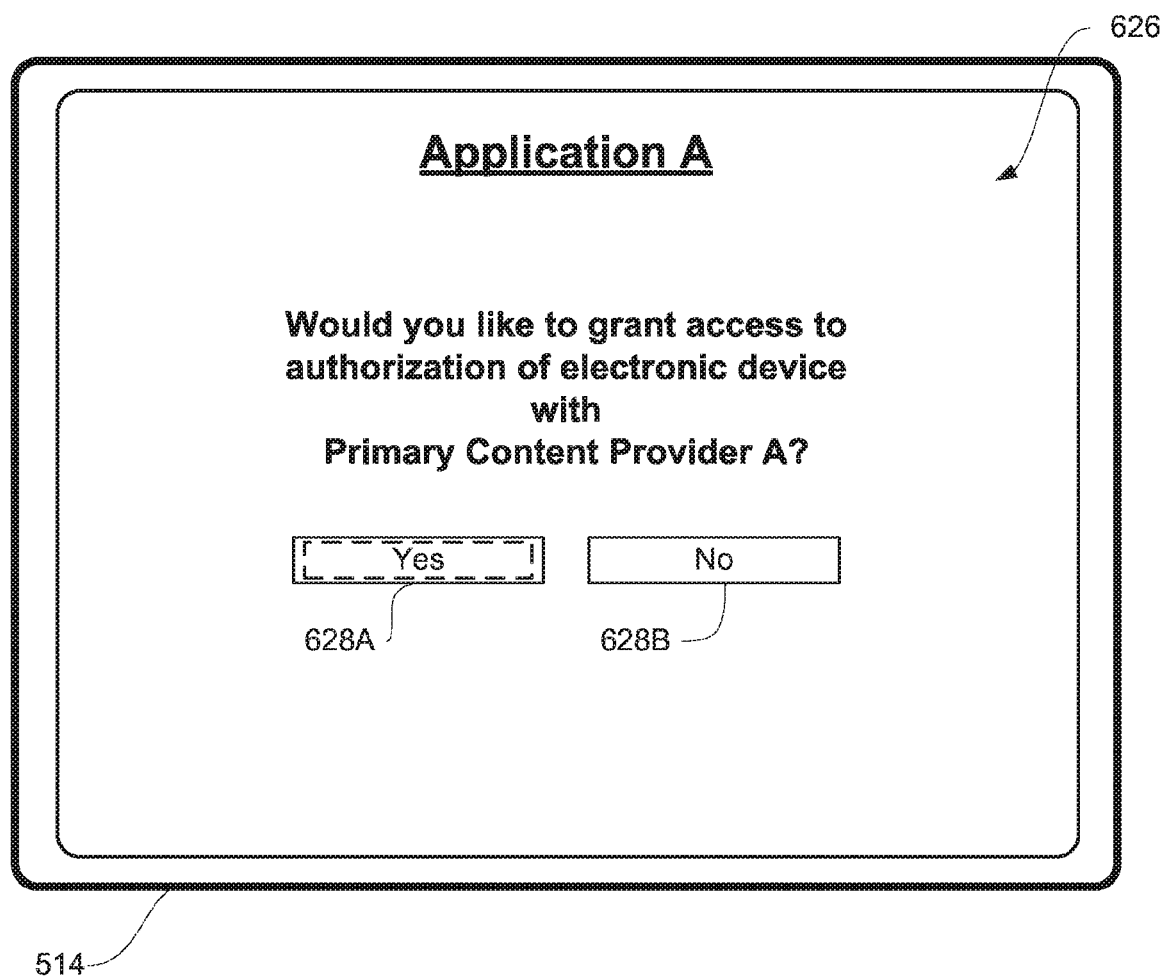
Figure 6K:
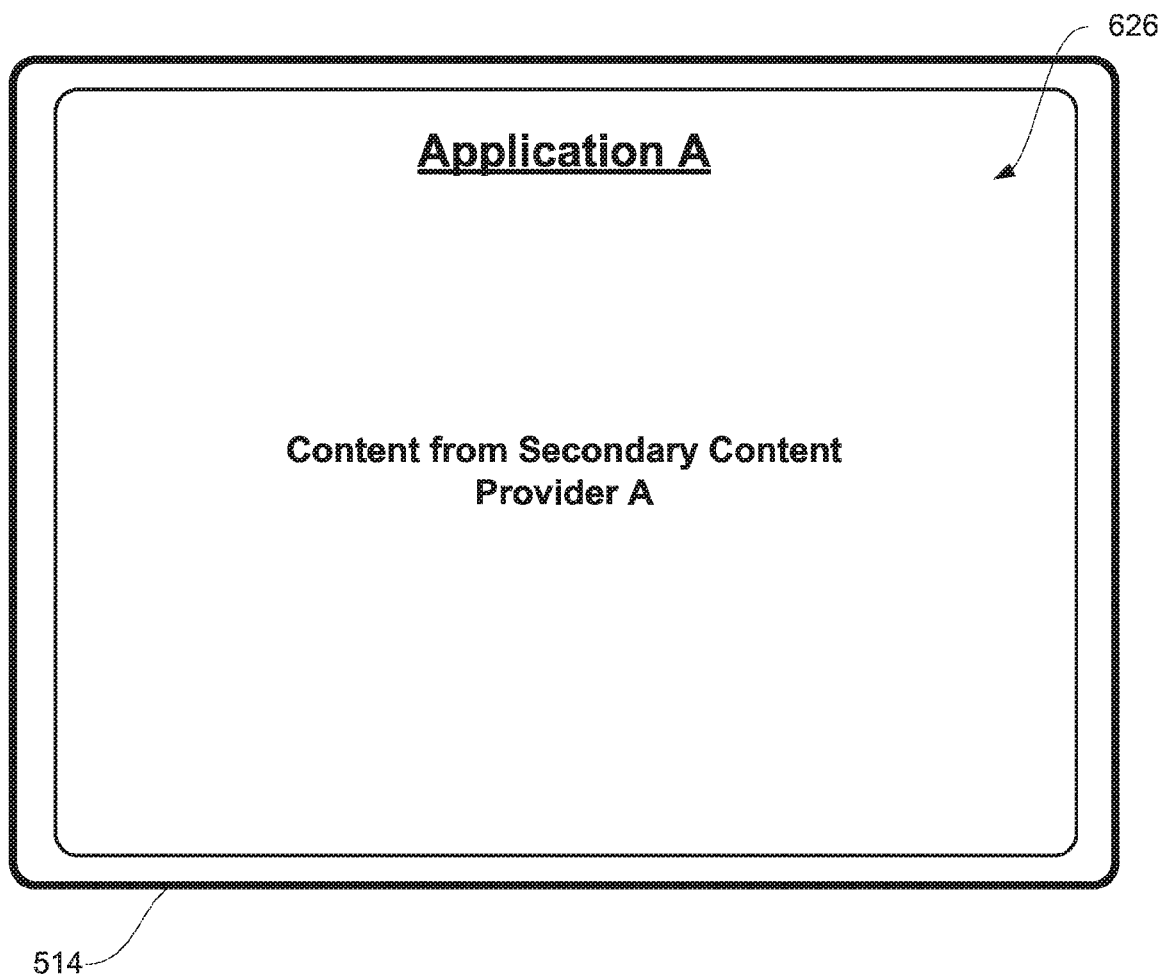
Figure 6L:
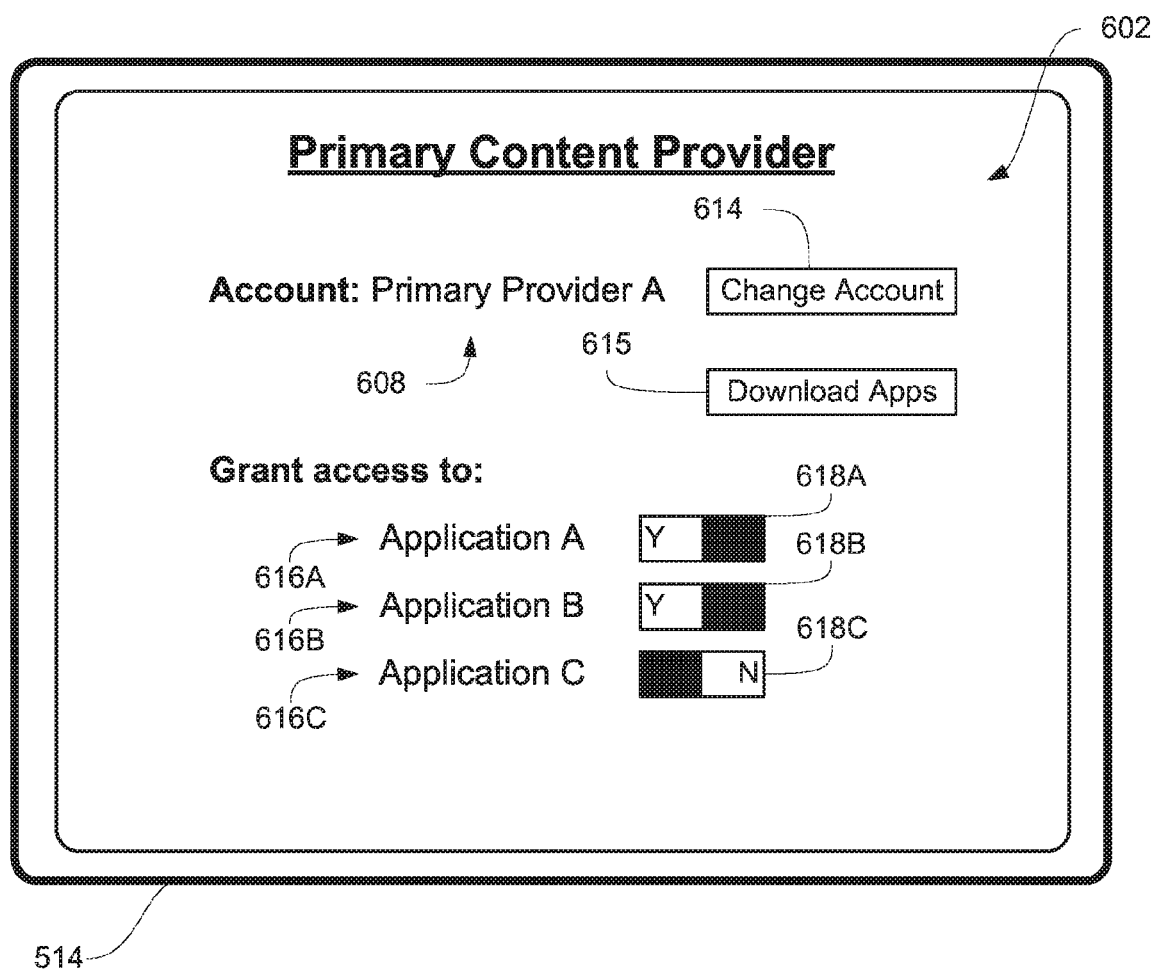

In comparison, in FIG. 6I, the user has selected icon 622A on home screen 620 to launch application A on the electronic device. Application A was optionally denied access to the authorization of the electronic device with primary content provider A, as shown in FIG. 6F. In FIG. 6J, in response to the selection of icon 622A in FIG. 6I, the electronic device launches application A and displays user interface 626 (e.g., a user interface of application A, or of an operating system of the electronic device). User interface 626 optionally asks the user of the electronic device whether they would like to give application A access to the authorization of the electronic device with primary content provider A, as shown in FIG. 6J. The user is optionally able to grant (e.g., by selecting button 628A) or deny (e.g. by selecting button 628B) application A access to the authorization of the electronic device with primary content provider A. In FIG. 6J, the user has selected button 628A for granting application A access to the authorization of the electronic device with primary content provider A. In response, application A provides the user access to content from secondary content provider A, as shown in FIG. 6K, without requiring input of access credentials by the user for primary content provider A. Further, because application A now has access to the authorization of the electronic device with primary content provider A, the settings user interface 602 is optionally updated to reflect this grant of access to application A, as shown in FIG. 6L.

Figure 6M:
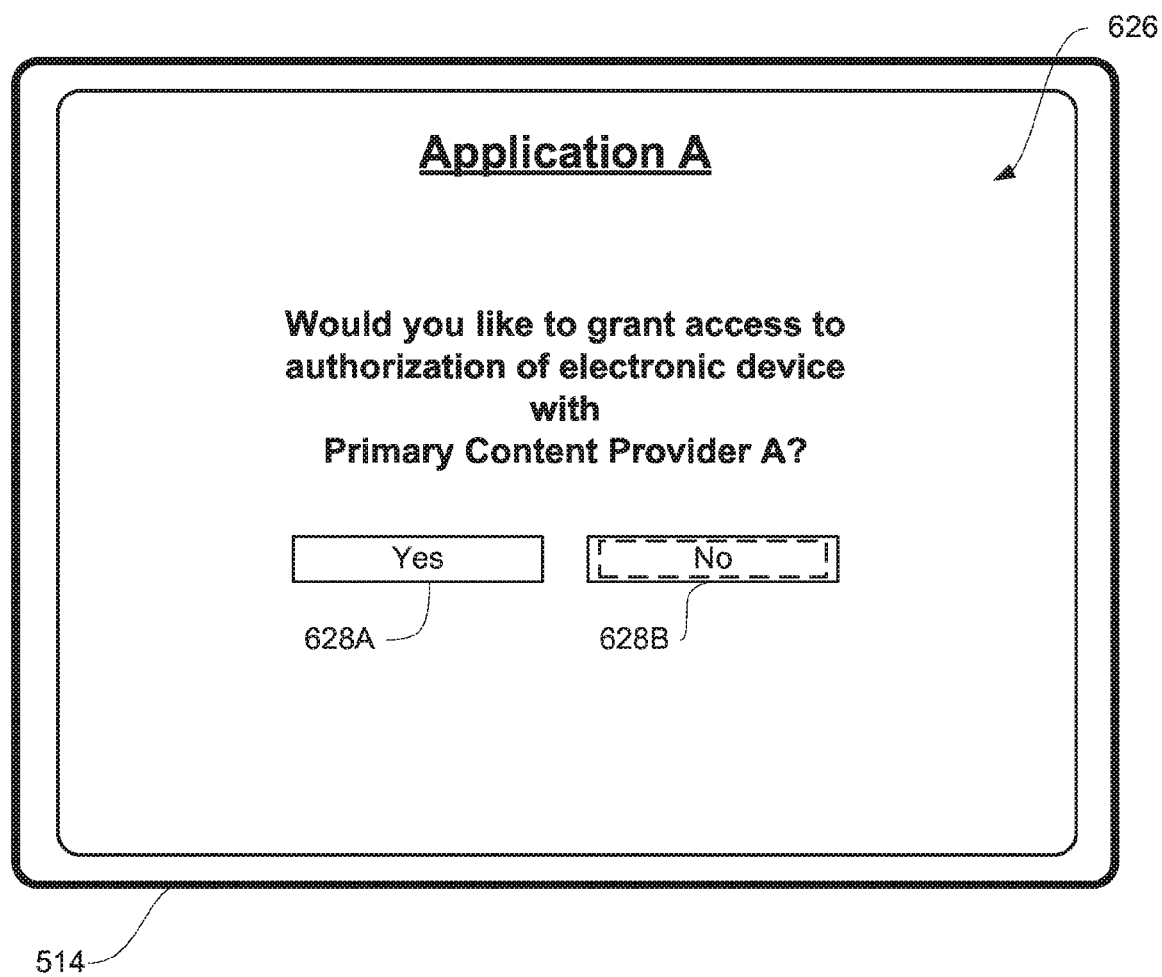
Figure 6N:
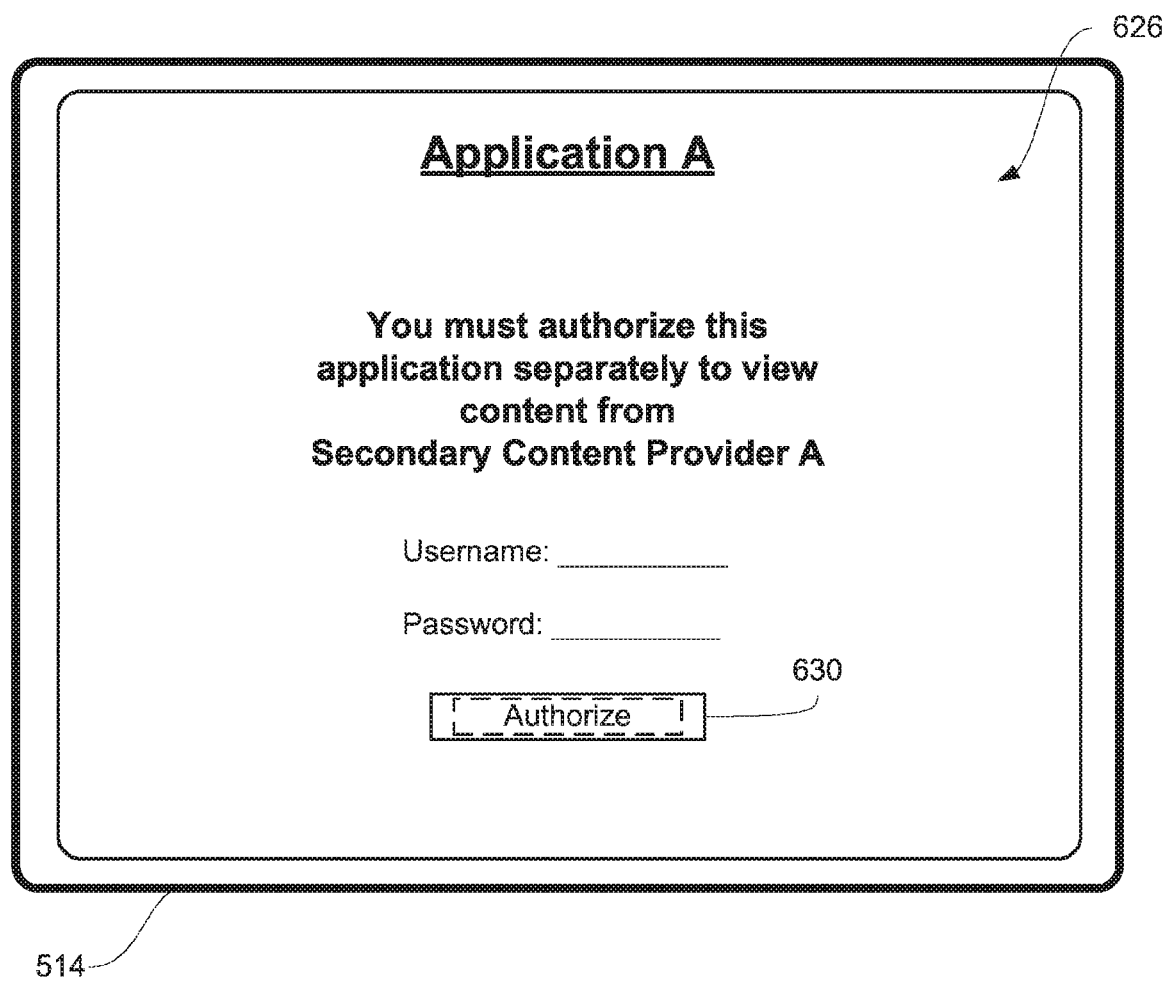
Figure 6O:
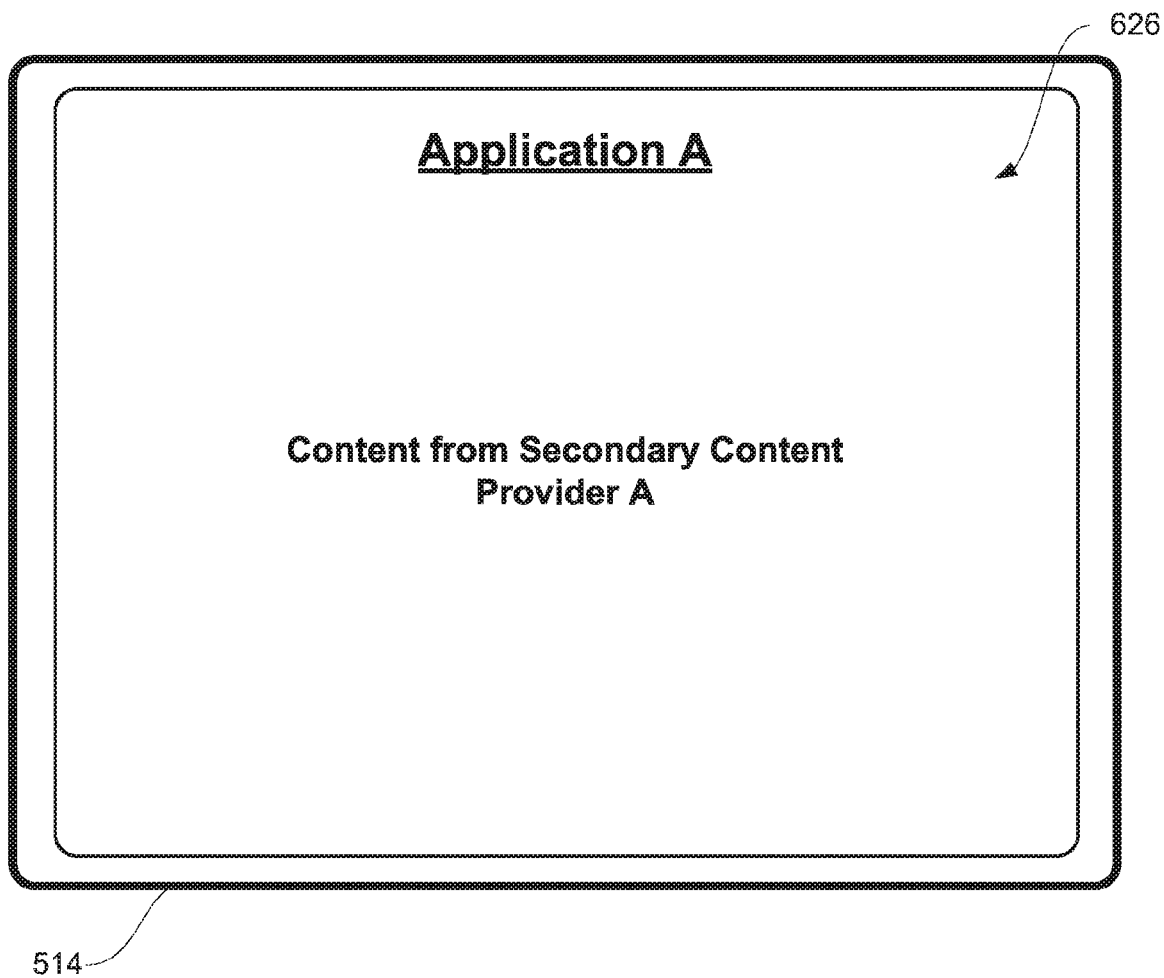

If the user, instead of granting application A access to the authorization of the electronic device with primary content provider A, had denied such access to application A, as shown in FIG. 6M, application A would require separate authorization with primary content provider A before giving the user access to content from secondary content provider A, as shown in FIG. 6N. In FIG. 6N, the user is able to provide authorization information (e.g., username and password) to authorize application A with primary content provider A. Once authorized with primary content provider A, application A optionally provides access to content from secondary content provider A to the user of the electronic device, as shown in FIG. 6O. This separate authorization of application A with primary content provider A optionally is not reflected in settings user interface 602, as shown in FIG.

6P, because the separate authorization of application A with primary content provider A did not constitute a granting of access to application A to the authorization of the electronic device with primary content provider A (such access was denied, as explained above).

Figure 6P:
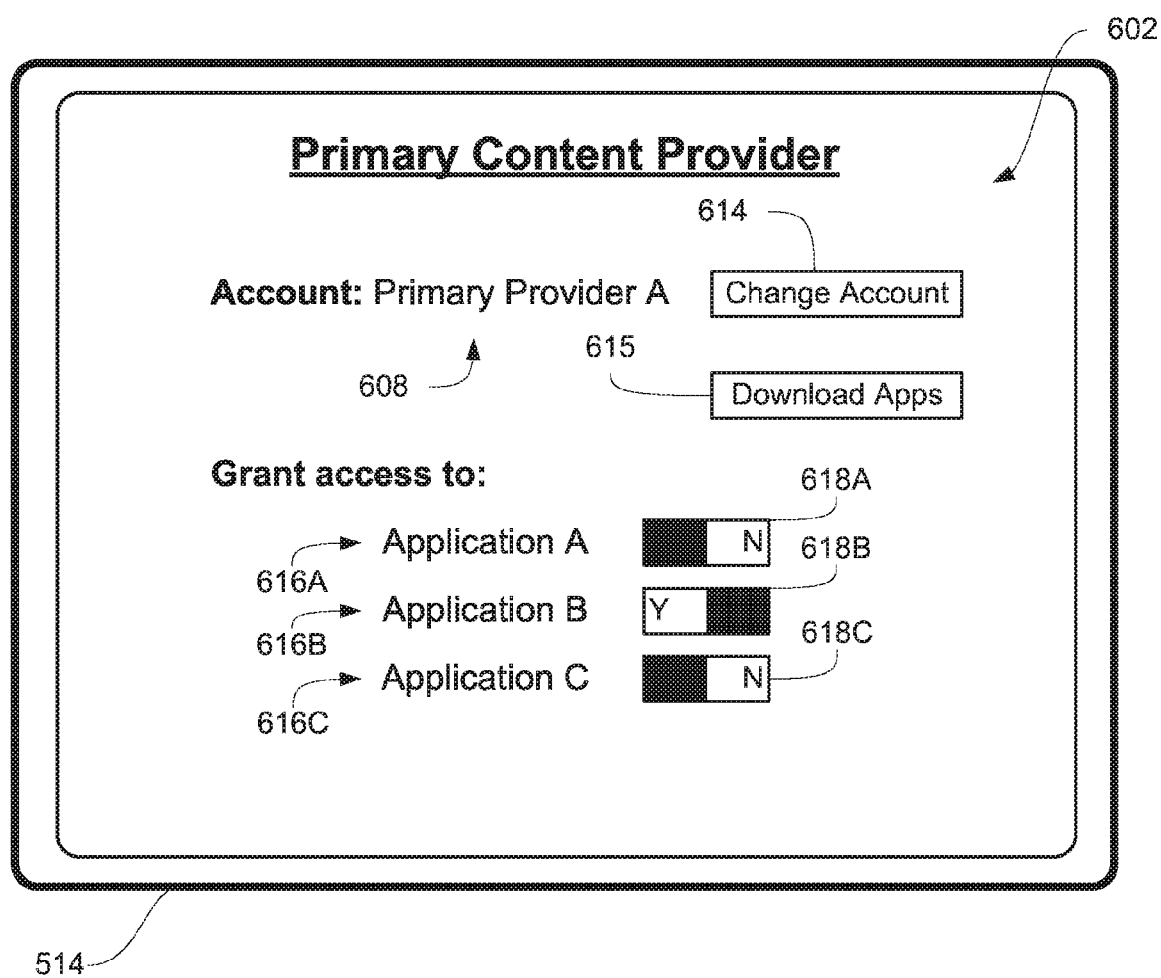
Figure 6Q:
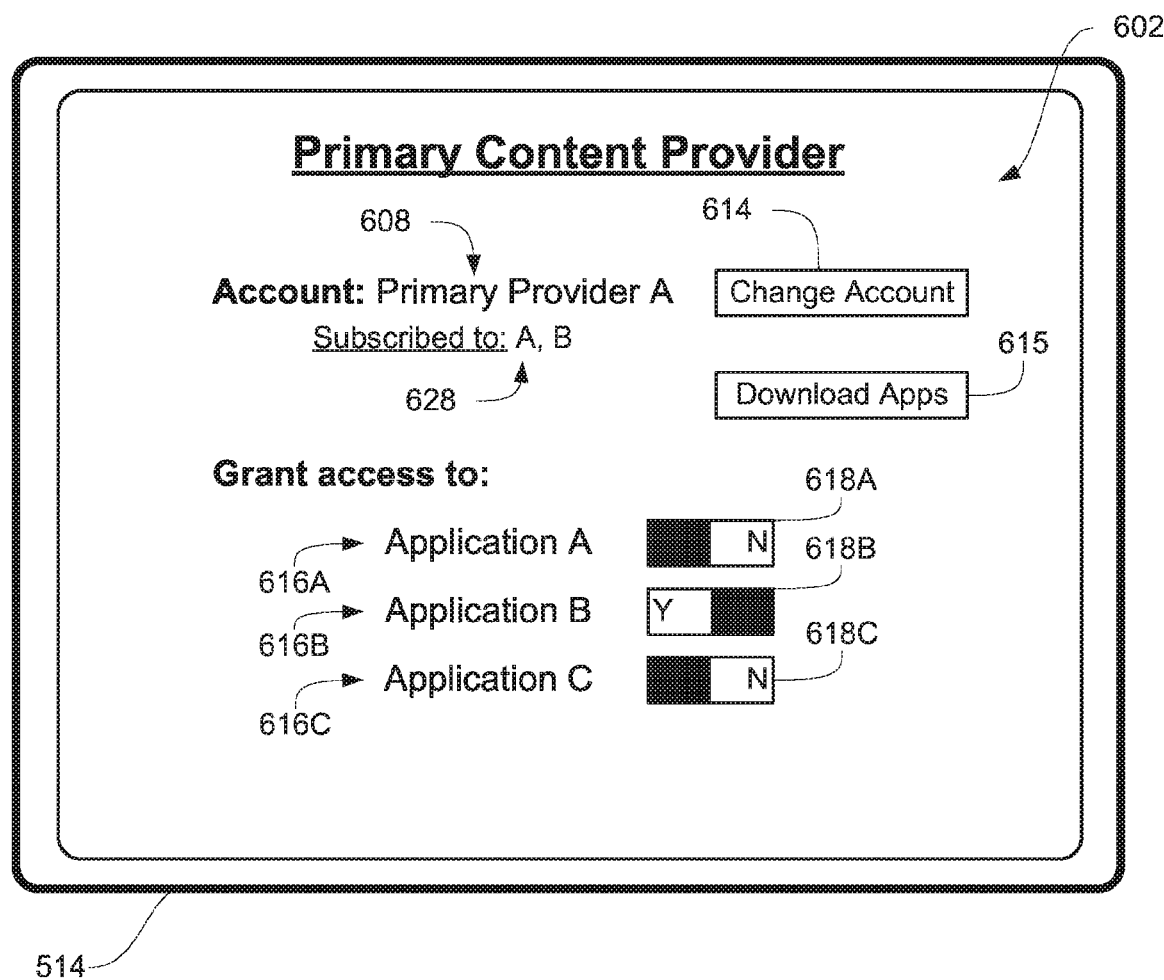

In some embodiments, a user's account with a primary content provider, such as primary content provider A, provides the user with access to some or all of the secondary content providers associated with the primary content provider (e.g., depending on the level of subscription the user has with the primary content provider). For example, in FIG. 6Q, as shown at 628, the user's account with primary content provider A optionally gives the user access to (e.g., the user is subscribed to) secondary content providers A and B, but optionally does not give the user access to (e.g., the user is not subscribed to) secondary content provider C. In some embodiments, the electronic device, in displaying representations 616A, 616B and 616C, and corresponding controls 618A, 618B and 618C in settings user interface 602 does not account for such subscription data. For example, as shown in FIG. 6Q, the electronic device optionally allows granting or denying access to the authorization of the electronic device to all of applications A (associated with secondary content provider A), B (associated with secondary content provider B) and C (associated with secondary content provider C), because applications A, B and C are optionally installed on the electronic device, despite the fact that the user's account with primary content provider A does not give the user access to content from application C.

Figure 6R:
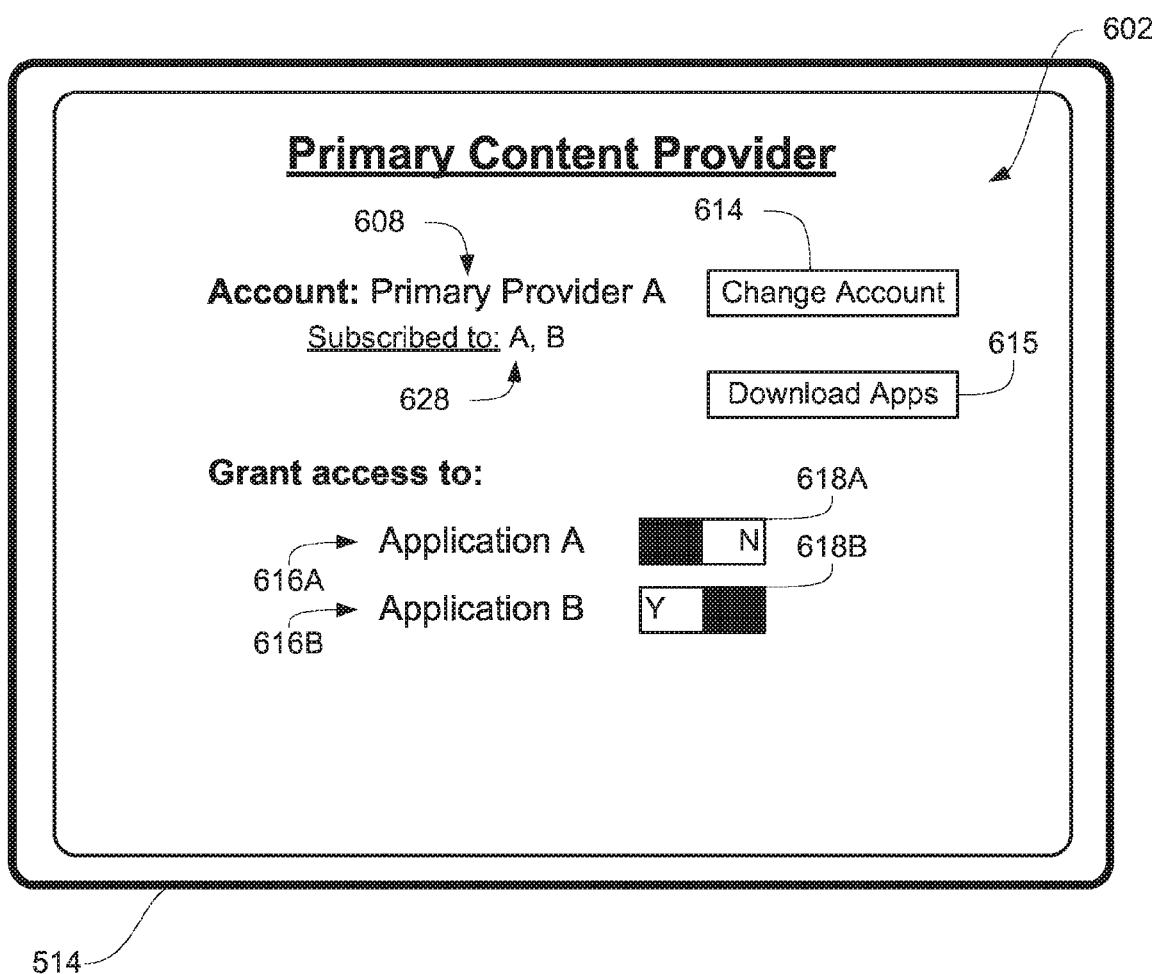

In some embodiments, however, the electronic device only allows granting or denying access to the authorization of the electronic device to applications to which the user's account with primary content provider A gives the user access. For example, in FIG. 6R, settings user interface 602 only lists applications A and B, and their corresponding controls 618A and 618B, because the user's account with primary content provider A only gives the user access to content from secondary content provider A (associated with application A) and secondary content provider B (associated with application B).

After the electronic device has been authorized with a primary content provider, such as primary content provider A, the user of the electronic device may download additional applications that are able to utilize the authorization of the electronic device with primary content provider A to provide access to content from those applications. For example, in FIG. 6S, after the electronic device was authorized with primary content provider A, application D has been downloaded and/or installed on the electronic device, indicated by icon 622D for application D displayed on home screen 620. In some embodiments, application D is not automatically granted access to the authorization of the electronic device with primary content provider A, as indicated by control 618D in settings user interface 602 in FIG. 6T. However, in some embodiments, application D is automatically granted access to the authorization of the electronic device with primary content provider A, because application D was downloaded after the electronic device was authorized with primary content provider A. In such embodiments, after application D has been downloaded, settings user interface 602 would indicate that application D has access to the authorization of the electronic device with primary content provider A, as shown in FIG. 6U.

Some applications associated with secondary content providers optionally do not support utilizing the authorization of the electronic device with a primary content provider to provide content from their secondary content providers to the user. Instead, such applications require the user to separately authorize those applications with the primary content provider. For example, in FIG. 6V, the user has downloaded and installed application E, and icon 622E corresponding to application E is displayed on home screen 620. The user has selected icon 622E to launch application E on the electronic device.

Figure 6S:
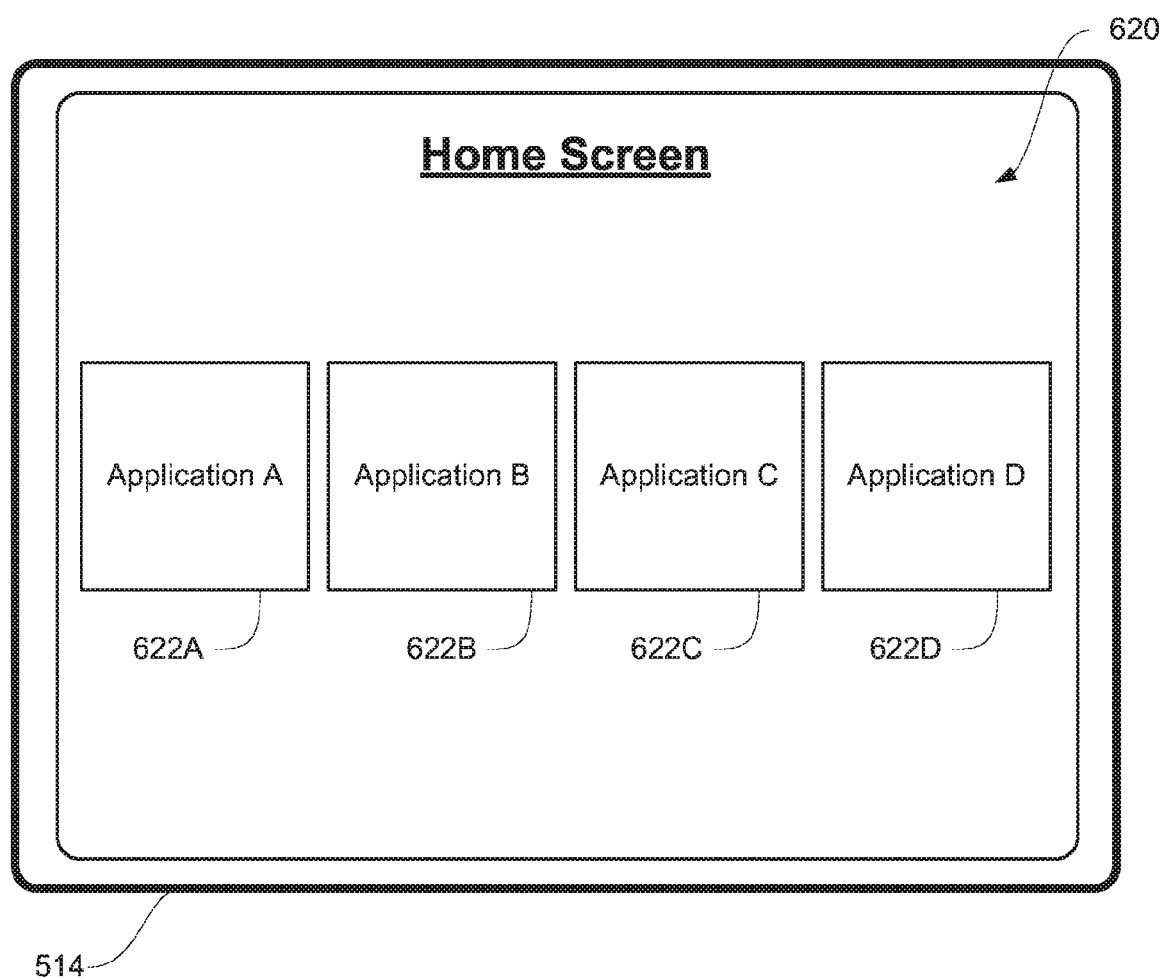
Figure 6T:
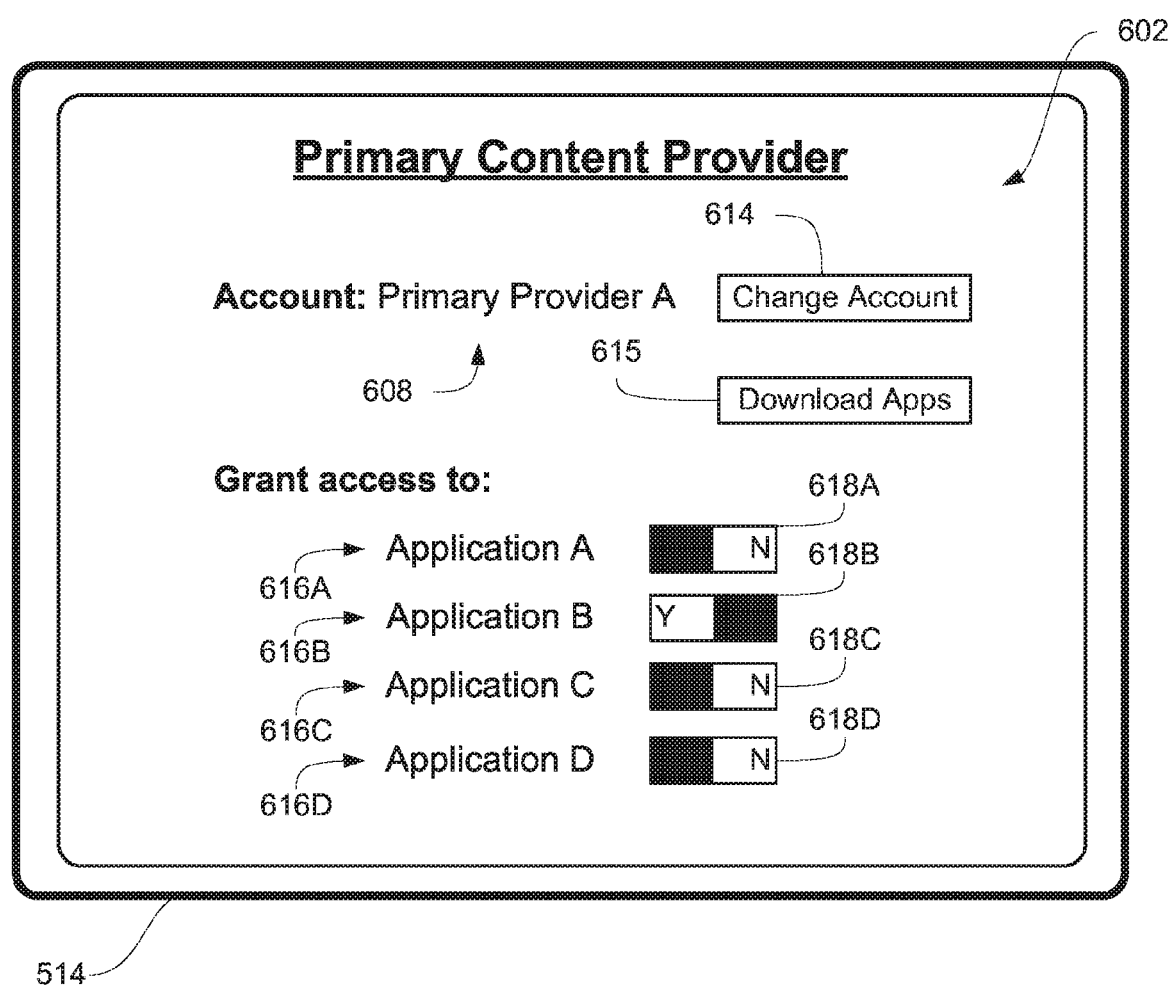
Figure 6U:
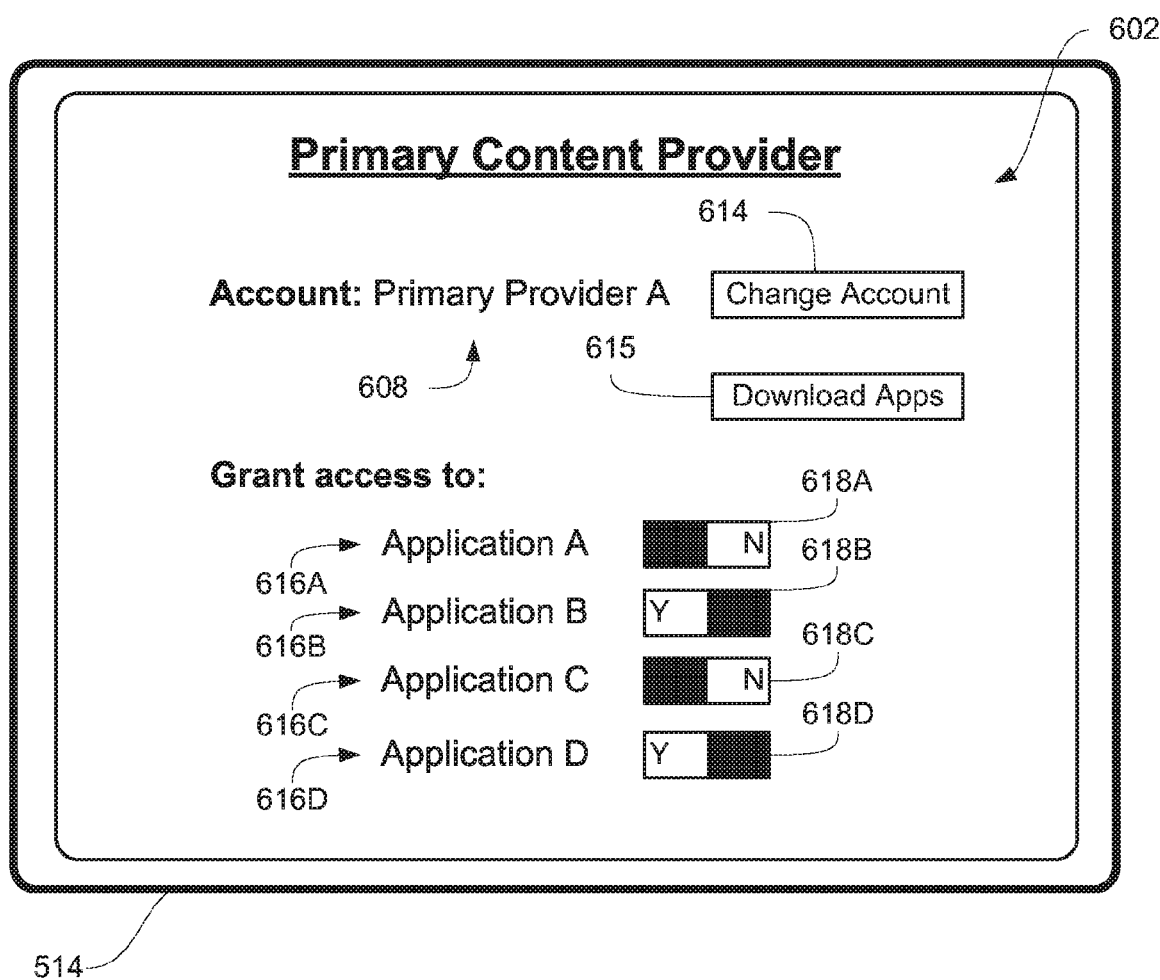
Figure 6V:
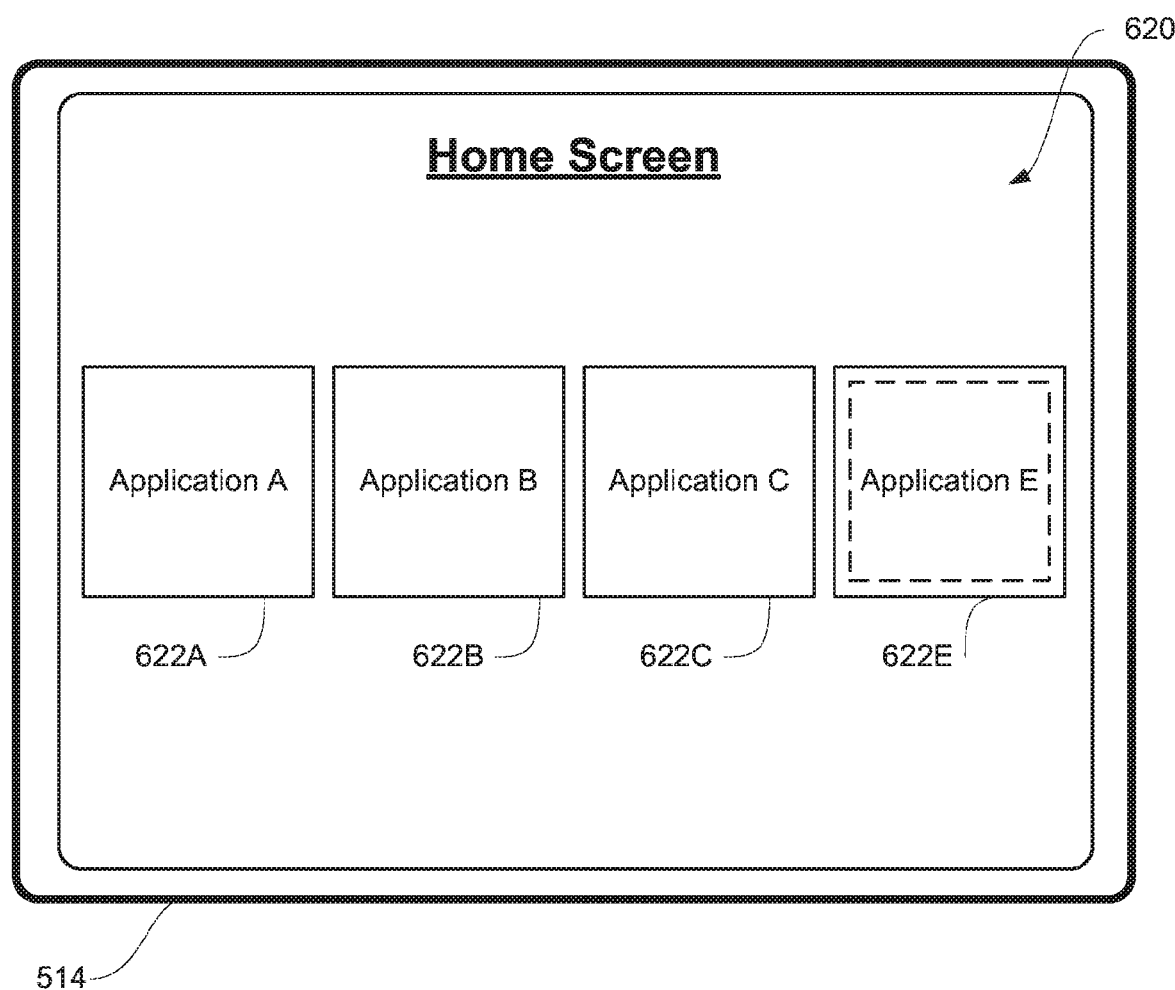
Figure 6W:
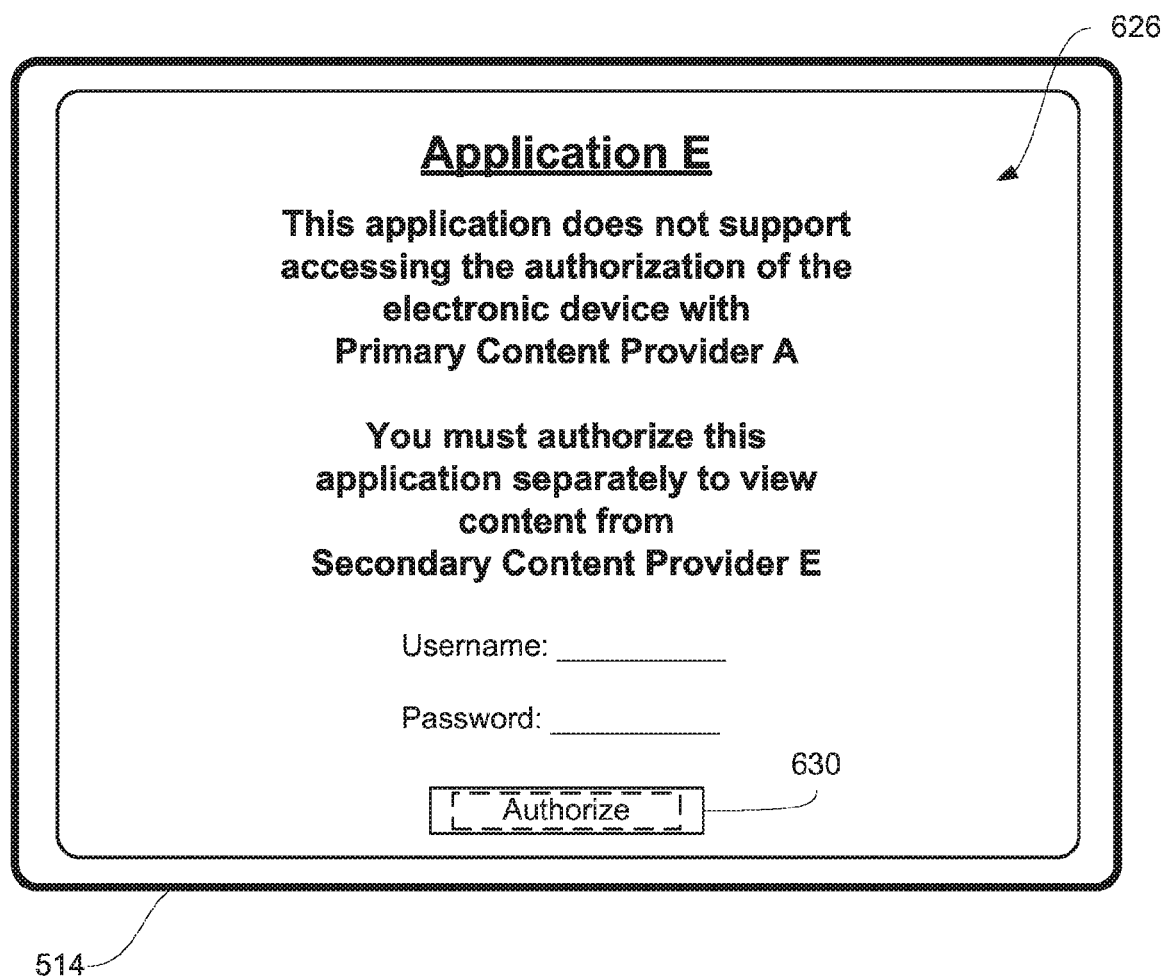
Figure 6X:
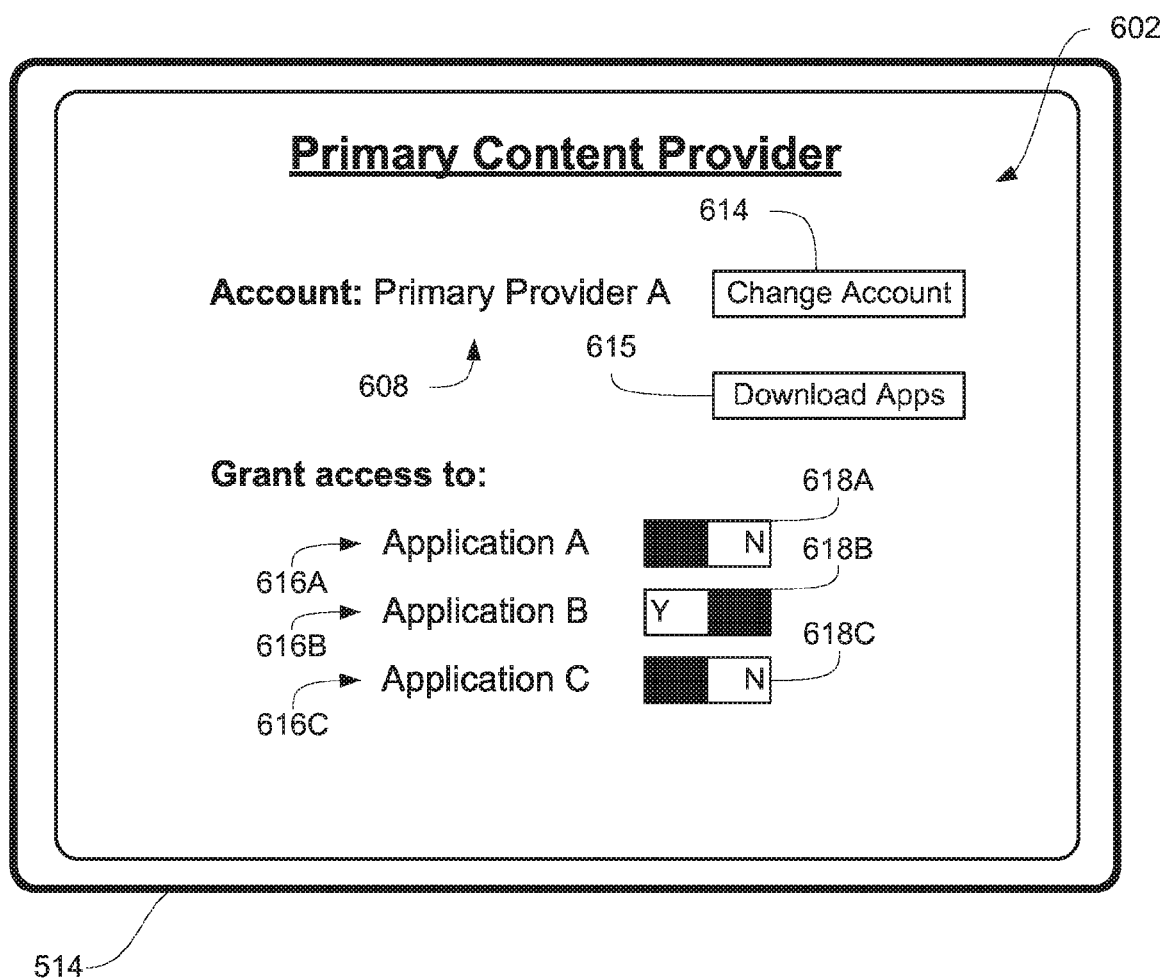

In FIG. 6W, the electronic device has launched application E in response to the selection of icon 622E in FIG. 6V. Application E optionally displays user interface 627, indicating to the user of the electronic device that application E must be separately authorized with a primary content provider (e.g., primary content provider A) before the user is able to access content from secondary content provider E in application E. If the user authorizes application E with primary content provider A (e.g., by providing a username and password for the user's account with primary content provider A), application E optionally gives the user access to content from secondary content provider E. However, even after the user authorizes application E with primary content provider A, because application E does not support utilizing the authorization of the electronic device with primary content provider A, application E and its access status to the authorization of the electronic device is optionally not displayed in settings user interface 602, as shown in FIG. 6X.

Figure 6Y:
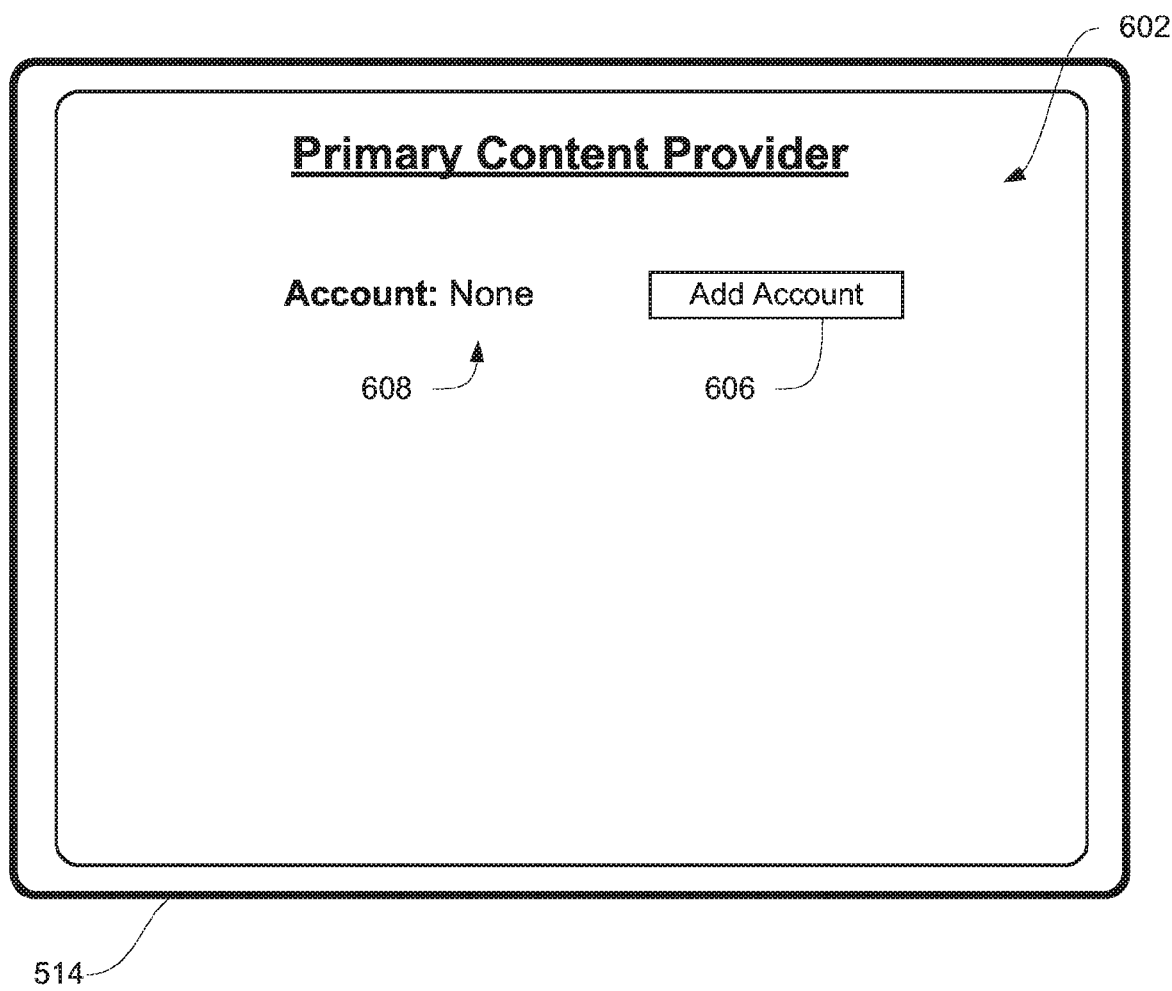

In some embodiments, a user is able to authorize the electronic device from an application for accessing content from the device (e.g., applications A, B and C, as described with reference to FIGS. 6A-6H) additionally or alternatively to performing such authorization from the settings user interface of the operating system of the electronic device. For example, in FIG. 6Y, the electronic device is not authorized with a primary content provider, as shown in settings user interface 602. While the electronic device is not authorized with a primary content provider, in FIG. 6Z, the user has selected icon 622A on home screen 620 to launch application A on the electronic device. Application A is optionally an application for accessing content from secondary content provider A (e.g., associated with a primary content provider, such as primary content provider A), as previously described.

Figure 6Z:
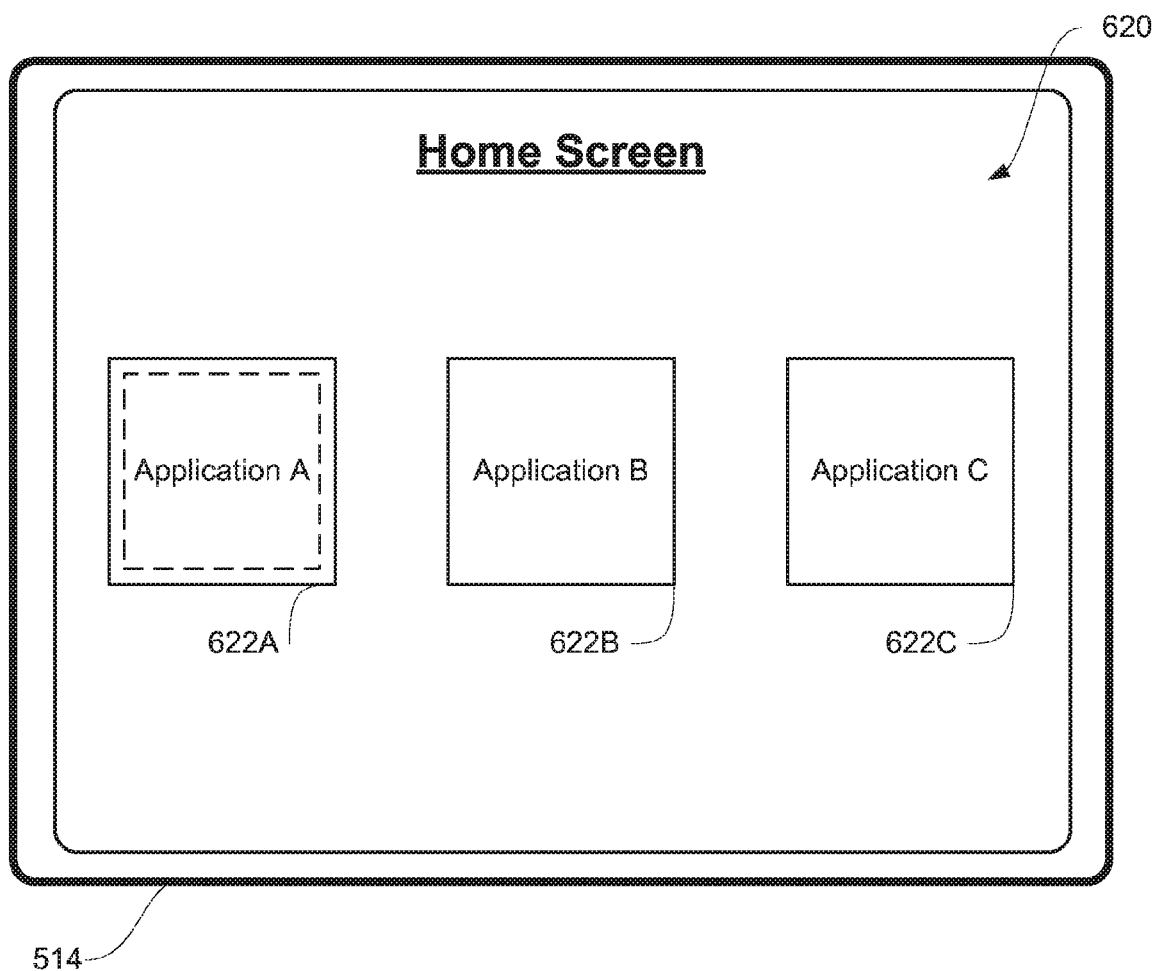
Figure 6A:
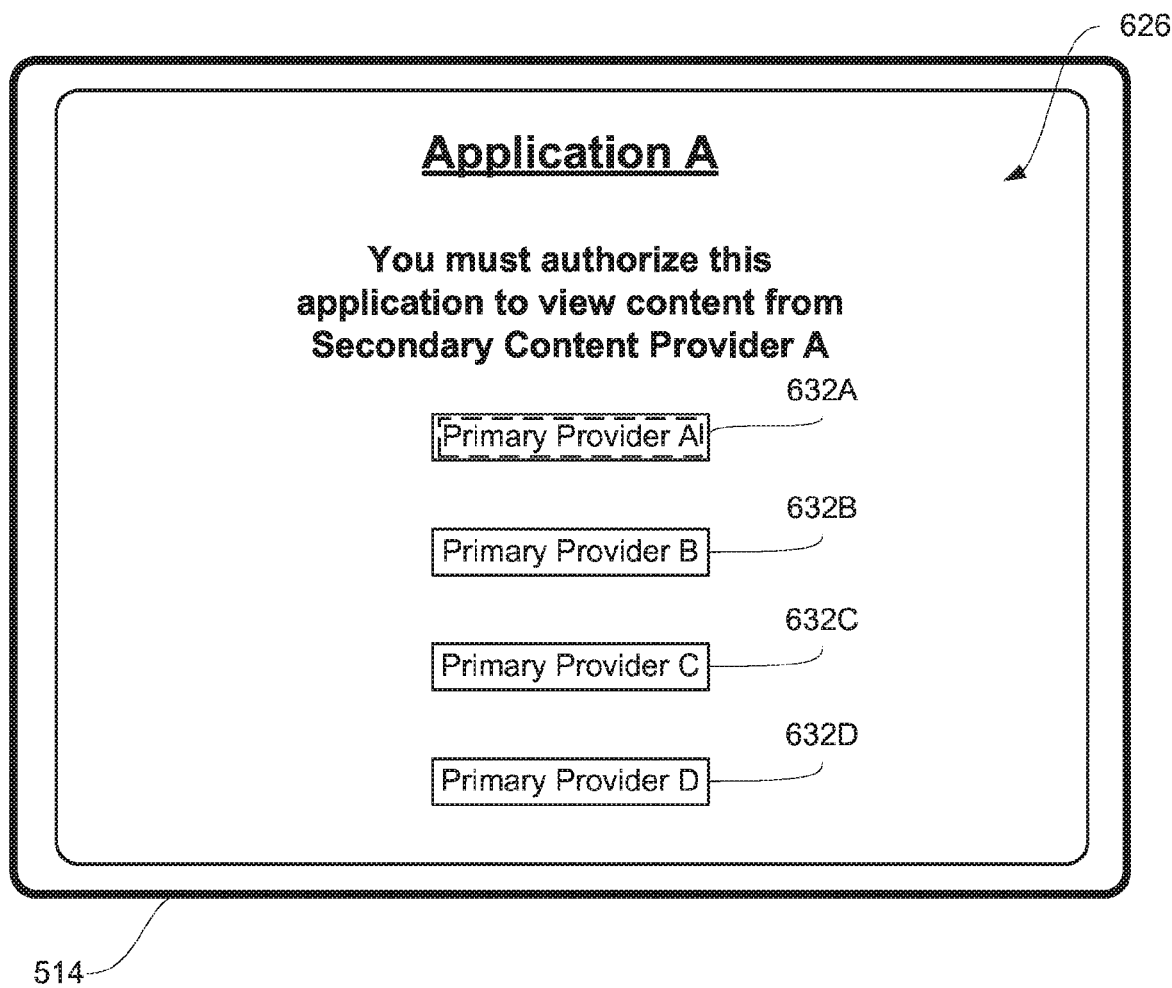
Figure 6B:
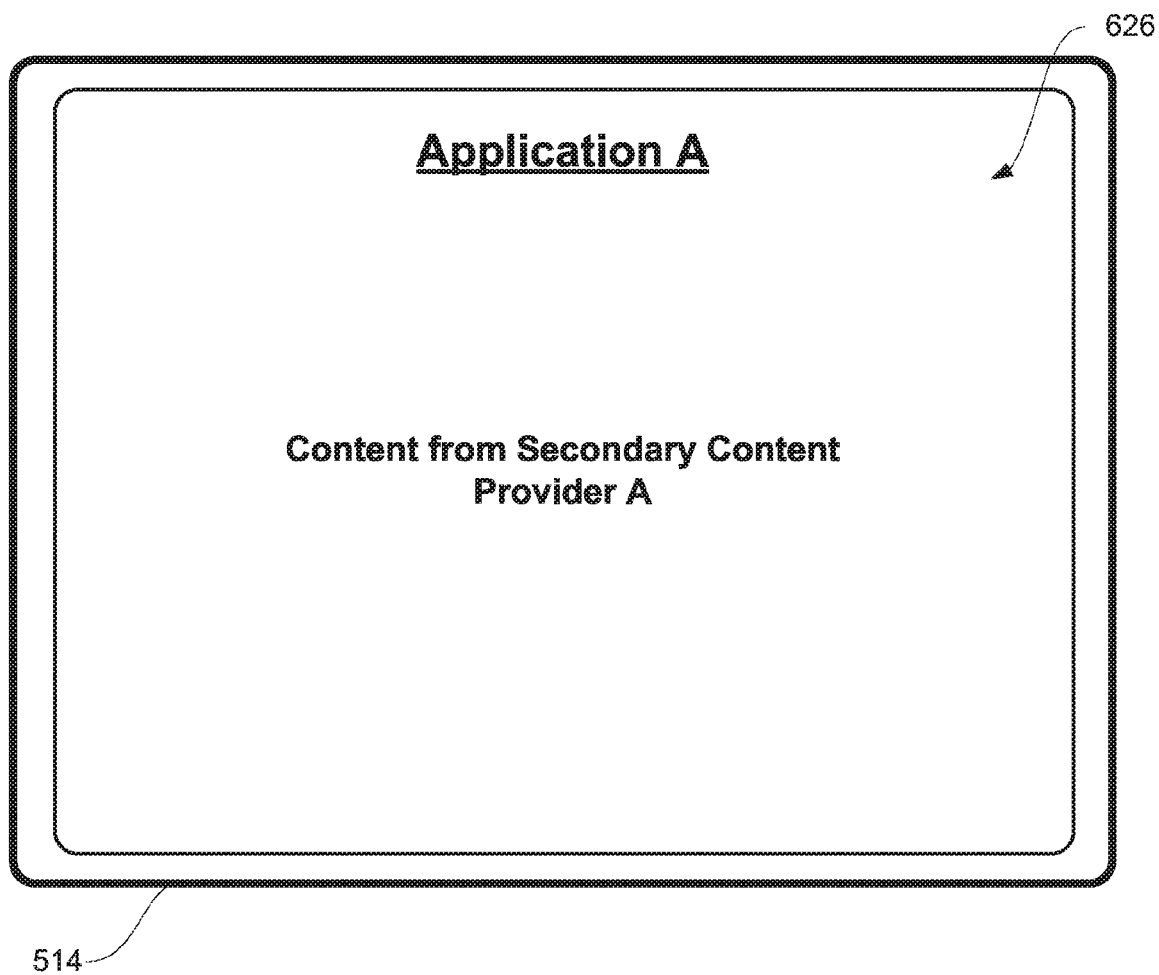
Figure 6C:
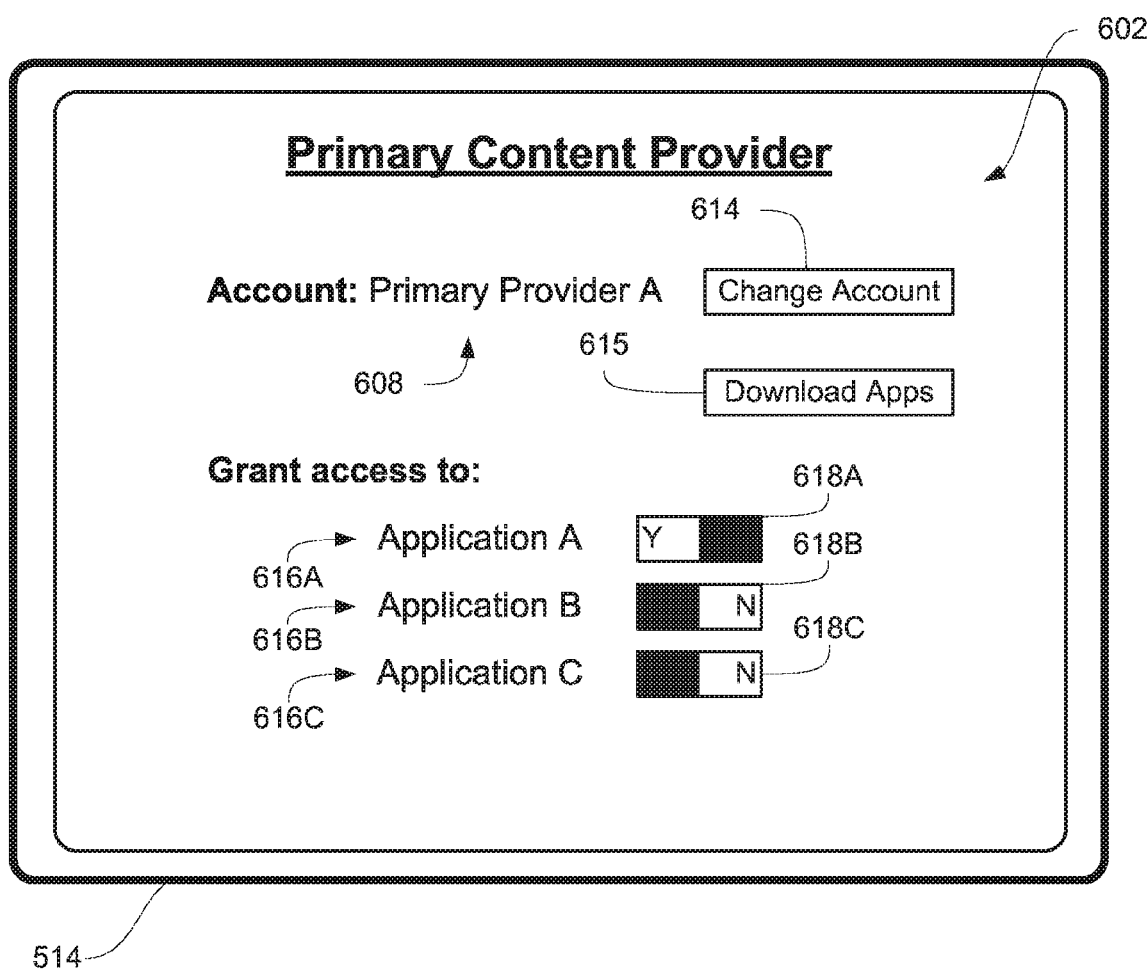
Figure 6D:
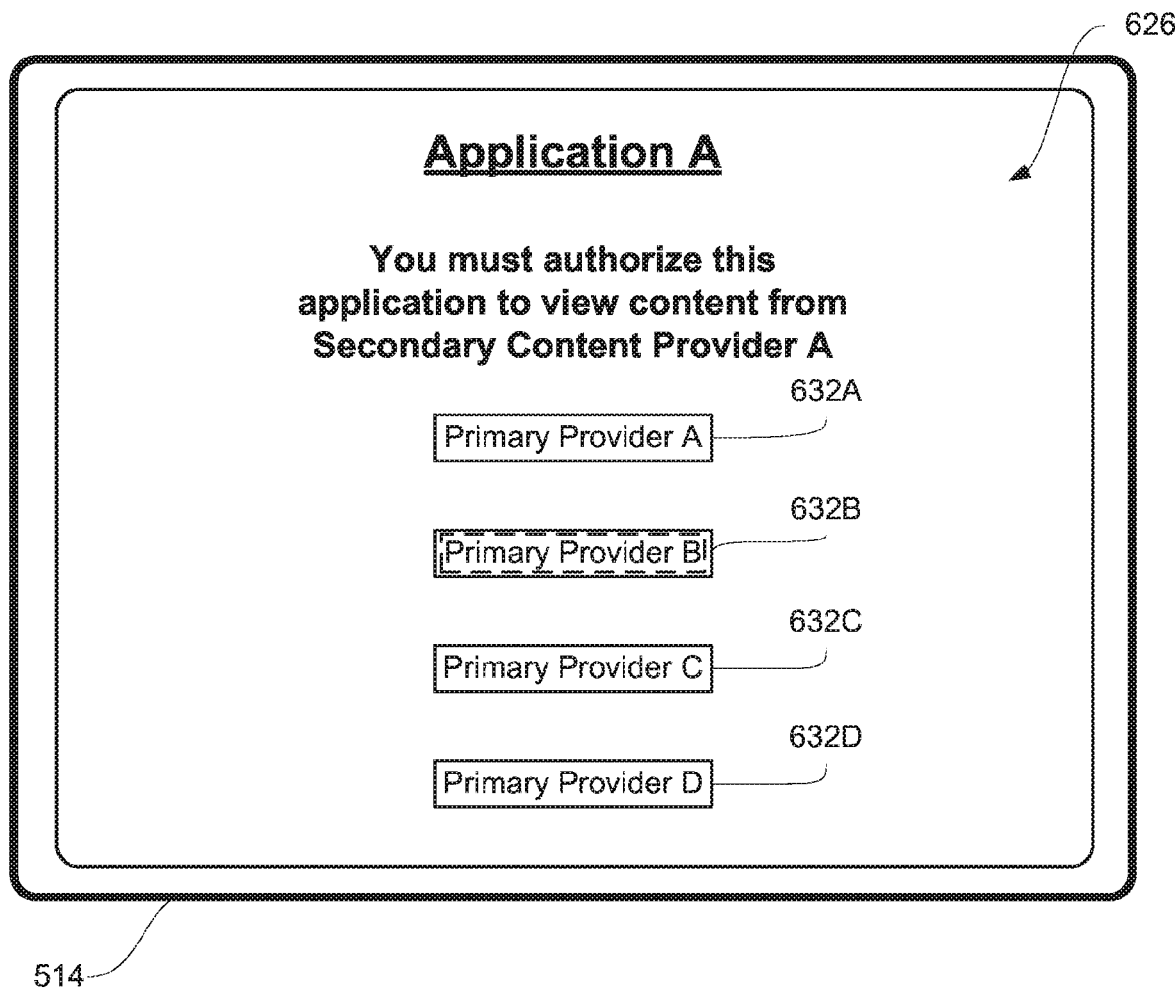
Figure 6E:
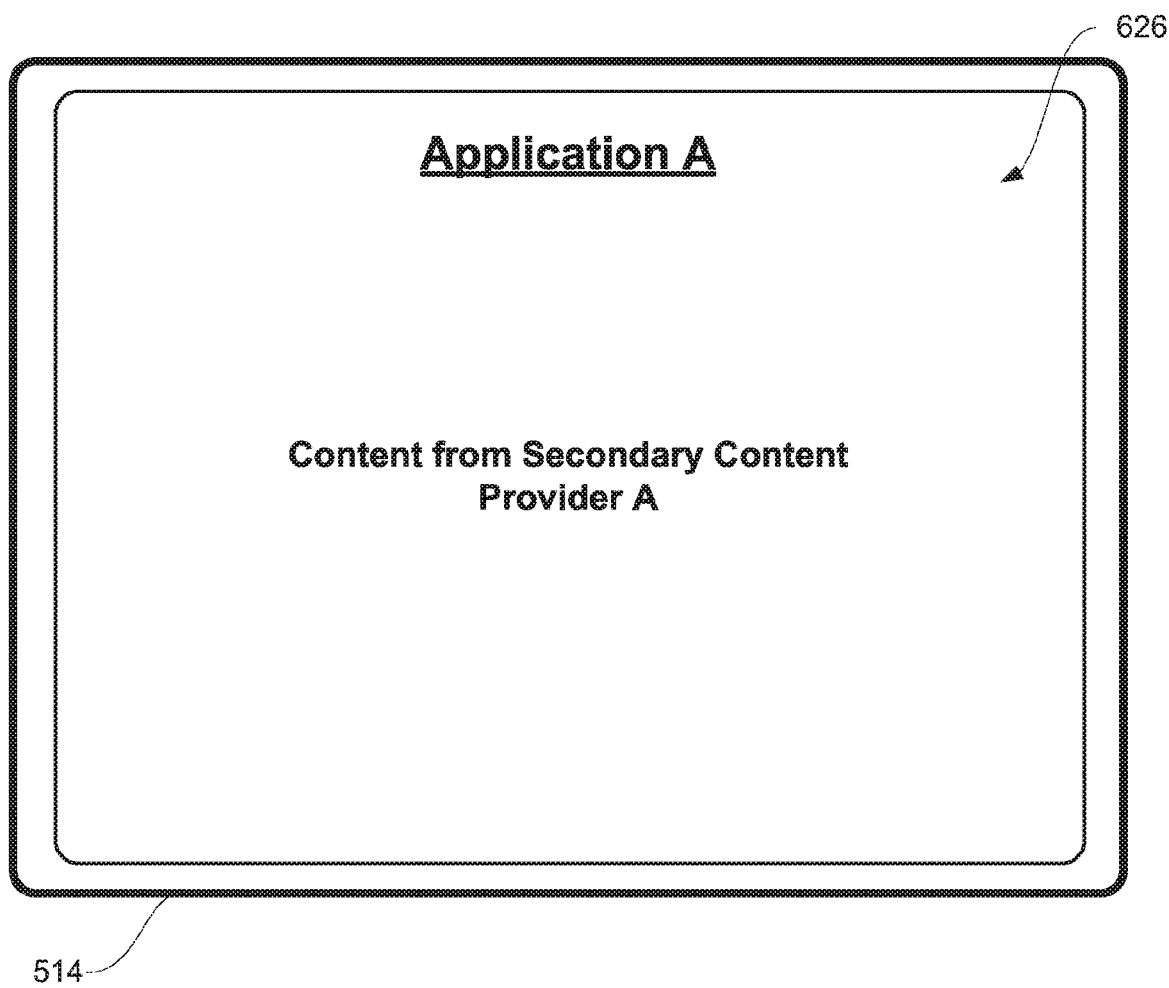
Figure 6F:
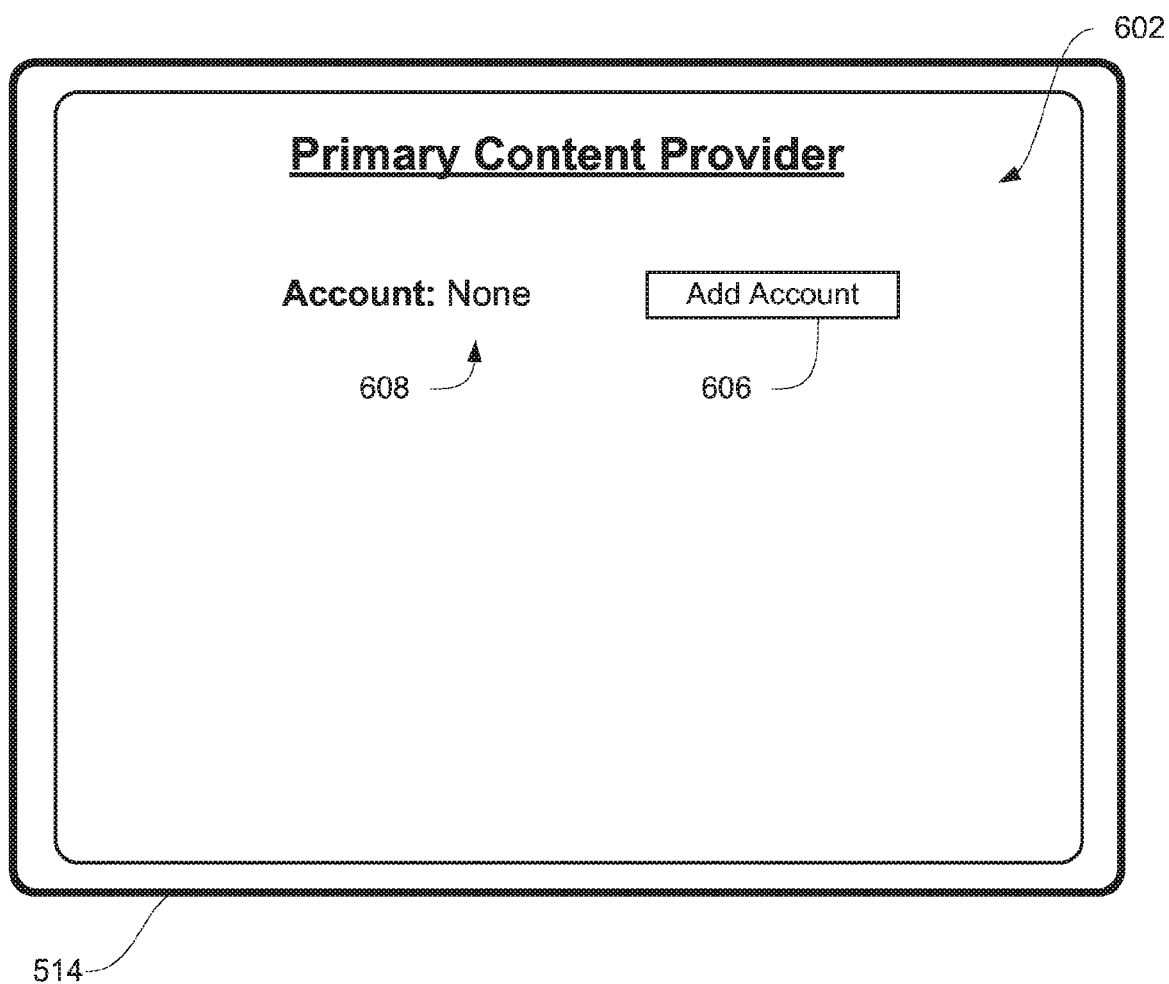
Figure 6G:
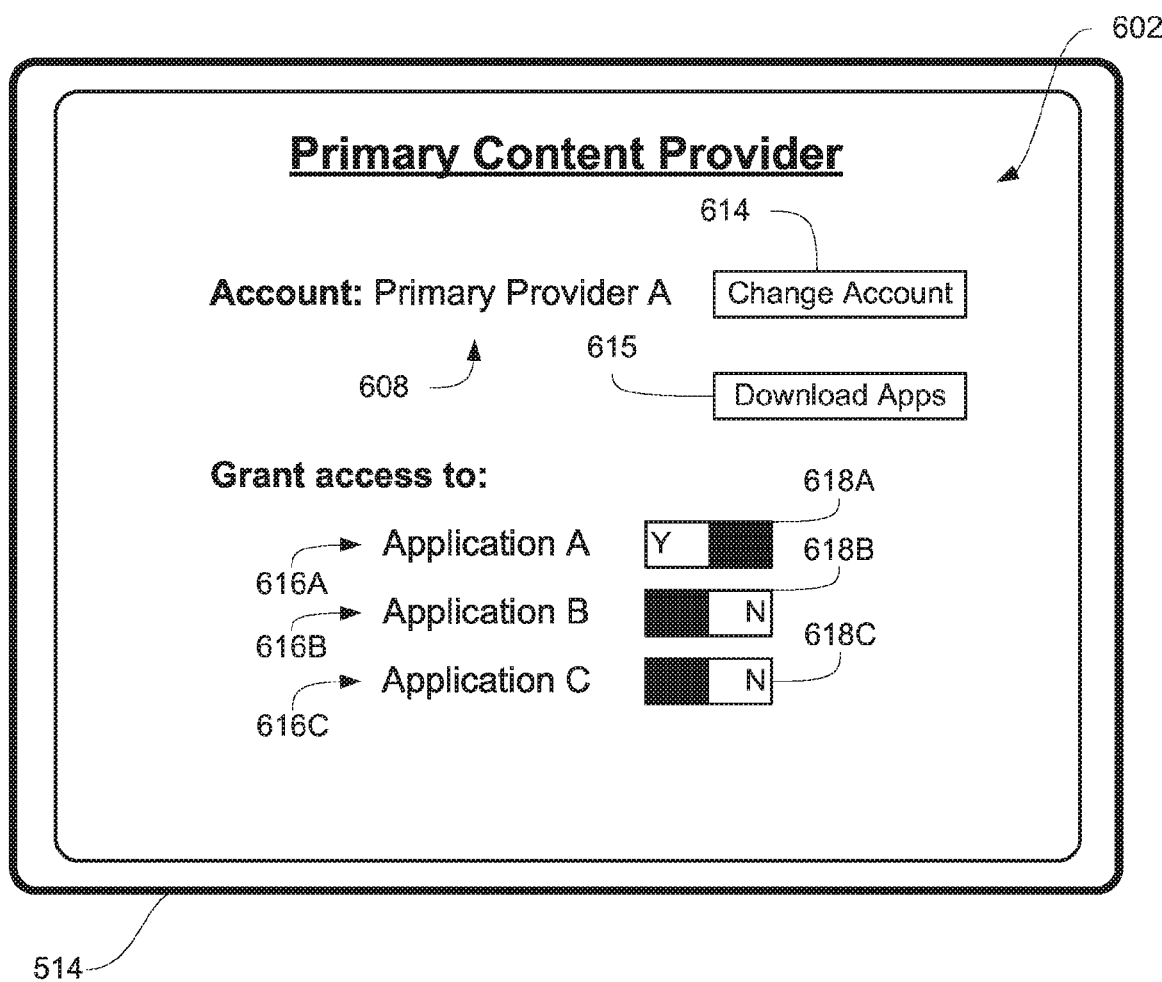
Figure 6H:
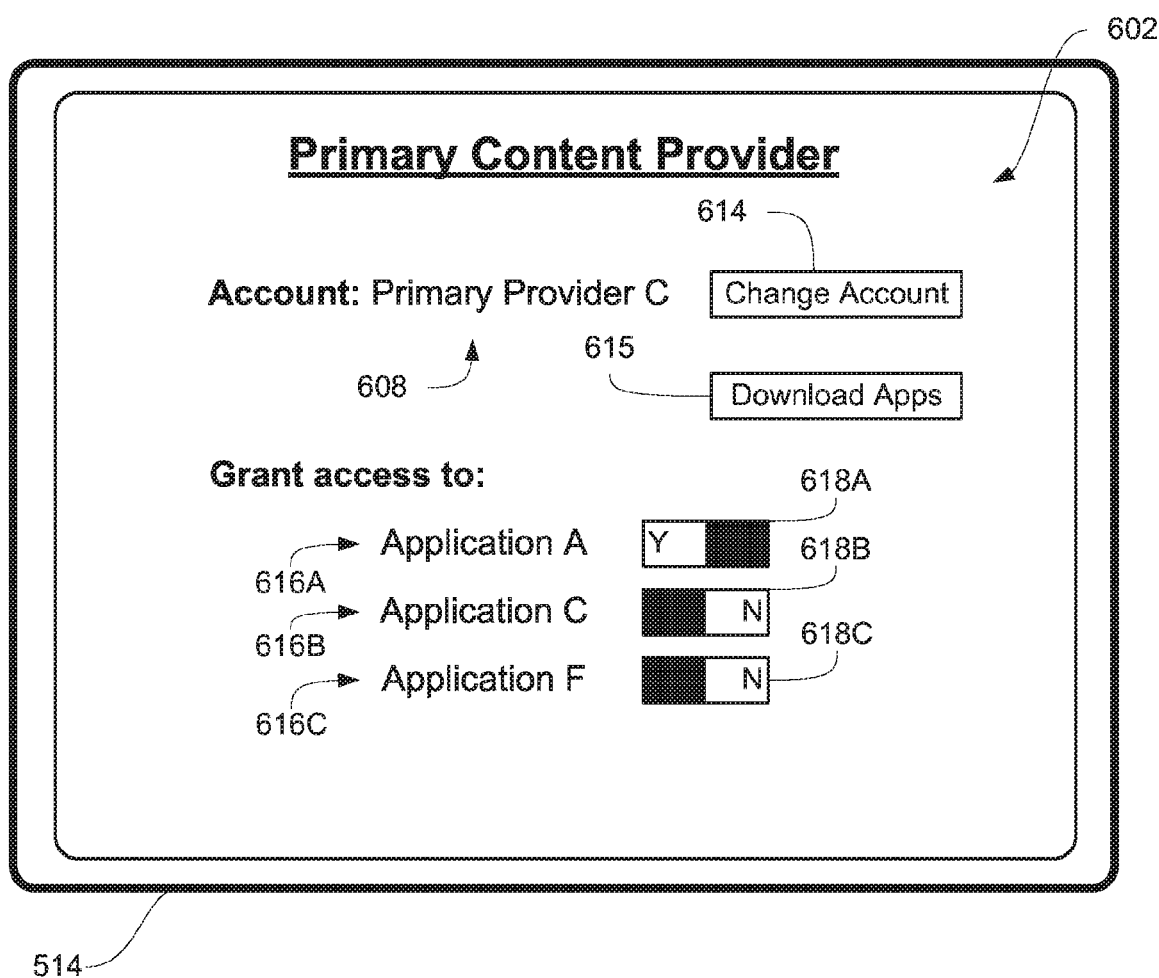
Figure 7B:
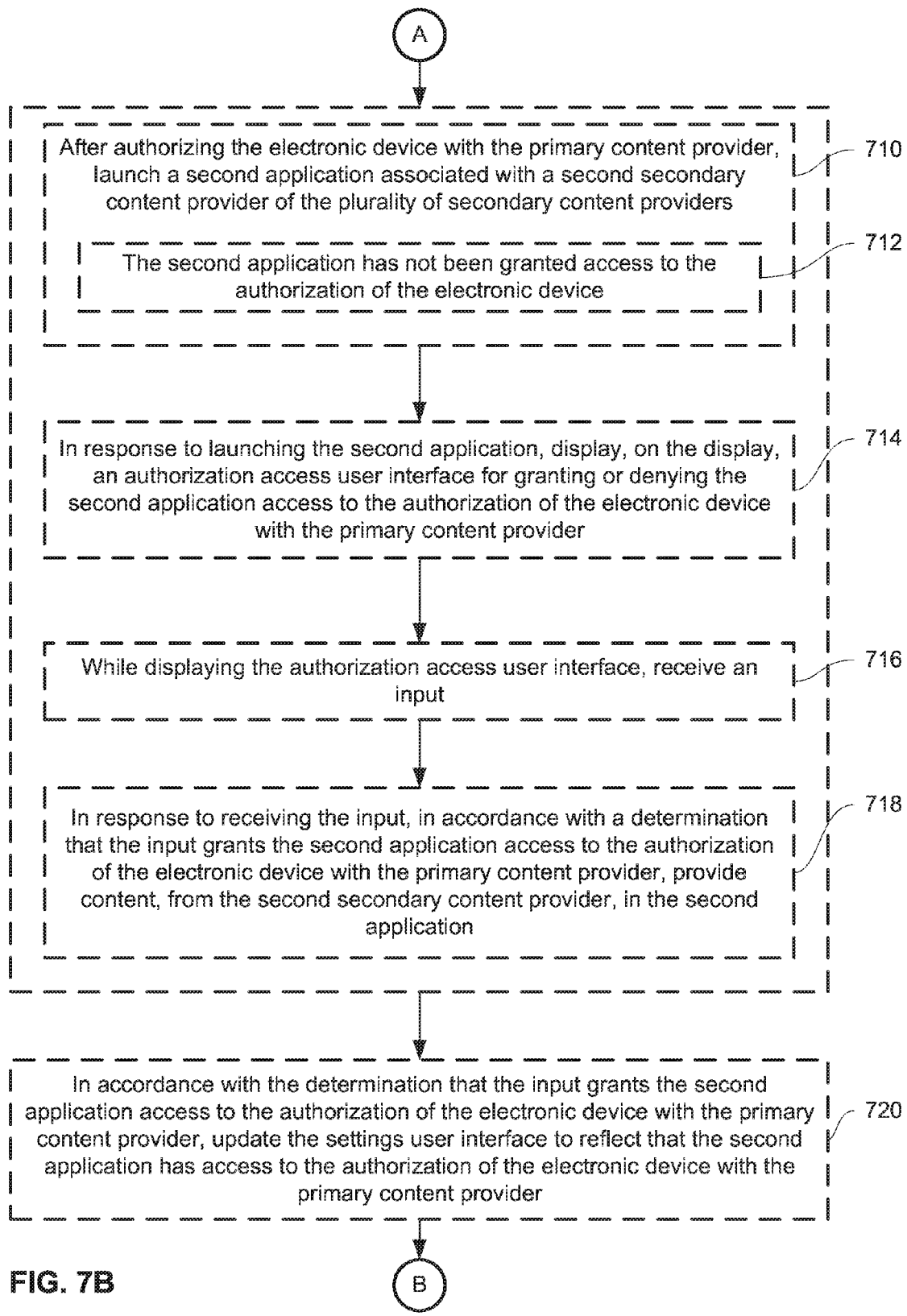
Figure 7C:
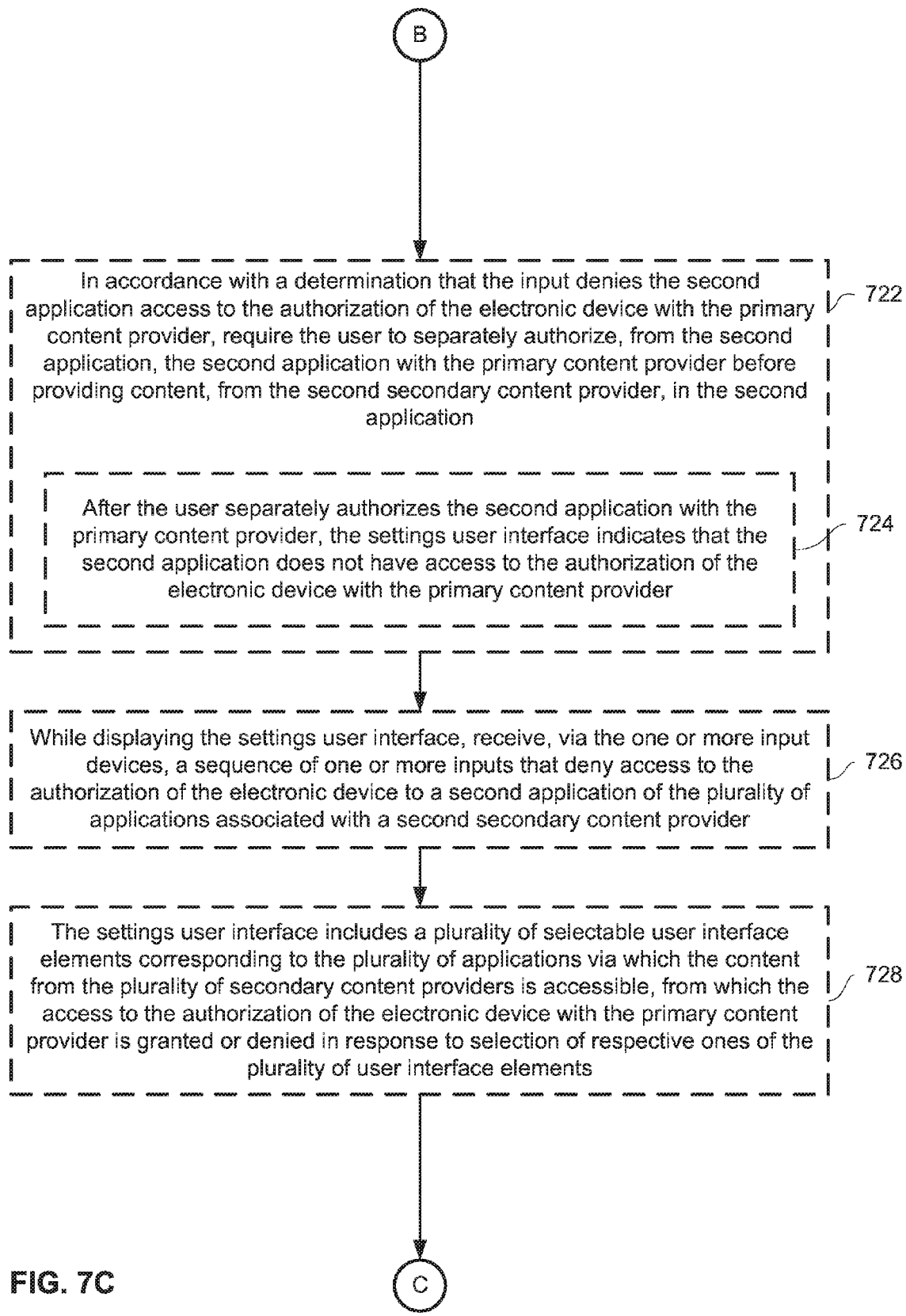
Figure 7D:
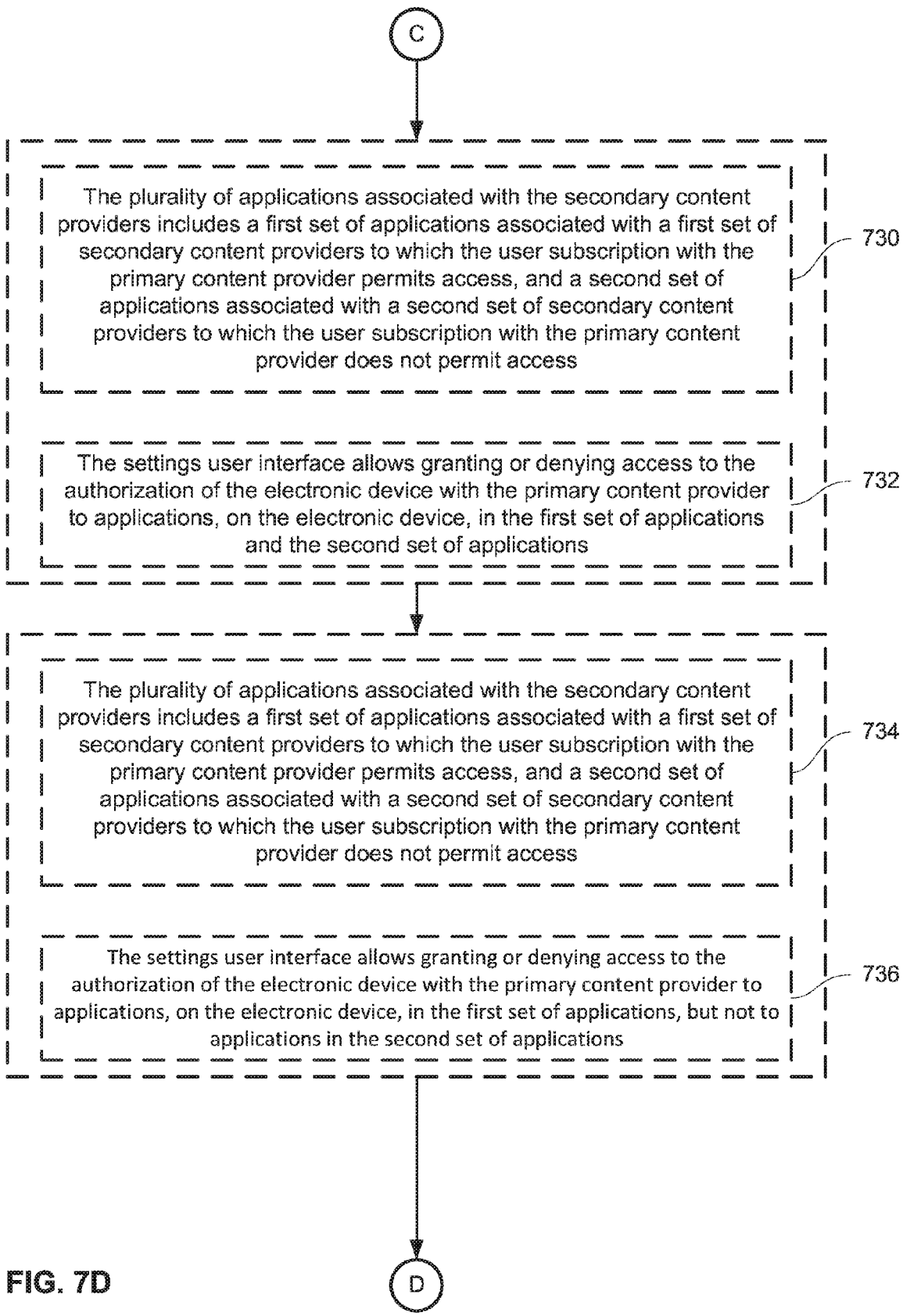
Figure 7E:
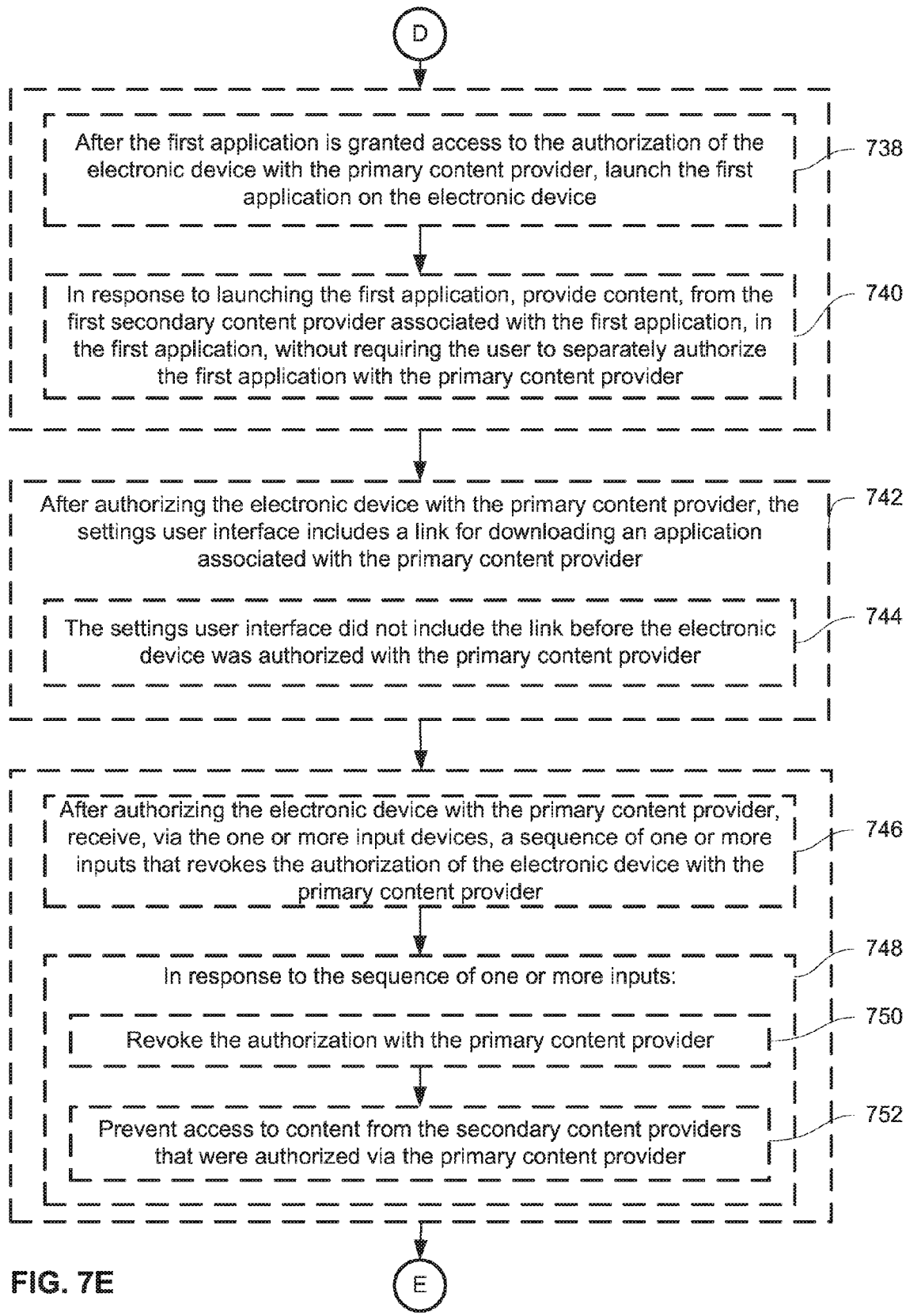
Figure 7F:
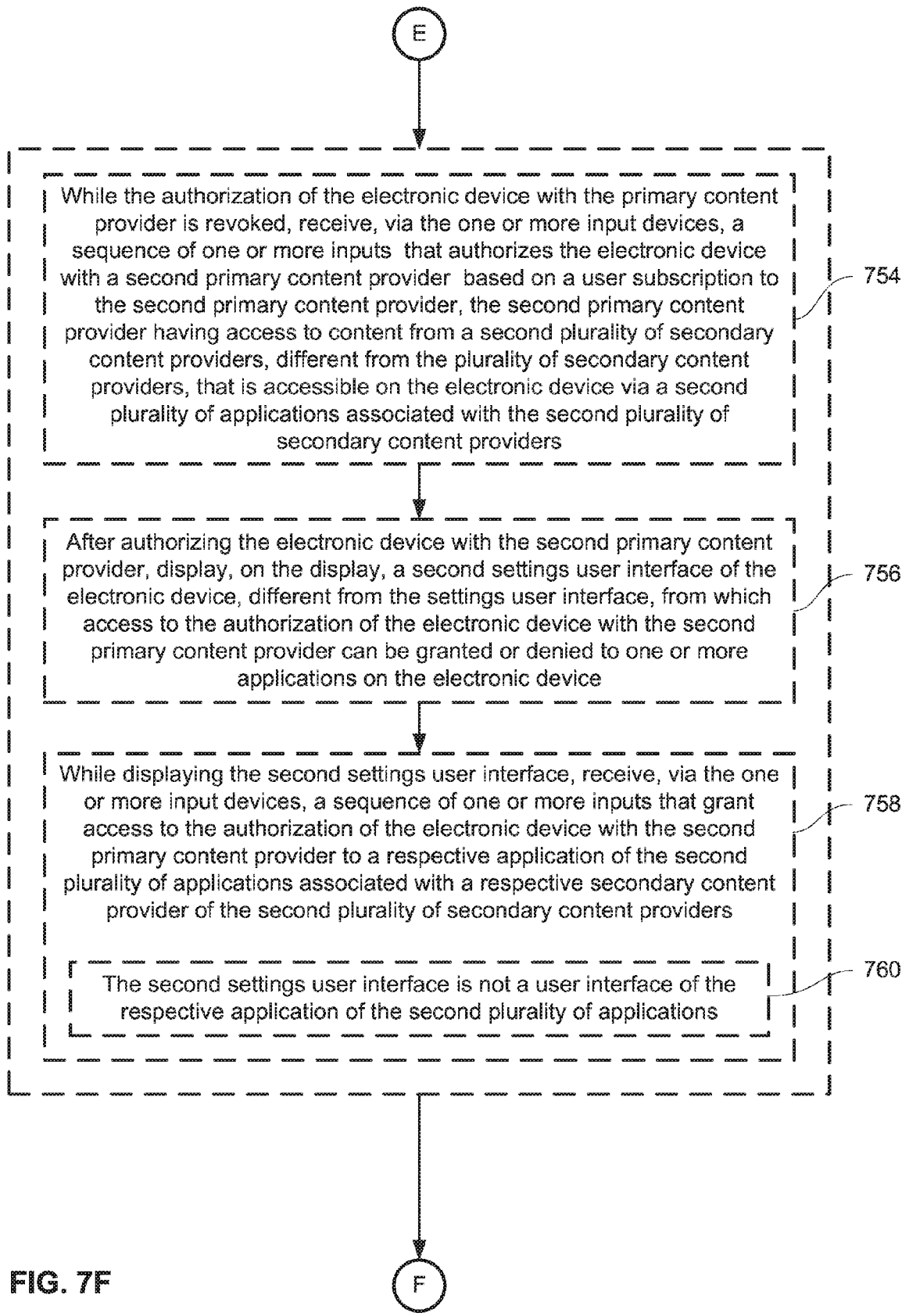
Figure 7G:
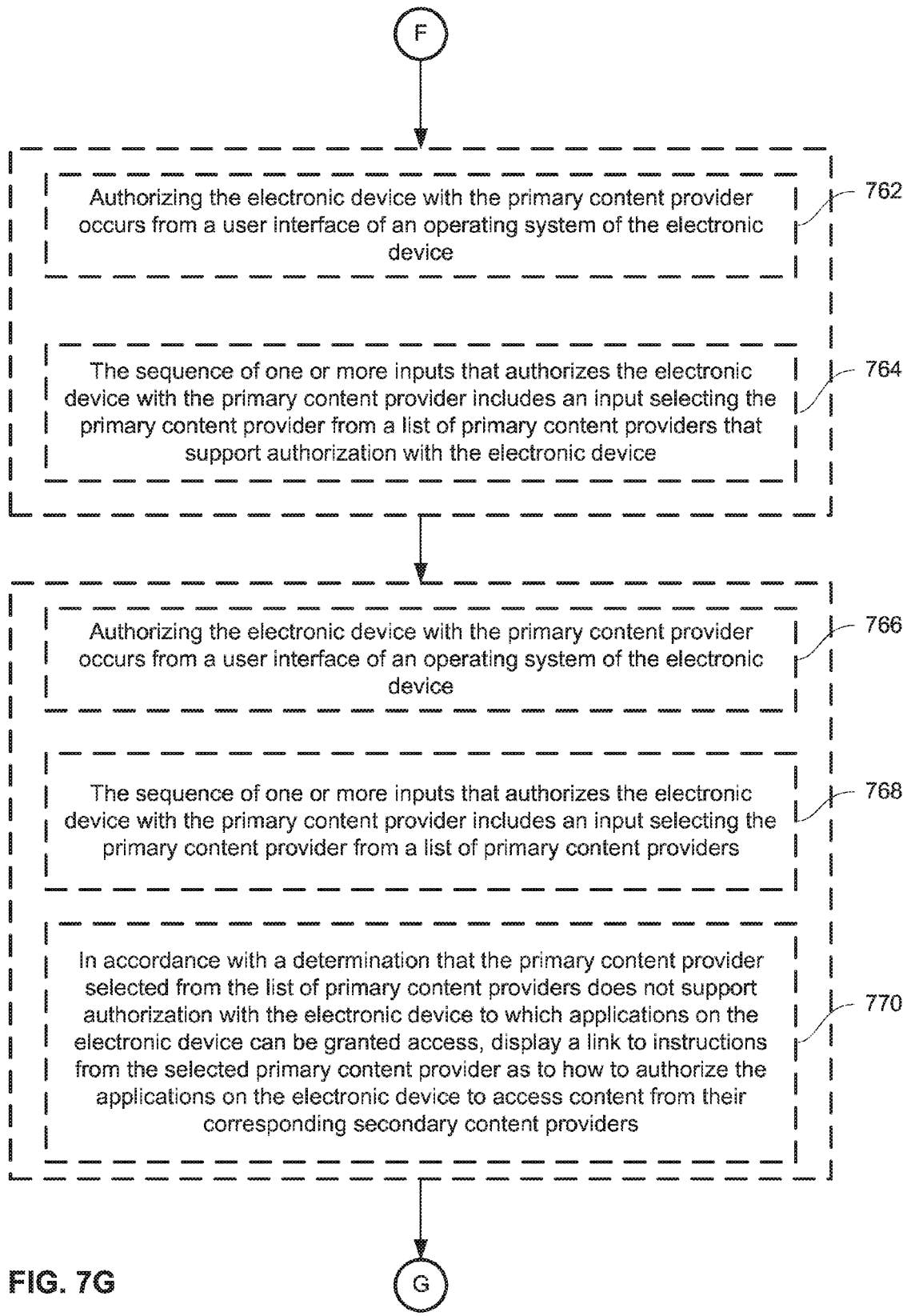
Figure 7H:
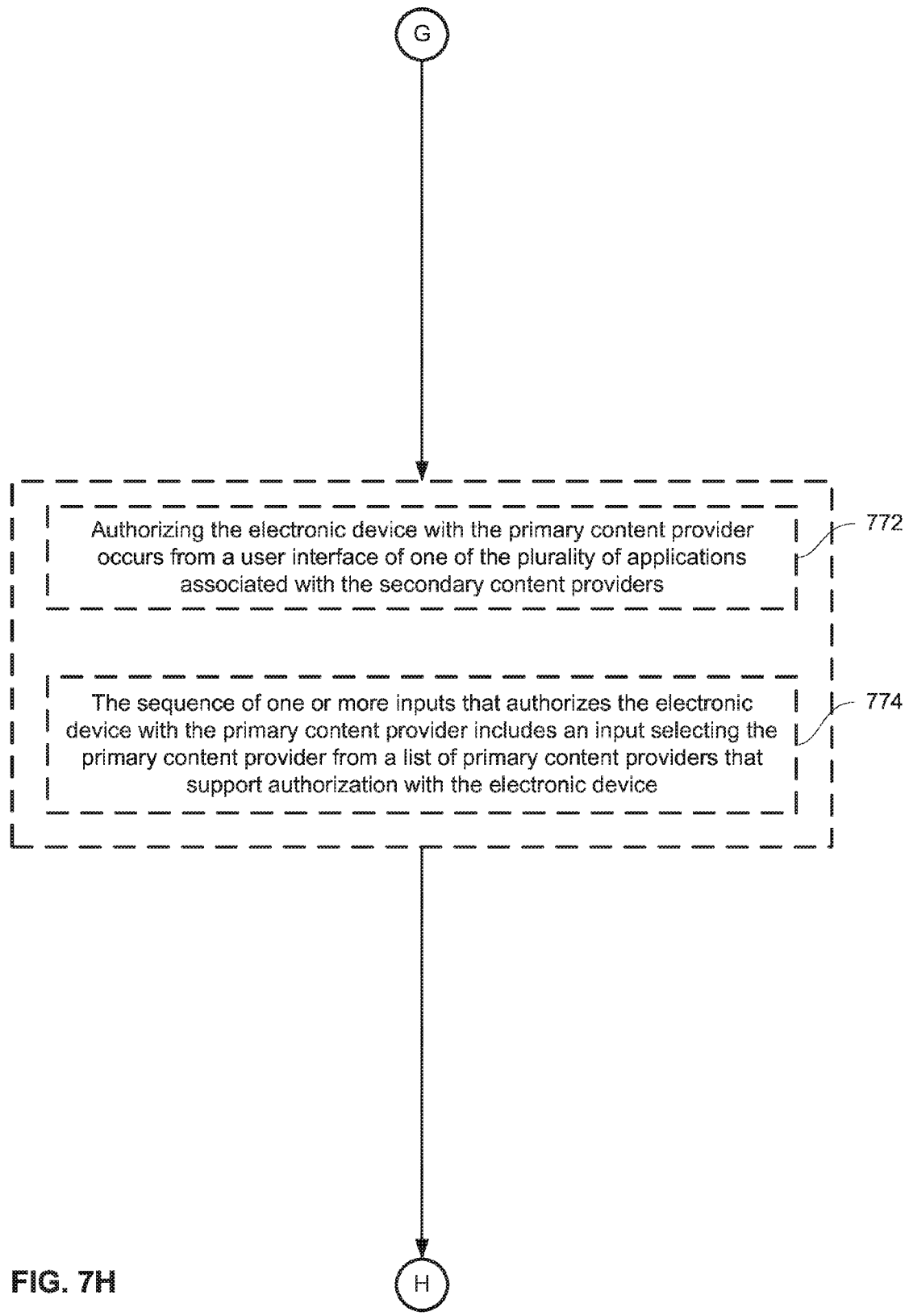
Figure 7I:
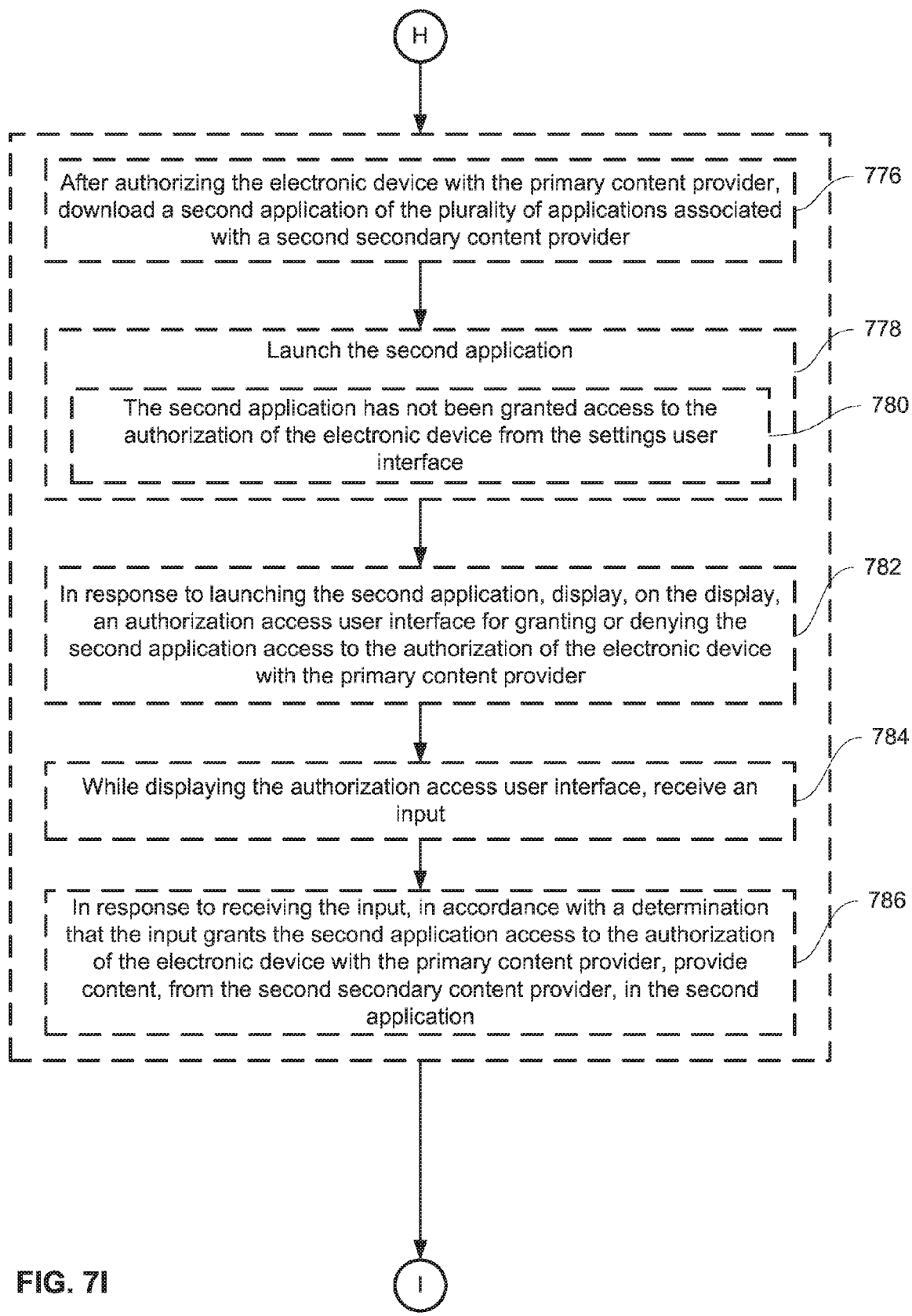
Figure 7J:
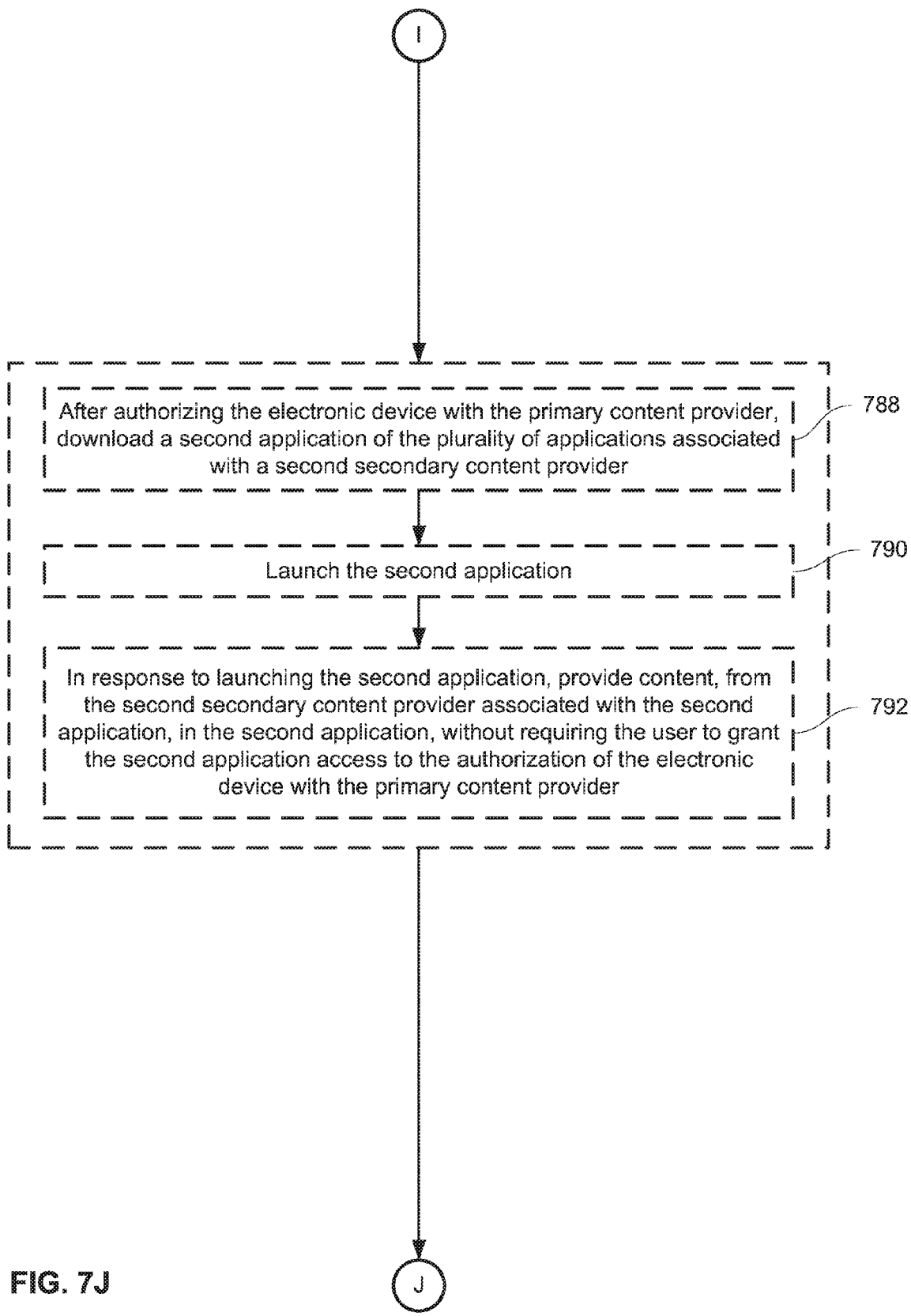
Figure 7K:
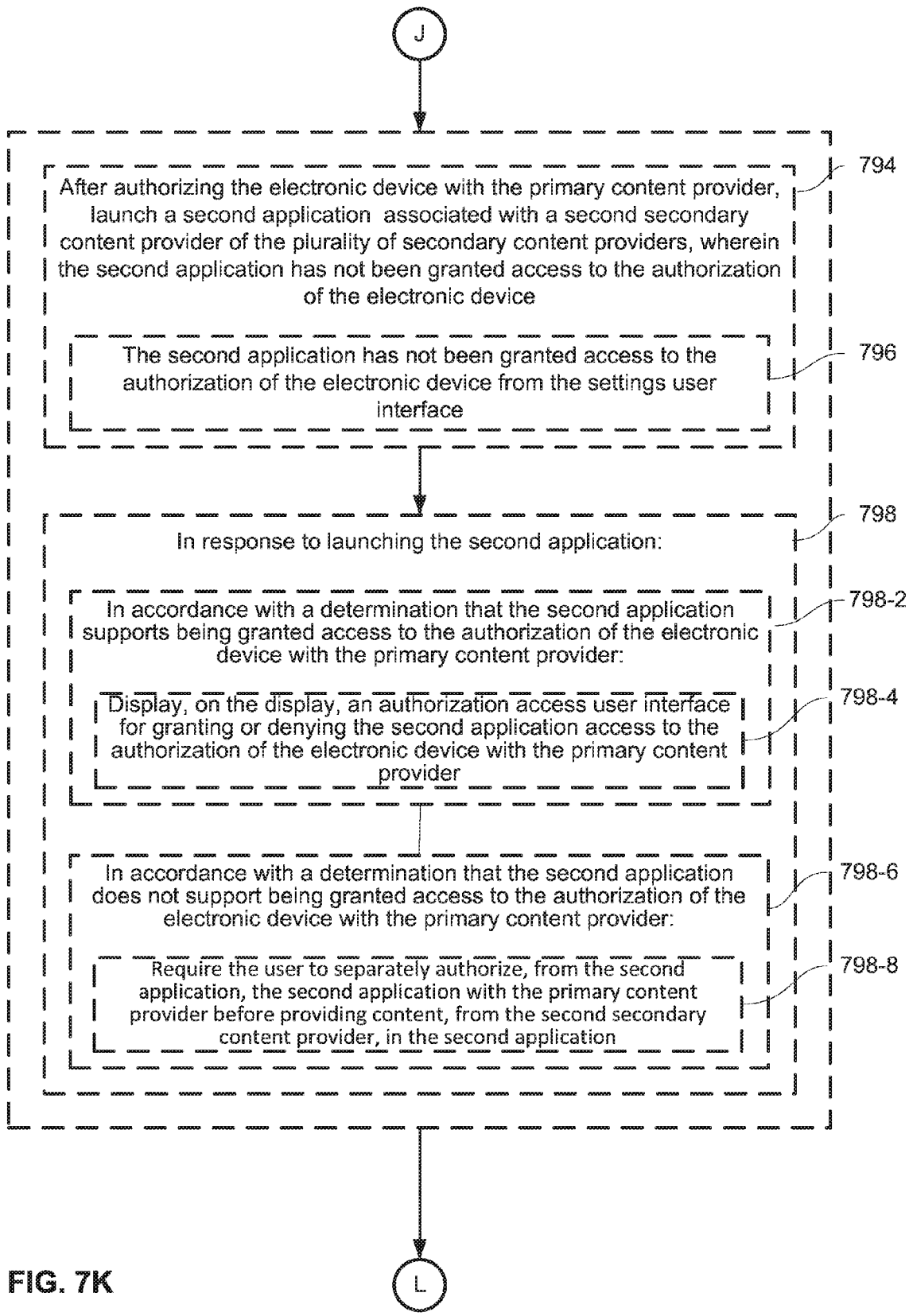
Figure 7L:
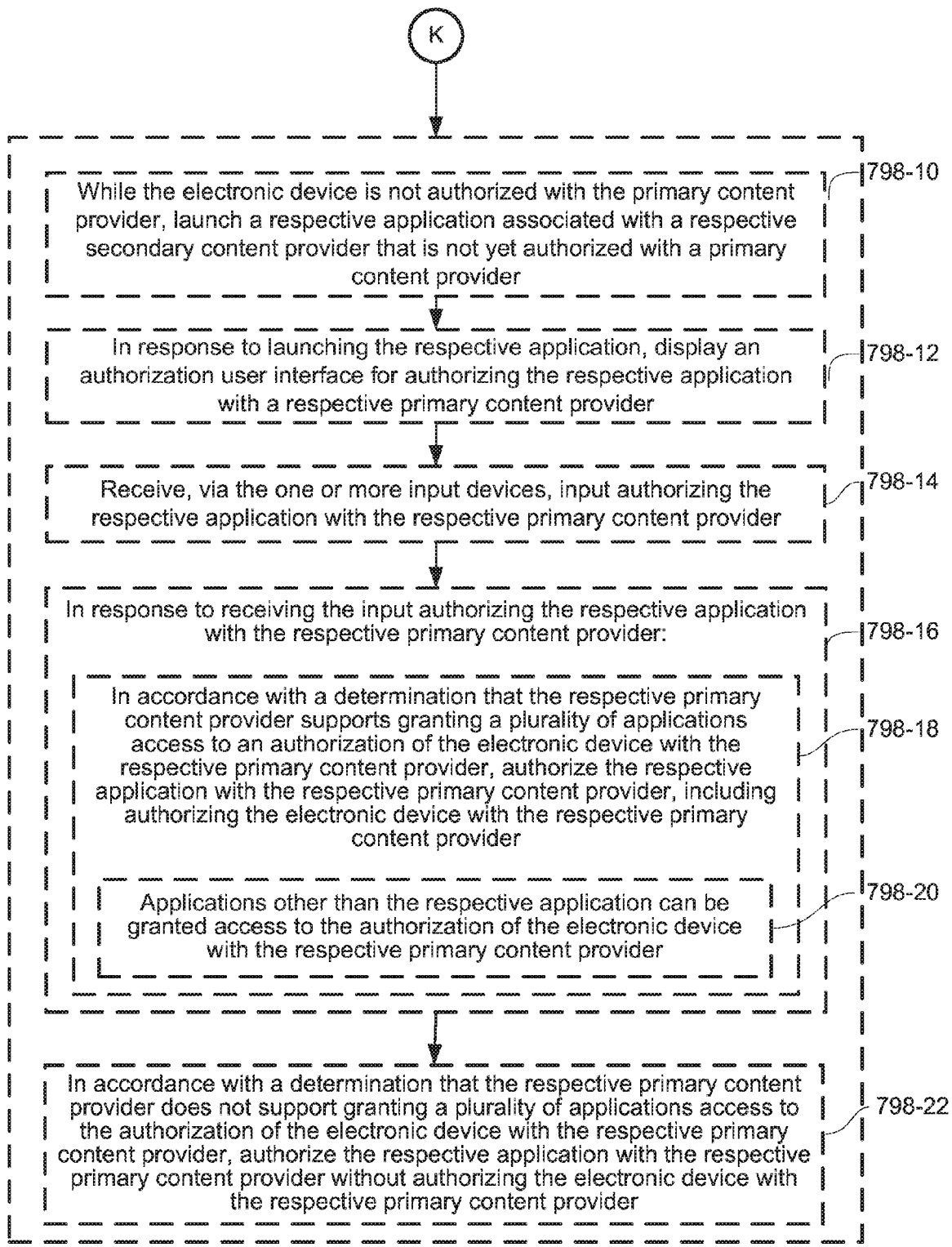

In response to the selection of icon 622A in FIG. 6Z, application A is displayed by the electronic device in FIG. 6AA. Because the electronic device is not authorized with a primary content provider, application A (or the operating system of the electronic device) optionally prompts the user to authorize application A with a primary content provider before giving the user access to content from secondary content provider A. In FIG. 6AA, application A has provided options for the user to pick from for authorizing application A with a primary content provider—namely, button 632A for authorizing with primary content provider A, button 632B for authorizing with primary content provider B, button 632C for authorizing with primary content provider C and button 632D for authorizing with primary content provider D. In FIG. 6AA, the user has selected button 632A to authorize application A with primary content provider A, which gives the user access to content from secondary content provider A, as shown in FIG. 6BB. It is understood that to authorize application A with primary content provider A, the user is optionally required to provide authentication information (e.g., a username and password) to application A, similar to as described with reference to FIG. 6D.

If primary content provider A supports granting multiple applications access to authorization of the electronic device with primary content provider A, the user's authentication of application A with primary content provider A optionally automatically authorizes the electronic device with primary content provider A, and grants application A access to that authorization, as shown in settings user interface 602 in FIG. 6CC. That authorization of the electronic device with primary content provider A is optionally utilized by application A and other applications on the electronic device to provide access to content on the electronic device, as previously described. However, if the user had authorized application A with a primary content provider that does not support granting multiple applications access to authorization of the electronic device with that primary content provider, the user's authentication of application A with that primary content provider optionally does not authorize the electronic device with that primary content provider—thus, the authorization of application A with that primary content provider would not be usable by other applications on the electronic device. For example, in FIG. 6DD, the user has selected button 632B to authorize application A with primary content provider B rather than primary content provider A, as in FIG. 6AA, which gives the user access to content from secondary content provider A, as shown in FIG. 6EE. It is understood that to authorize application A with primary content provider B, the user is optionally required to provide authentication information (e.g., a username and password) to application A, similar to as described with reference to FIG. 6D. However, primary content provider B optionally does not support granting multiple applications access to authorization of the electronic device with primary content provider B. Therefore, the user's authorization of application A with primary content provider B optionally does not authorize the electronic device with primary content provider B, as reflected in settings user interface 602 in FIG. 6FF.

In some embodiments, different primary content providers are associated with different collections of secondary content providers. As such, authorization of the electronic device with different primary content providers optionally results in the ability to grant or deny different applications access to the authorization of the electronic device with the primary content provider. For example, in FIG. 6GG, the electronic device is authorized with primary content provider A, as shown in settings user interface 602. Applications A, B and C are optionally associated with primary content provider A (e.g., primary content provider A has access to content from secondary content providers A, B and C associated with applications A, B and C, respectively). As such, settings user interface 602 in FIG. 6GG allows the user of the electronic device to grant or deny applications A, B and/or C access to the authorization of the electronic device with primary content provider A.

In FIG. 6HH, the electronic device's authorization with primary content provider A has been revoked, thus preventing the electronic device from accessing the secondary content providers associated with primary content provider A. Rather, the electronic device is authorized with primary content provider C, as shown in settings user interface 602. Applications A, C and F are optionally associated with primary content provider C (e.g., primary content provider C has access to content from secondary content providers A, C and F associated with applications A, C and F, respectively). As such, settings user interface 602 in FIG. 6HH allows the user of the electronic device to grant or deny applications A, C and/or F (a different collection of applications than applications A, B and C in FIG. 6GG) access to the authorization of the electronic device with primary content provider C.

FIGS. 7A-7L are flow diagrams illustrating a method 700 of organizing application authorization for accessing content in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of organizing application authorization for accessing content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, the method 700 is performed at an electronic device (e.g., a set-top box, a computer, etc., such as device 100, device 300 or device 500) that is in communication with a display (e.g., a television, a computer monitor, etc., such as display 514) and one or more input devices (e.g., a remote control, such as remote 510, a smartphone configured to control the electronic device, such as device 511, a wearable device configured to control the electronic device, etc.) In some embodiments, the method 700 is performed at an electronic device that includes the display and/or the one or more input devices, such as an electronic device with a touch screen (e.g., a tablet computer, a smartphone, etc.), or an electronic device (e.g., a computer) that includes a display and is in communication with an input device, such as a mouse or a trackpad). In some embodiments, the electronic device receives (702), via the one or more input devices, a sequence of one or more inputs (e.g., inputs providing user subscription credentials) that authorizes the electronic device (e.g., from an operating system UI of the electronic device) with a primary content provider (e.g., cable provider, satellite provider, etc.) based on a user subscription to the primary content provider, the primary content provider having access to content from a plurality of secondary content providers (e.g., HBO, Showtime, etc.) that is accessible on the electronic device via a plurality of applications associated with the secondary content providers (e.g., an HBO application, a Showtime application, etc.), such as in FIGS. 6C-6E. In some embodiments, after authorizing the electronic device with the primary content provider, the electronic device displays (704), on the display, a settings user interface of the electronic device (e.g., a settings UI of the operating system of the electronic device) from which access to the authorization of the electronic device with the primary content provider can be granted or denied to one or more applications on the electronic device, such as in FIG. 6E (e.g., the settings UI optionally provides toggles or other user interface elements for granting or denying individual applications access to the authorization of the electronic device). If an application is granted access to the authorization of the electronic device, that application is optionally able to display content on the electronic device. If an application is not granted access to the authorization of the electronic device, the application optionally must be individually authorized with the primary content provider in order to display content on the electronic device. In some embodiments, while displaying the settings user interface, the electronic device receives (706), via the one or more input devices, a sequence of one or more inputs that grants access to the authorization of the electronic device to a first application of the plurality of applications associated with a first secondary content provider, such as in FIG. 6F. In this way, the user is able to quickly and easily give the first application access to the authorization of the electronic device with the primary content provider, increasing the efficiency of the human-machine interface. In some embodiments, the settings user interface (708) is not a user interface of the first application, such as in FIG. 6F (e.g., the first application is authorized, via the authorization of the electronic device, to play content associated with the first secondary content provider on the electronic device).

In some embodiments, after authorizing the electronic device with the primary content provider, the electronic device launches (710) a second application (e.g., in response to a user selecting an icon for launching the second application from a home screen of the electronic device) associated with a second secondary content provider of the plurality of secondary content providers, such as in FIG. 6I. In some embodiments, the second application has not been granted (712) access to the authorization of the electronic device, such as in FIG. 6I (e.g., launching an application that has not yet been granted access to the authorization of the electronic device with the primary content provider from the settings user interface). In some embodiments, in response to launching the second application, the electronic device displays (714), on the display, an authorization access user interface for granting or denying the second application access to the authorization of the electronic device with the primary content provider, such as in FIG. 6J (e.g., a user interface that asks the user of the electronic device whether or not the user would like to allow the second application to use the authorization of the electronic device with the primary content provider to provide content from the second secondary content provider). In some embodiments, while displaying the authorization access user interface, the electronic device receives (716) an input (e.g., a user input granting or denying access to the authorization of the electronic device with the primary content provider). In some embodiments, in response to receiving the input, in accordance with a determination that the input grants the second application access to the authorization of the electronic device with the primary content provider, the electronic device provides (718) content, from the second secondary content provider, in the second application, such as in FIGS. 6J-6K (e.g., the second application is granted access to content from the second secondary content provider in response to the user granting the second application access to the authorization of the electronic device with the primary content provider). In this way, the user is able to quickly and easily access content, for which authorization is required, on the second application, increasing the efficiency of the human-machine interface. For example, the second application is optionally authorized by using stored user credentials (e.g., stored when the electronic device was authorized with the primary content provider) for authorizing the second application with the primary content provider. In some embodiments, the input does not include the credentials for the primary content provider, rather the input is just selection of a confirm option in a confirm dialogue that confirms that the secondary continent provider can access the credentials for the primary content provider (e.g., so that the user does not need to look up and input the credentials for the primary content provider).

In some embodiments, in accordance with the determination that the input grants the second application access to the authorization of the electronic device with the primary content provider, the electronic device updates (720) the settings user interface to reflect that the second application has access to the authorization of the electronic device with the primary content provider, such as in FIG. 6L (e.g., showing in the settings user interface that the second application is now authorized based on the authorization of the electronic device with the primary content provider).

In some embodiments, in accordance with a determination that the input denies the second application access to the authorization of the electronic device with the primary content provider, the electronic device requires (722) the user to separately authorize, from the second application, the second application with the primary content provider before providing content, from the second secondary content provider, in the second application, such as in FIGS. 6M-6N (e.g., because the user has not allowed the second application to utilize the authorization of the electronic device with the primary content provider, the user must separately authorize the second application with the primary content provider in order to give the second application access to content from the second secondary content provider). In some embodiments, after the user separately authorizes the second application with the primary content provider, the settings user interface indicates (724) that the second application does not have access to the authorization of the electronic device with the primary content provider, such as in FIG. 6P (e.g., even though the user has separately authorized the second application with the primary content provider, because the second application was not authorized based on the authorization of the electronic device with the primary content provider, the settings user interface indicates that the second application does not have access to the authorization of the electronic device).

In some embodiments, while displaying the settings user interface, the electronic device receives (726), via the one or more input devices, a sequence of one or more inputs that deny access to the authorization of the electronic device to a second application of the plurality of applications associated with a second secondary content provider (e.g., the second application is not authorized, via the authorization of the electronic device, to play content associated with the second secondary content provider on the electronic device). In some embodiments, the settings user interface includes (728) a plurality of selectable user interface elements (e.g., toggles) corresponding to the plurality of applications via which the content from the plurality of secondary content providers is accessible, from which the access to the authorization of the electronic device with the primary content provider is granted or denied in response to selection of respective ones of the plurality of user interface elements, such as in FIG. 6E (e.g., each application is displayed next to a toggle, and each toggle is enabled or disabled to grant or deny, respectively, the corresponding application access to the authorization of the electronic device with the primary content provider). In this way, the user is able to quickly and easily grant or deny applications access to the authorization of the electronic device with the primary content provider, increasing the efficiency of the human-machine interface.

In some embodiments, the plurality of applications associated with the secondary content providers (e.g., all of the applications associated with all of the secondary content providers, the content of which the primary content provider has access) includes (730) a first set of applications associated with a first set of secondary content providers to which the user subscription with the primary content provider permits access (e.g., the subset of secondary content providers to which the user's subscription to the primary content provider grants access), and a second set of applications associated with a second set of secondary content providers to which the user subscription with the primary content provider does not permit access, such as in FIG. 6Q (e.g., the subset of secondary content providers to which the user's subscription to the primary content provider does not grant access). For example, a user's subscription to a primary content provider may be a lower-tiered subscription that allows access to content from fewer secondary content providers, or a higher-tired subscription that allows access to content from greater secondary content providers. In some embodiments, the settings user interface allows (732) granting or denying access to the authorization of the electronic device with the primary content provider to applications, on the electronic device, in the first set of applications and the second set of applications, such as in FIG. 6Q (e.g., the settings user interface displays user interface elements for granting or denying access to the authorization of the electronic device to applications on the electronic device, regardless of whether the user subscription to the primary content provider permits access to content associated with those applications).

In some embodiments, the plurality of applications associated with the secondary content providers (e.g., all of the applications associated with all of the secondary content providers, the content of which the primary content provider has access) includes (734) a first set of applications associated with a first set of secondary content providers to which the user subscription with the primary content provider permits access (e.g., the subset of secondary content providers to which the user's subscription to the primary content provider grants access), and a second set of applications associated with a second set of secondary content providers to which the user subscription with the primary content provider does not permit access, such as in FIG. 6Q (e.g., the subset of secondary content providers to which the user's subscription to the primary content provider does not grant access). For example, a user's subscription to a primary content provider may be a lower-tiered subscription that allows access to content from fewer secondary content providers, or a higher-tired subscription that allows access to content from greater secondary content providers. In some embodiments, the settings user interface allows (736) granting or denying access to the authorization of the electronic device with the primary content provider to applications, on the electronic device, in the first set of applications, but not to applications in the second set of applications, such as in FIG. 6R (e.g., the settings user interface displays user interface elements for granting or denying access to the authorization of the electronic device to only those applications on the electronic device to which the user subscription to the primary content provider permits access).

In some embodiments, after the first application is granted access to the authorization of the electronic device with the primary content provider (e.g., via the settings user interface), the electronic device launches (738) the first application on the electronic device, such as in FIG. 6G (e.g., in response to a user selecting an icon for launching the first application from a home screen of the electronic device). In some embodiments, in response to launching the first application, the electronic device provides (740) content, from the first secondary content provider associated with the first application, in the first application, without requiring the user to separately authorize the first application with the primary content provider, such as in FIG. 6H (e.g., once an application is granted access to the authorization of the electronic device with the primary content provider from the settings user interface, the application does not need to be separately authorized with the primary content provider to have access to the content associated with the application). In this way, the user is able to quickly and easily access content, for which authorization is required, on the first application, increasing the efficiency of the human-machine interface.

In some embodiments, after authorizing the electronic device with the primary content provider, the settings user interface includes (742) a link for downloading an application associated with the primary content provider, such as in FIG. 6E (e.g., an application associated with a cable or satellite provider). In this way, the user is able to quickly and easily download an application for viewing content that is authorized via the primary content provider, increasing the efficiency of the human-machine interface. In some embodiments, the settings user interface did not include (744) the link before the electronic device was authorized with the primary content provider, such as in FIG. 6B (e.g., once the electronic device is authorized with a particular primary content provider, a link is added to the settings user interface for downloading that primary content provider's application).

In some embodiments, after authorizing the electronic device with the primary content provider, the electronic device receives (746), via the one or more input devices, a sequence of one or more inputs that revokes the authorization of the electronic device with the primary content provider (e.g., inputs that "log out" the electronic device from the primary content provider). In some embodiments, in response (748) to the sequence of one or more inputs the electronic device revokes (750) the authorization with the primary content provider and prevents (752) access to content from the secondary content providers that were authorized via the primary content provider, such as discussed with reference to FIGS. 6GG-6HH.

In some embodiments, while the authorization of the electronic device with the primary content provider is revoked, the electronic device receives (754), via the one or more input devices, a sequence of one or more inputs (e.g., inputs providing user subscription credentials) that authorizes the electronic device (e.g., from an operating system UI of the electronic device) with a second primary content provider (e.g., cable provider, satellite provider, etc.) based on a user subscription to the second primary content provider, the second primary content provider having access to content from a second plurality of secondary content providers (e.g., HBO, Showtime, etc.), different from the plurality of secondary content providers (e.g., the secondary content providers associated with the primary content provider), that is accessible on the electronic device via a second plurality of applications associated with the second plurality of secondary content providers, such as in FIG. 6HH (e.g., an HBO application, a Showtime application, etc.). In this way, the user is able to quickly and easily switch primary content provider authorizations on the electronic device, increasing the efficiency of the human-machine interface. In some embodiments, after authorizing the electronic device with the second primary content provider, the electronic device displays (756), on the display, a second settings user interface of the electronic device (e.g., a settings UI of the operating system of the electronic device), different from the settings user interface, from which access to the authorization of the electronic device with the second primary content provider can be granted or denied to one or more applications on the electronic device, such as in FIG. 6HH (e.g., the settings UI is optionally primary content provider-specific, in that the settings UI of the electronic device optionally looks different, and has different content, depending on with which primary content provider the electronic device is authorized). In some embodiments, while displaying the second settings user interface, the electronic device receives (758), via the one or more input devices, a sequence of one or more inputs that grant access to the authorization of the electronic device with the second primary content provider to a respective application of the second plurality of applications associated with a respective secondary content provider of the second plurality of secondary content providers, such as in FIG. 6HH. In some embodiments, the second settings user interface (760) is not a user interface of the respective application of the second plurality of applications, such as in FIG. 6HH (e.g., the respective application is authorized, via the authorization of the electronic device, to play content associated with the respective secondary content provider on the electronic device).

In some embodiments, authorizing the electronic device with the primary content provider occurs (762) from a user interface of an operating system of the electronic device, such as in FIGS. 6B-6D (e.g., from the settings user interface, which is a user interface of the operating system of the electronic device, and not a user interface of an application for viewing content from the secondary content providers). In some embodiments, the sequence of one or more inputs that authorizes (764) the electronic device with the primary content provider includes an input selecting the primary content provider from a list of primary content providers that support authorization with the electronic device, such as in FIG. 6C (e.g., not all primary content providers allow for an electronic device to be authorized with that primary content provider, and subsequently for applications to be granted access to that authorization of the electronic device with the primary content provider). Therefore, in some embodiments, in the course of authorizing the electronic device with the primary content provider, the electronic device presents the user with a list of primary content providers that do support the above, and from which the user is able to select a primary content provider with which to authorize the electronic device.

In some embodiments, authorizing the electronic device with the primary content provider occurs (766) from a user interface of an operating system of the electronic device, such as in FIGS. 6B-6D. In this way, the user is able to quickly and easily initiate authorizations for viewing content on the electronic device from the operating system of the electronic device, increasing the efficiency of the human-machine interface. In some embodiments, the sequence of one or more inputs that authorizes the electronic device with the primary content provider includes (768) an input selecting the primary content provider from a list of primary content providers, such as in FIG. 6C. In some embodiments, in accordance with a determination that the primary content provider selected from the list of primary content providers does not support authorization with the electronic device to which applications on the electronic device can be granted access, the electronic device displays (770) a link to instructions from the selected primary content provider (e.g., on the primary content provider's website) as to how to authorize the applications on the electronic device to access content from their corresponding secondary content providers, such as described with reference to FIG. 6C.

In some embodiments, authorizing the electronic device with the primary content provider occurs (772) from a user interface of one of the plurality of applications associated with the secondary content providers, such as in FIG. 6AA (e.g., authorization of the electronic device with the primary content provider is optionally accomplished from a user interface of an application for viewing content from the secondary content providers). In some embodiments, the sequence of one or more inputs that authorizes the electronic device with the primary content provider includes (774) an input selecting the primary content provider from a list of primary content providers that support authorization with the electronic device, such as in FIG. 6AA (e.g., not all primary content providers allow for an electronic device to be authorized with that primary content provider, and subsequently for applications to be granted access to that authorization of the electronic device with the primary content provider). Therefore, in some embodiments, in the course of authorizing the electronic device with the primary content provider, the electronic device presents the user with a list of primary content providers that do support the above, and from which the user is able to select a primary content provider with which to authorize the electronic device.

In some embodiments, after authorizing the electronic device with the primary content provider, the electronic device downloads (776) a second application of the plurality of applications associated with a second secondary content provider, such as in FIG. 6S (e.g., downloading an application after authorizing the electronic device with the primary content provider, the application associated with a secondary content provider, different from the first secondary content provider, from which the primary content provider has access to content). In some embodiments, the electronic device launches (778) the second application (e.g., in response to a user selecting an icon for launching the second application from a home screen of the electronic device). In some embodiments, the second application has not been granted (780) access to the authorization of the electronic device from the settings user interface (e.g., launching an application that has not yet been granted access to the authorization of the electronic device with the primary content provider from the settings user interface). In some embodiments, in response to launching the second application, the electronic device displays (782), on the display, an authorization access user interface for granting or denying the second application access to the authorization of the electronic device with the primary content provider, such as in FIG. 6J (e.g., a user interface that asks the user of the electronic device whether or not the user would like to allow the second application to use the authorization of the electronic device with the primary content provider to provide content from the second secondary content provider, optionally without requiring the user to input the credentials for the primary content provider). Therefore, in some embodiments, applications downloaded after the electronic device has been authorized with the primary content provider are not automatically authorized with the primary content provider, and must, instead, be explicitly authorized by the user, such as in FIG. 6T. In some embodiments, while displaying the authorization access user interface, the electronic device receives (784) an input (e.g., a user input granting or denying access to the authorization of the electronic device with the primary content provider). In some embodiments, in response to receiving the input, in accordance with a determination that the input grants the second application access to the authorization of the electronic device with the primary content provider, the electronic device provides (786) content, from the second secondary content provider, in the second application, such as in FIG. 6K (e.g., the second application is granted access to content from the second secondary content provider in response to the user granting the second application access to the authorization of the electronic device with the primary content provider). For example, the second application is optionally authorized by using stored user credentials (e.g., stored when the electronic device was authorized with the primary content provider) for authorizing the second application with the primary content provider.

In some embodiments, after authorizing the electronic device with the primary content provider, the electronic device downloads (788) a second application of the plurality of applications associated with a second secondary content provider, such as in FIG. 6S (e.g., downloading an application after authorizing the electronic device with the primary content provider, the application associated with a secondary content provider, different from the first secondary content provider, from which the primary content provider has access to content). In some embodiments, the electronic device launches (790) the second application (e.g., in response to a user selecting an icon for launching the second application from a home screen of the electronic device; for example, launching an application that has not yet been granted access to the authorization of the electronic device with the primary content provider from the settings user interface). In some embodiments, in response to launching the second application, the electronic device provides (792) content, from the second secondary content provider associated with the second application, in the second application, without requiring the user to grant the second application access to the authorization of the electronic device with the primary content provider, such as in FIG. 6H (e.g., applications downloaded after the electronic device has been authorized with the primary content provider are automatically authorized with the primary content provider, and user input doing so is not required, such as in FIG. 6U).

In some embodiments, after authorizing the electronic device with the primary content provider, the electronic device launches (794) a second application (e.g., in response to a user selecting an icon for launching the second application from a home screen of the electronic device) associated with a second secondary content provider of the plurality of secondary content providers, such as in FIG. 6V. In some embodiments, the second application has not been granted (796) access to the authorization of the electronic device (e.g., launching an application that has not yet been granted access to the authorization of the electronic device with the primary content provider from the settings user interface). In some embodiments, in response (798) to launching the second application, in accordance with a determination (798-2) that the second application supports being granted access to the authorization of the electronic device with the primary content provider (e.g., if the second application is able to utilize the authorization of the electronic device with the primary content provider to gain access to content from the second secondary content provider), the electronic device displays (798-4), on the display, an authorization access user interface for granting or denying the second application access to the authorization of the electronic device with the primary content provider, such as in FIG. 6J (e.g., a user interface that asks the user of the electronic device whether or not the user would like to allow the second application to use the authorization of the electronic device with the primary content provider to provide content from the second secondary content provider). In some embodiments, in accordance with a determination (798-6) that the second application does not support being granted access to the authorization of the electronic device with the primary content provider (e.g., if the second application is not able to utilize the authorization of the electronic device with the primary content provider to gain access to content from the second secondary content provider, but rather requires its own separate authorization with the primary content provider to gain such access), the electronic device requires (798-8) the user to separately authorize, from the second application, the second application with the primary content provider before providing content, from the second secondary content provider, in the second application, such as in FIG. 6W (e.g., because the second application does not support utilizing the authorization of the electronic device with the primary content provider, the user must separately authorize the second application with the primary content provider in order to give the second application access to content from the second secondary content provider).

In some embodiments, while the electronic device is not authorized with the primary content provider (e.g., before the electronic device was authorized with the primary content provider, or after the authorization with the primary content provider has been revoked), the electronic device launches (798-10) a respective application (e.g., in response to a user selecting an icon for launching the respective application from a home screen of the electronic device) associated with a respective secondary content provider that is not yet authorized with a primary content provider, such as in FIG. 6Z (e.g., launching an application that has not yet been authorized with a primary content provider to provide access to content from the respective secondary content provider). In some embodiments, in response to launching the respective application, the electronic device displays (798-12) an authorization user interface for authorizing the respective application with a respective primary content provider, such as in FIG. 6AA (e.g., a user interface for selecting and providing user subscription credentials for a primary content provider). In some embodiments, the electronic device receives (798-14), via the one or more input devices, input authorizing the respective application with the respective primary content provider, such as in FIG. 6AA (e.g., input providing user subscription credentials for the respective primary content provider). In some embodiments, in response (798-16) to receiving the input authorizing the respective application with the respective primary content provider, in accordance with a determination that the respective primary content provider supports granting a plurality of applications access to an authorization of the electronic device with the respective primary content provider (e.g., if the respective primary content provider allows for a single authorization of the electronic device with the primary content provider to be shared by multiple applications to access content on those applications), the electronic device authorizes (798-18) the respective application with the respective primary content provider, including authorizing the electronic device with the respective primary content provider, such as in FIG. 6BB. In some embodiments, applications other than the respective application can be granted (798-20) access to the authorization of the electronic device with the respective primary content provider (e.g., multiple applications, including the respective application, are able to utilize the authorization of the electronic device resulting from the authorization of the respective application with the respective primary content provider). In some embodiments, in accordance with a determination that the respective primary content provider does not support granting a plurality of applications access to the authorization of the electronic device with the respective primary content provider (e.g., if the respective primary content provider does not allow for a single authorization of the electronic device with the primary content provider to be shared by multiple applications to access content on those applications), the electronic device authorizes (798-22) the respective application with the respective primary content provider without authorizing the electronic device with the respective primary content provider, such as in FIGS. 6DD-6FF (e.g., only the respective application is authorized with the respective primary content provider). The electronic device is optionally not authorized with the respective primary content provider, and other applications are optionally not able to utilize the authorization of the respective application with the respective primary content provider.

It should be understood that the particular order in which the operations in FIGS. 7A-7L have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7L. For example, the authorizations, applications, content, operating systems, primary content providers and settings user interfaces described above with reference to method 700 optionally has one or more of the characteristics of the authorizations, applications, content, operating systems, primary content providers and settings user interfaces described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A, 10 and 11) or application specific chips. Further, the operations described above with reference to FIGS. 7A-7L are, optionally, implemented by components depicted in FIGS. 1A-1B. For example, receiving operations 702 and 706, and displaying operation 704 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Application Download Prompting

Users interact with electronic devices in many different manners, including interacting with content (e.g., music, movies, etc.) that may be available (e.g., stored or otherwise accessible) on the electronic devices. In some circumstances, a user may authorize an electronic device with a primary content provider that gives the user access to content from multiple secondary content providers and associated applications. The embodiments described below provide ways in which electronic devices prompt a user to download one or more content-viewing applications that are associated with the primary content provider with which the user authorized the electronic devices, thereby enhancing users' interactions with the electronic devices. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
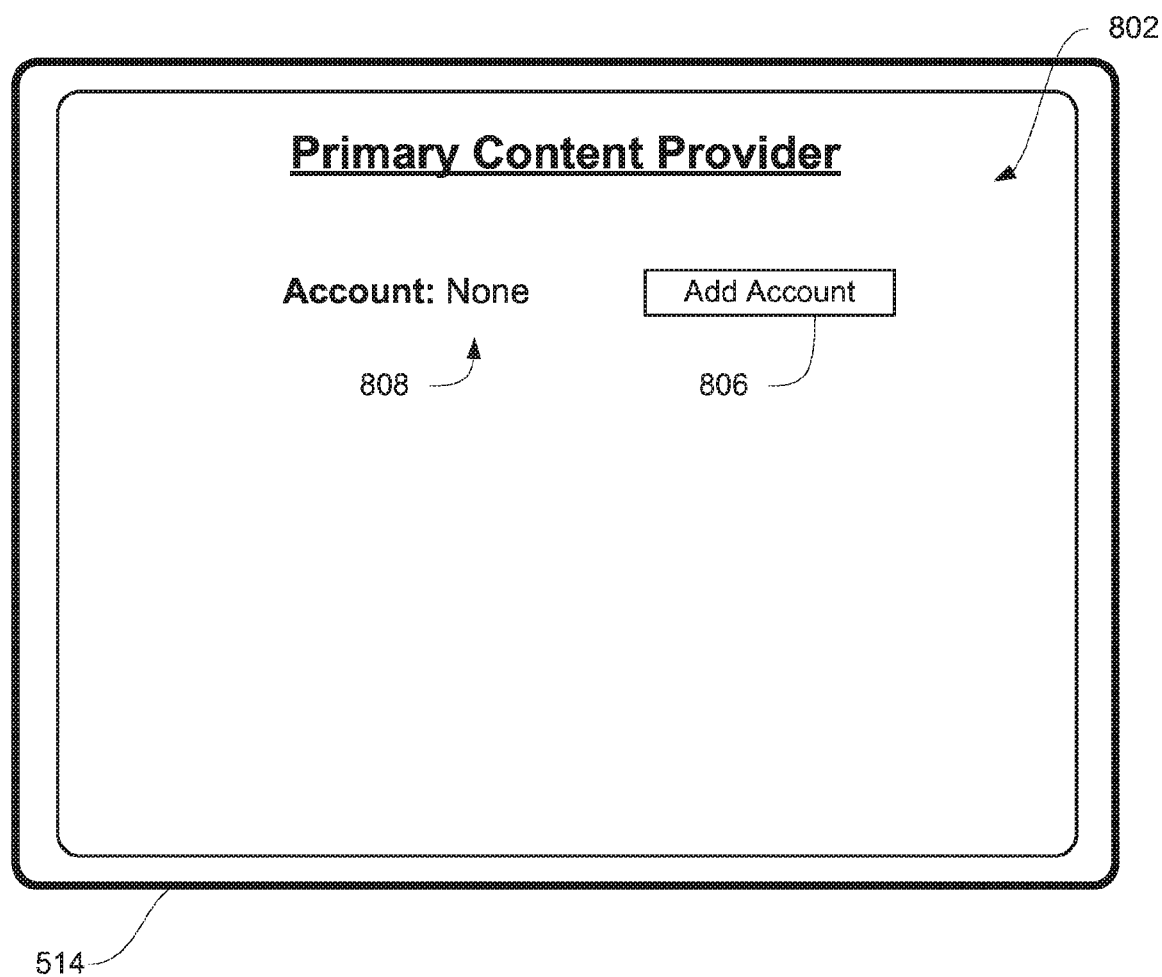
FIGS. 8A-8N illustrate exemplary ways in which an electronic device prompts a user to download one or more applications for viewing content based on authorization of the electronic device to view the content in accordance with some embodiments of the disclosure.
Figure 8B:
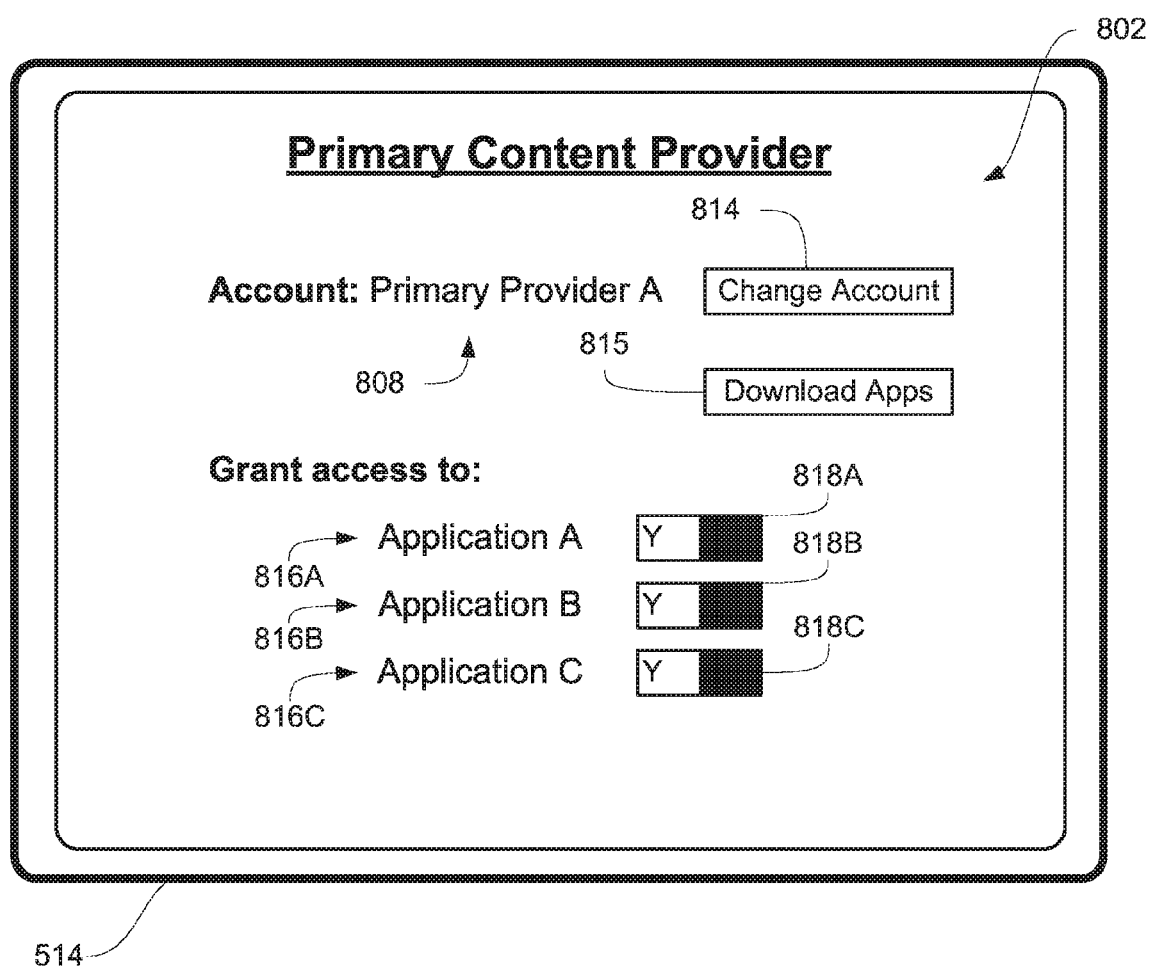
Figure 8C:
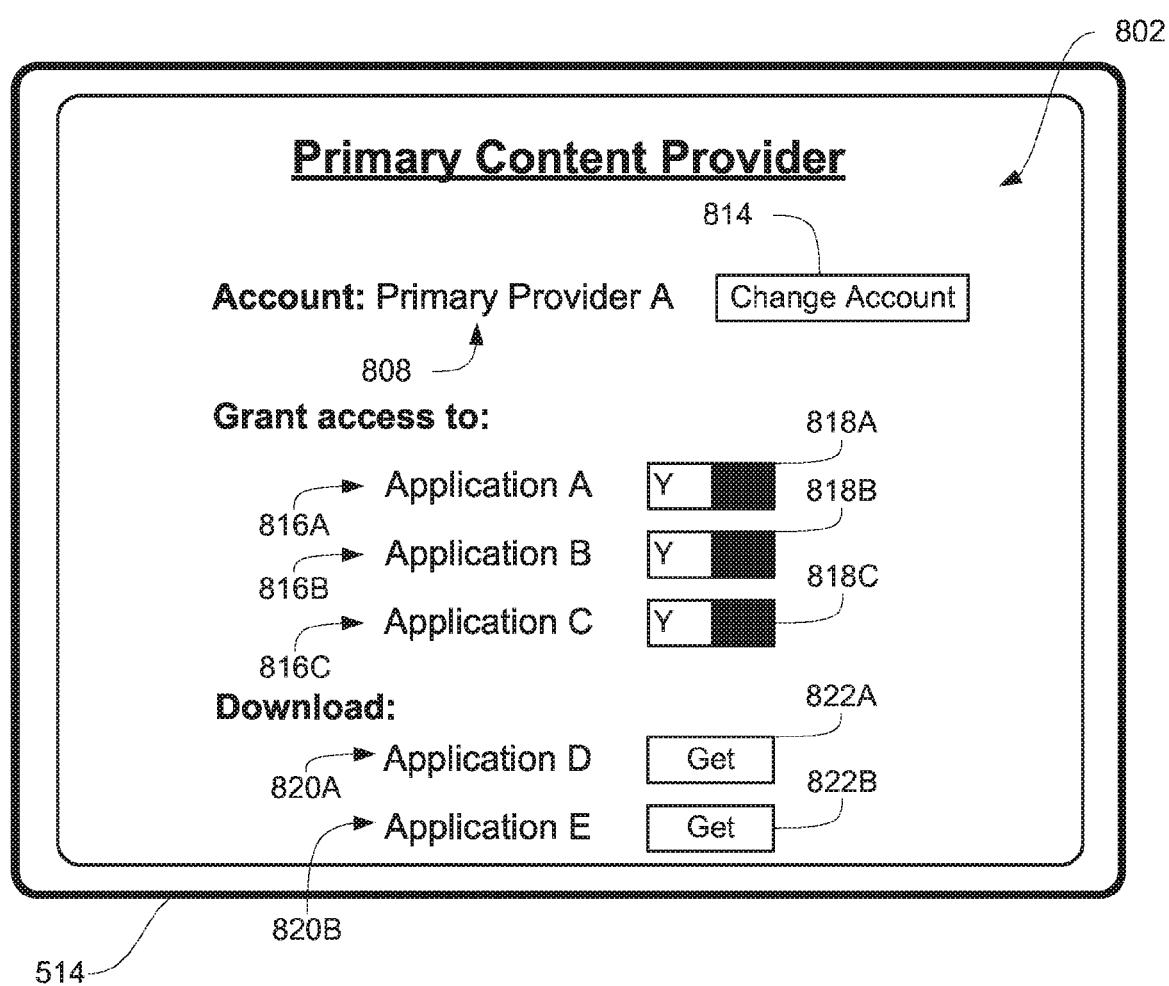
Figure 8D:
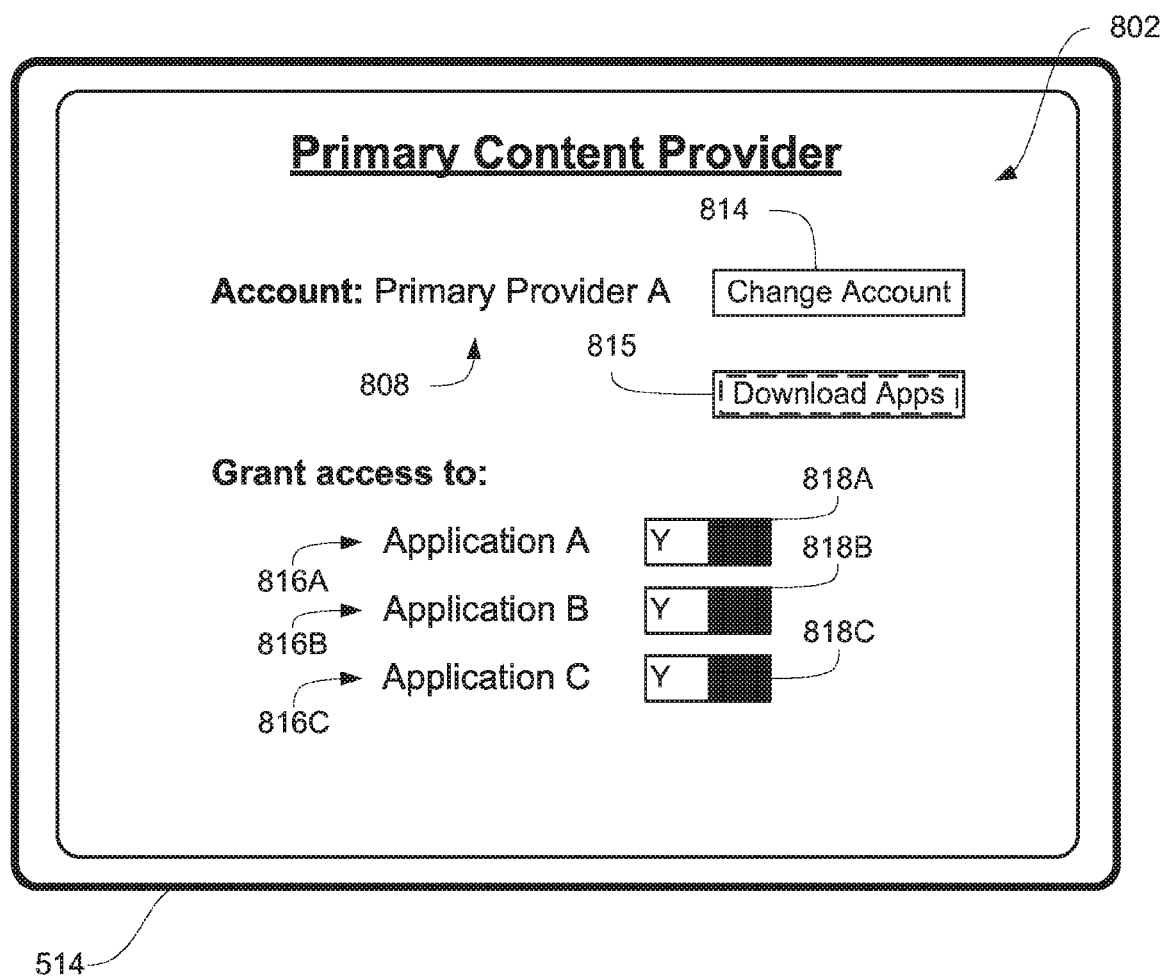
Figure 8E:
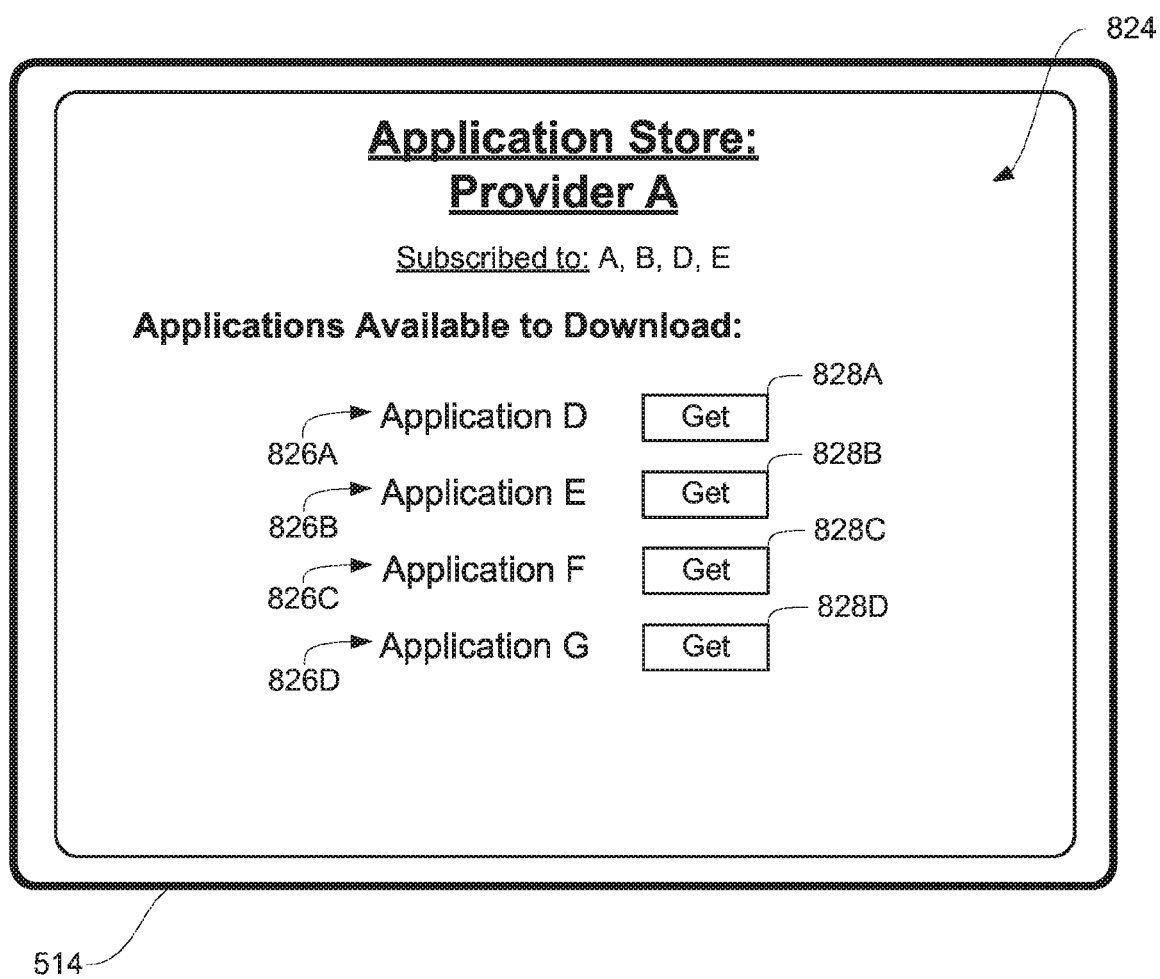
Figure 8F:
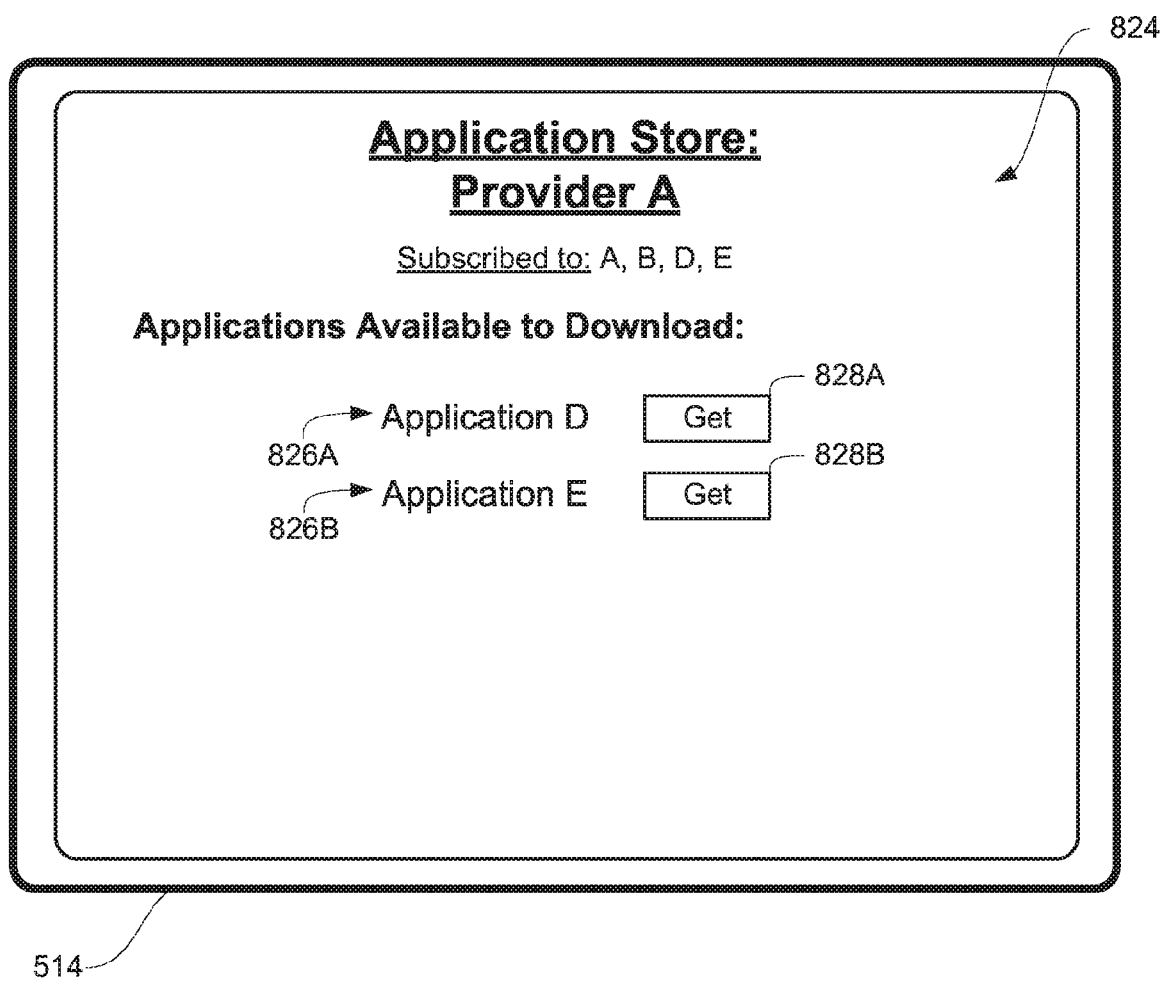
Figure 8G:
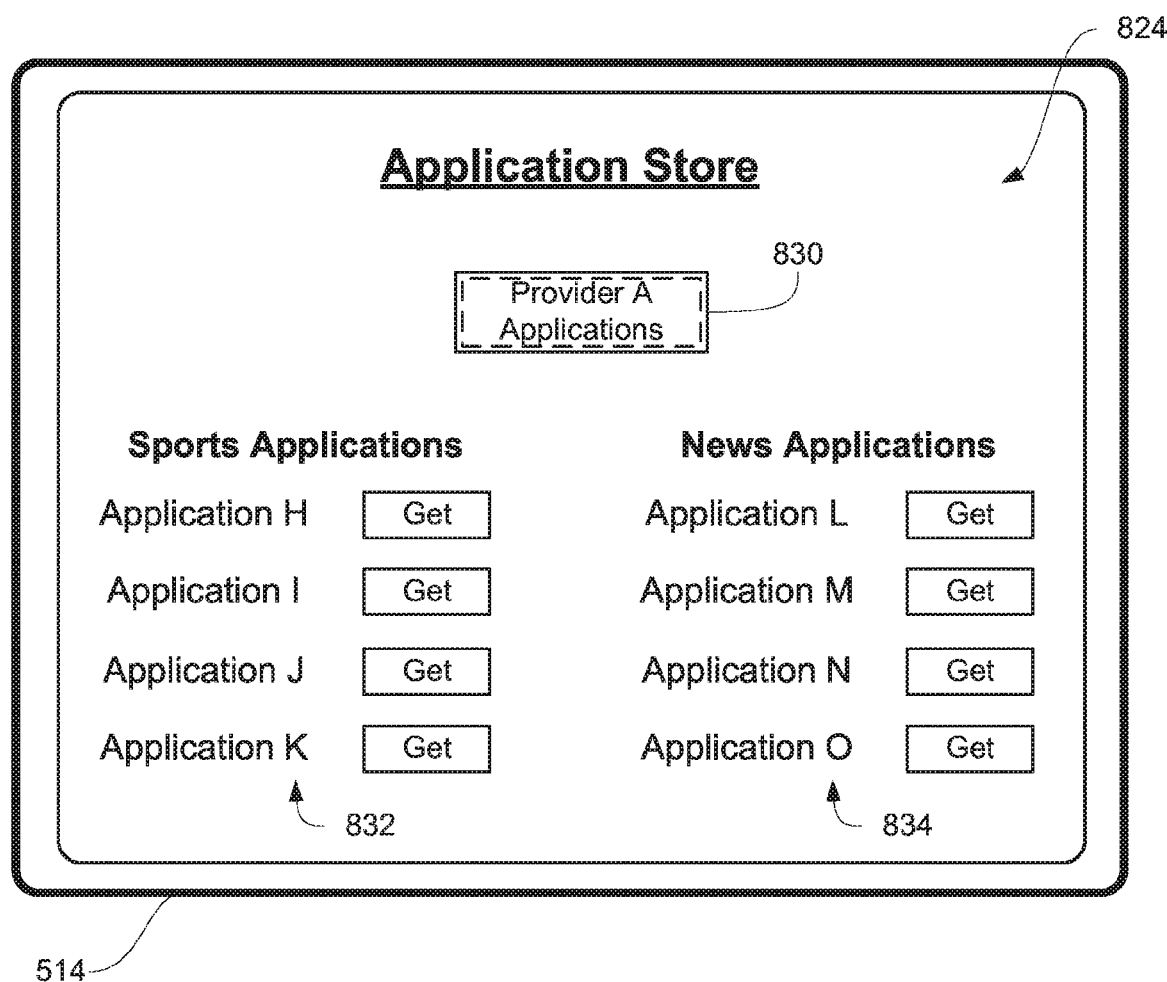
Figure 8H:
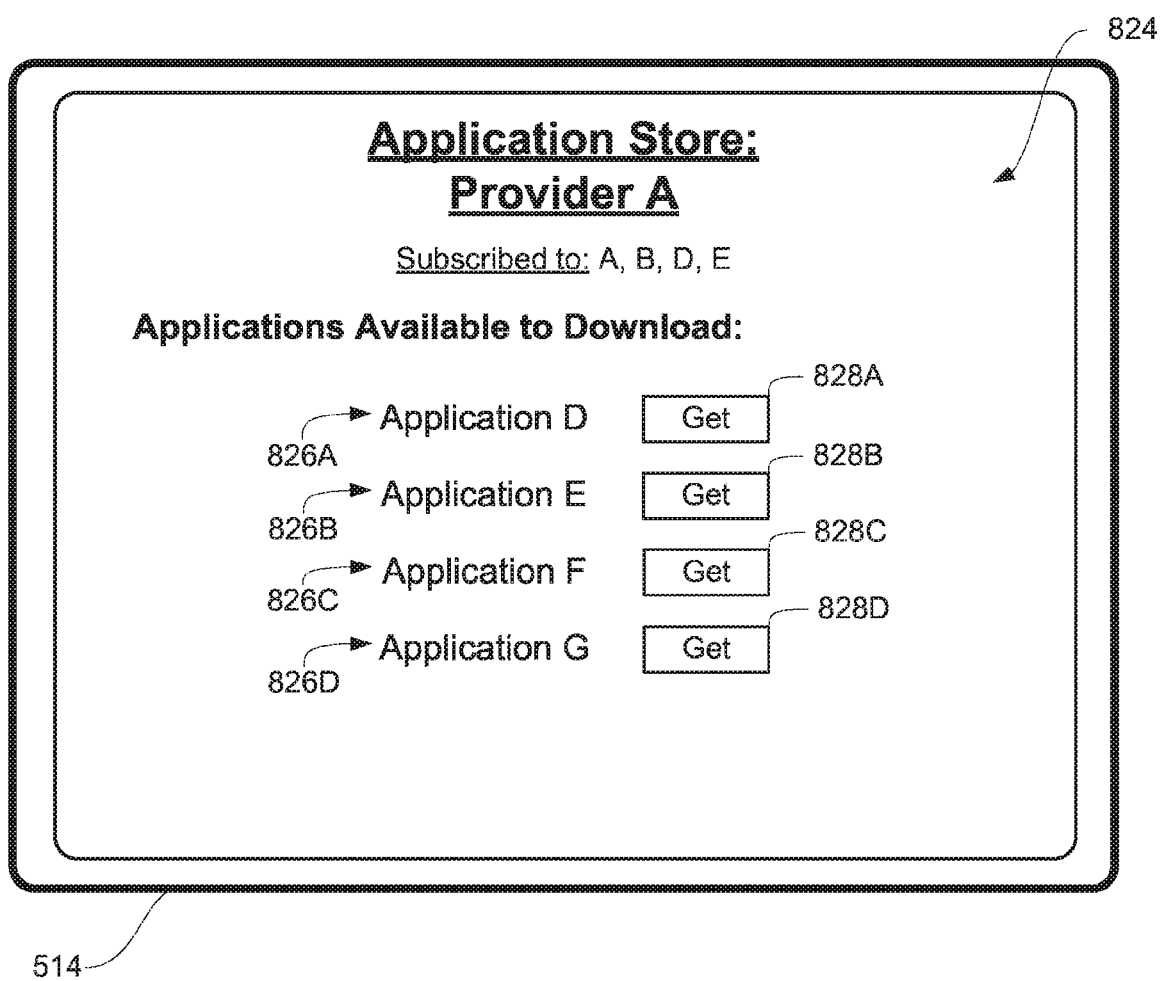
Figure 8I:
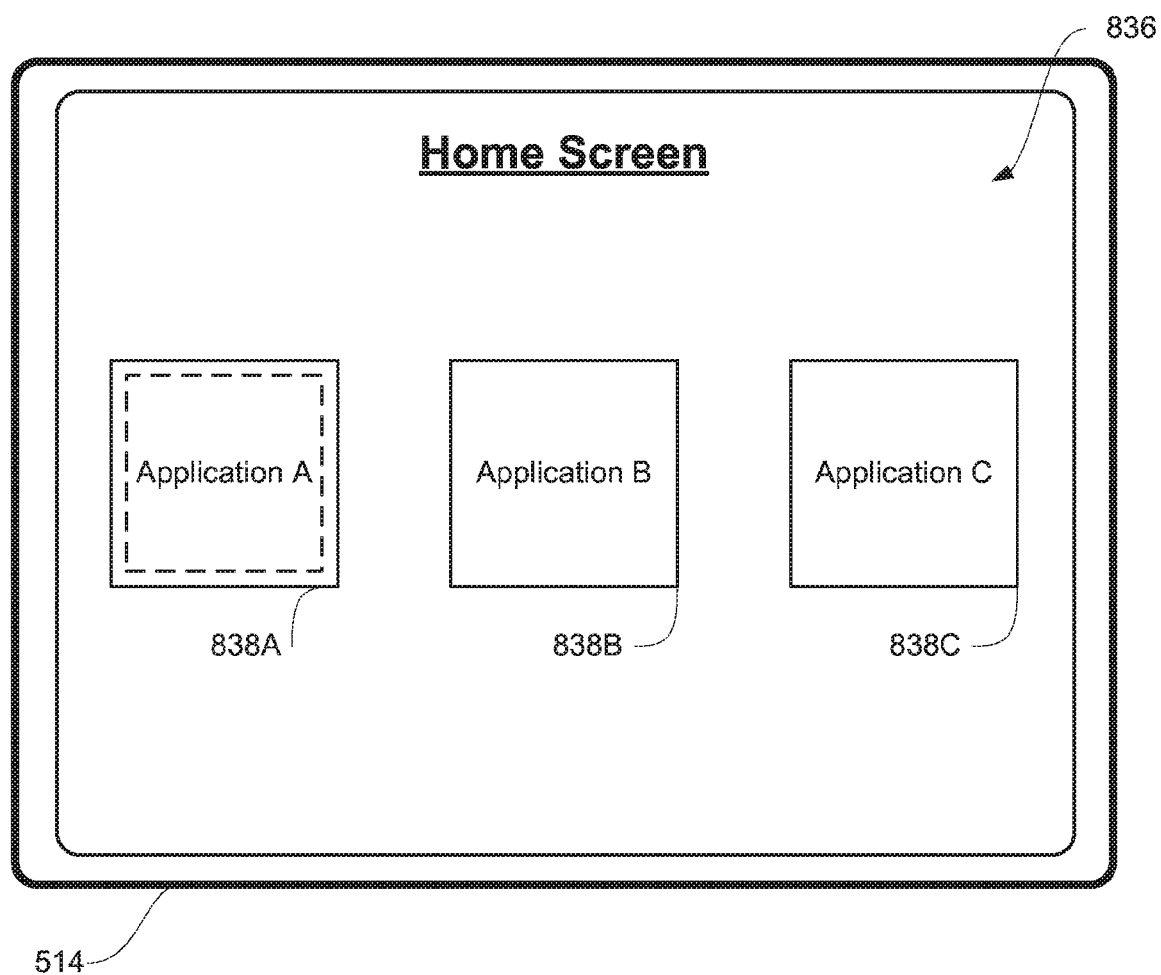
Figure 8J:
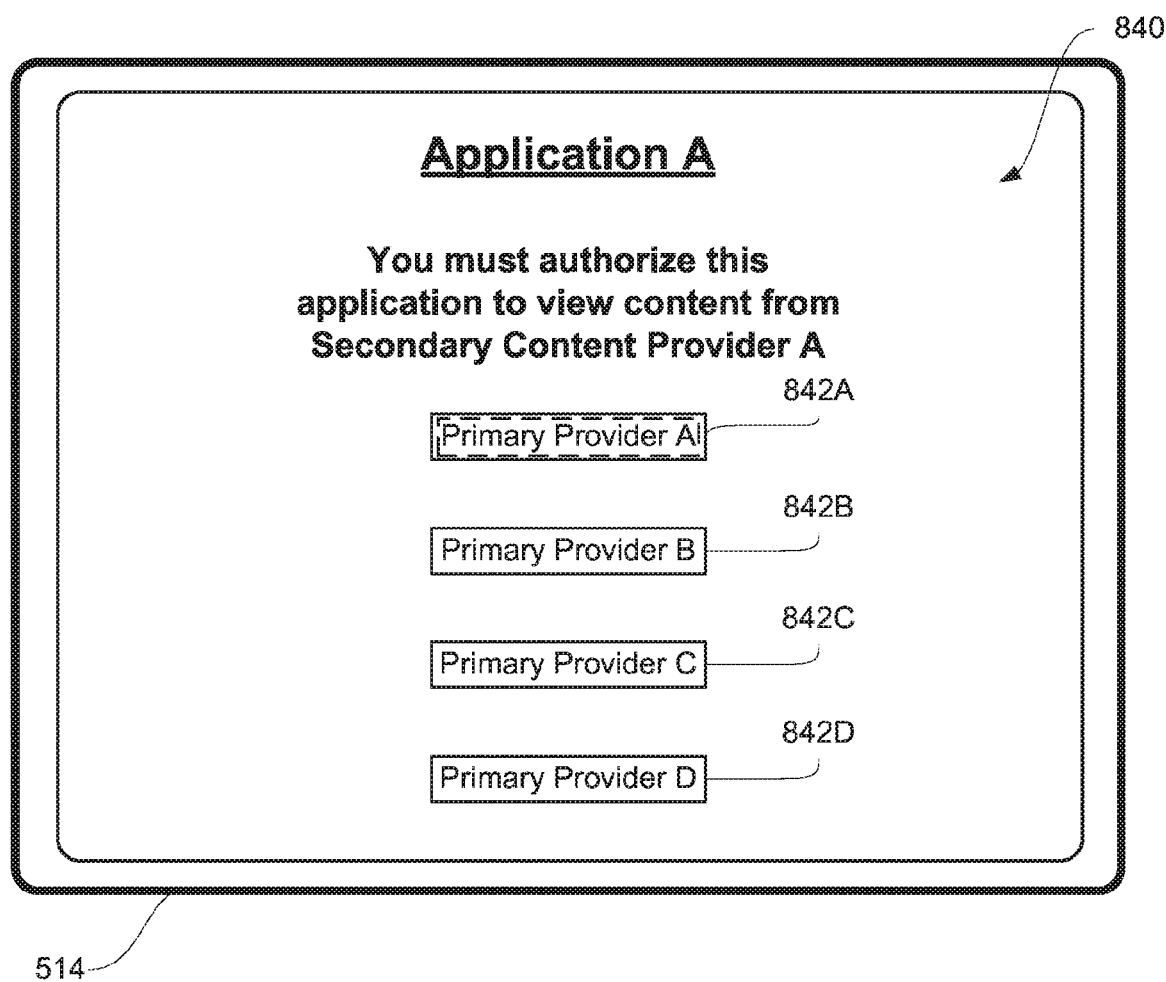
Figure 8K:
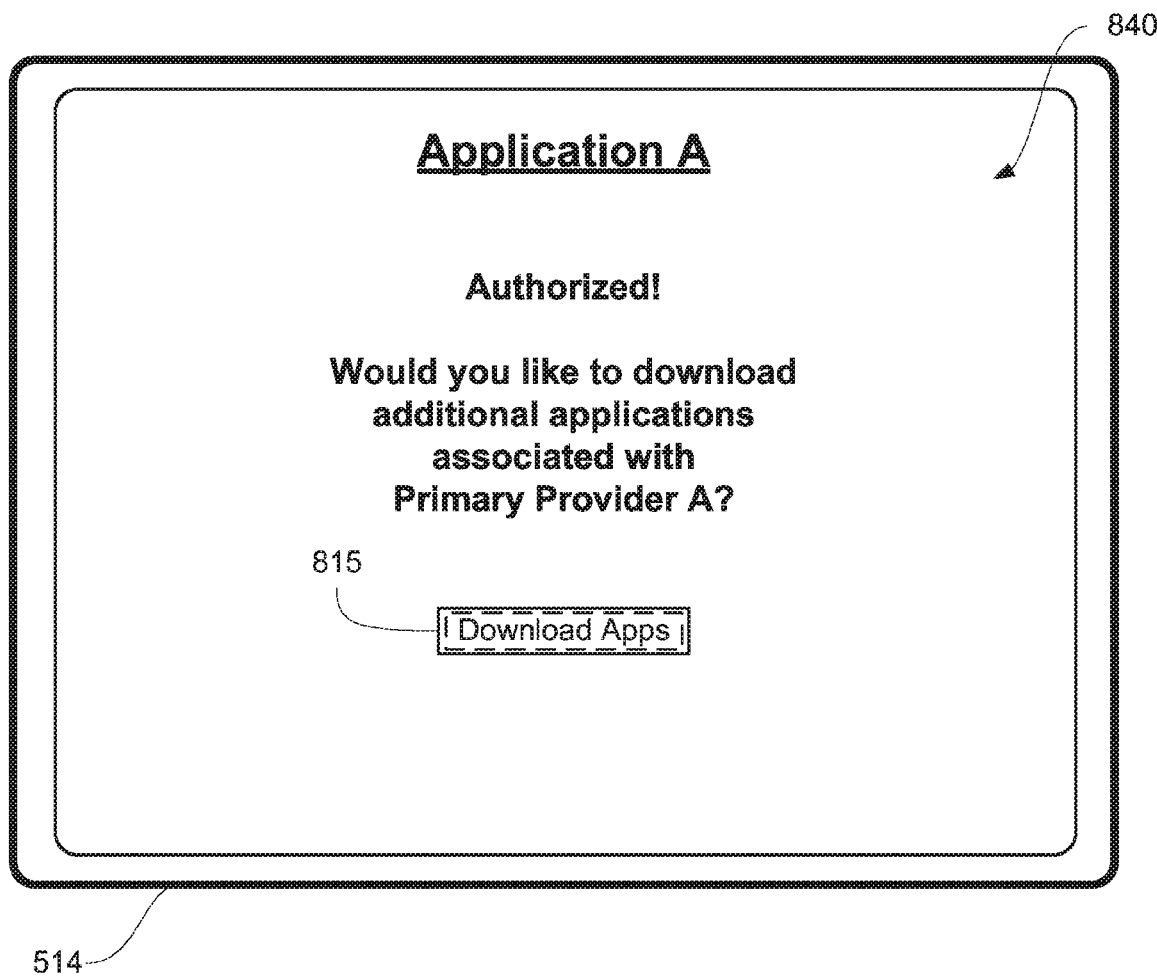
Figure 8L:
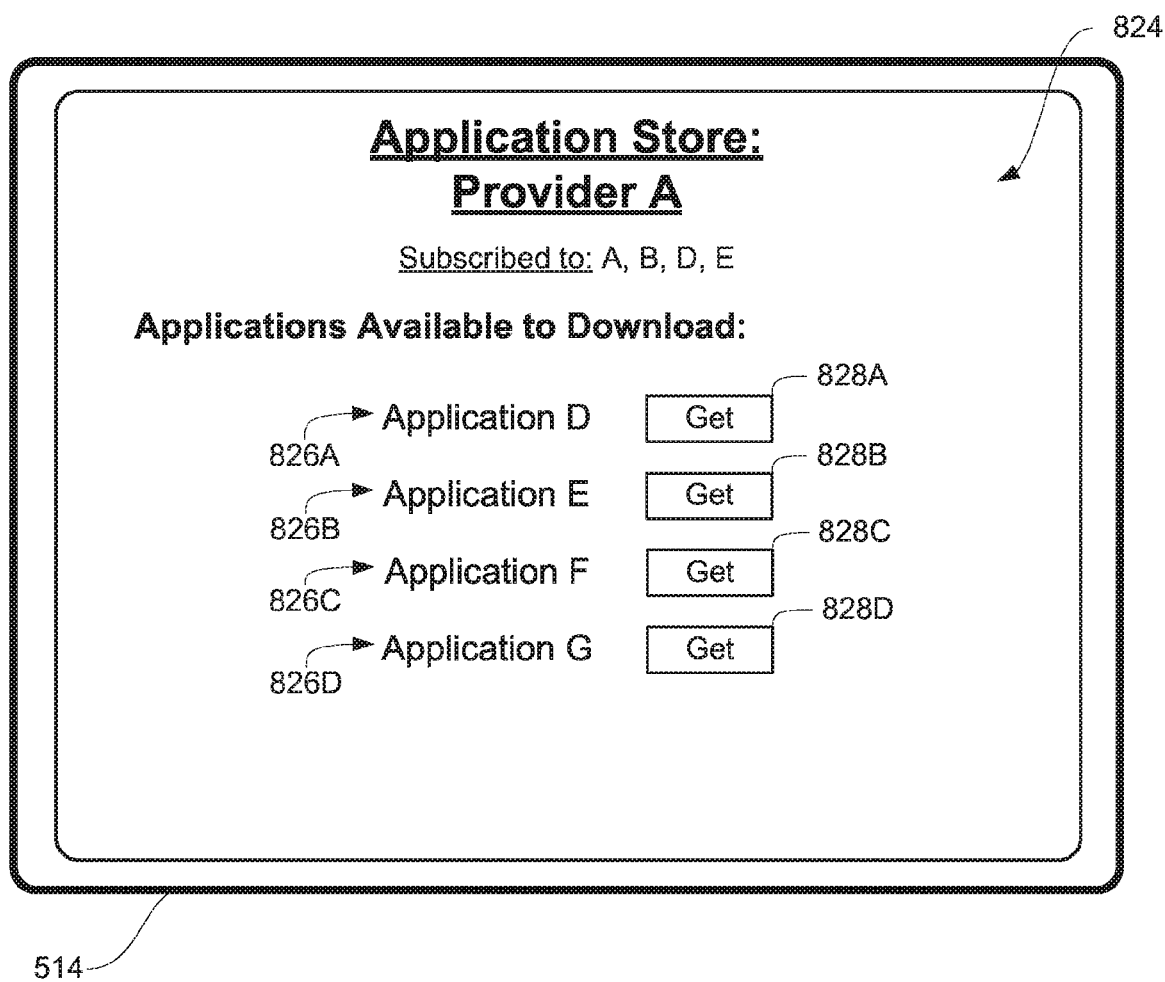
Figure 8M:
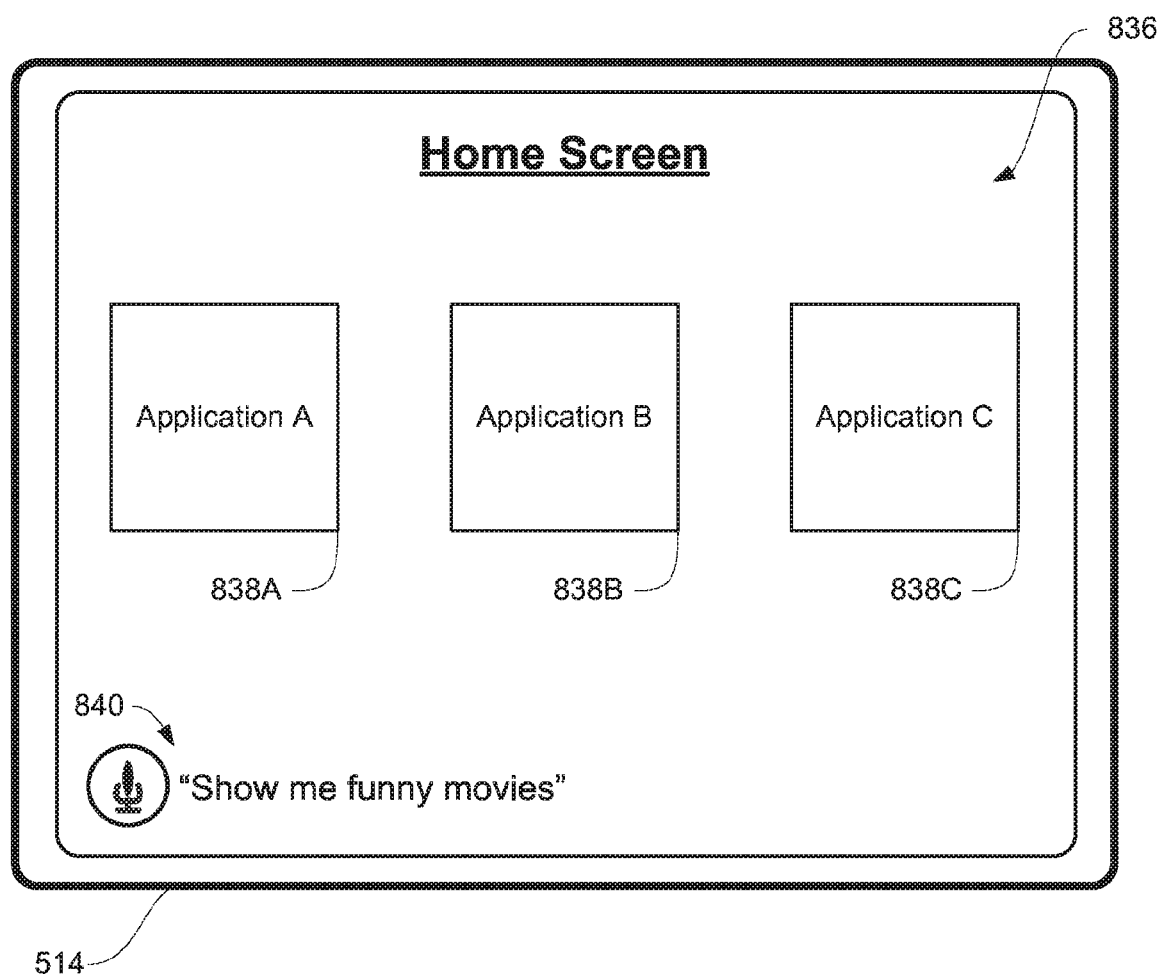
Figure 8N:
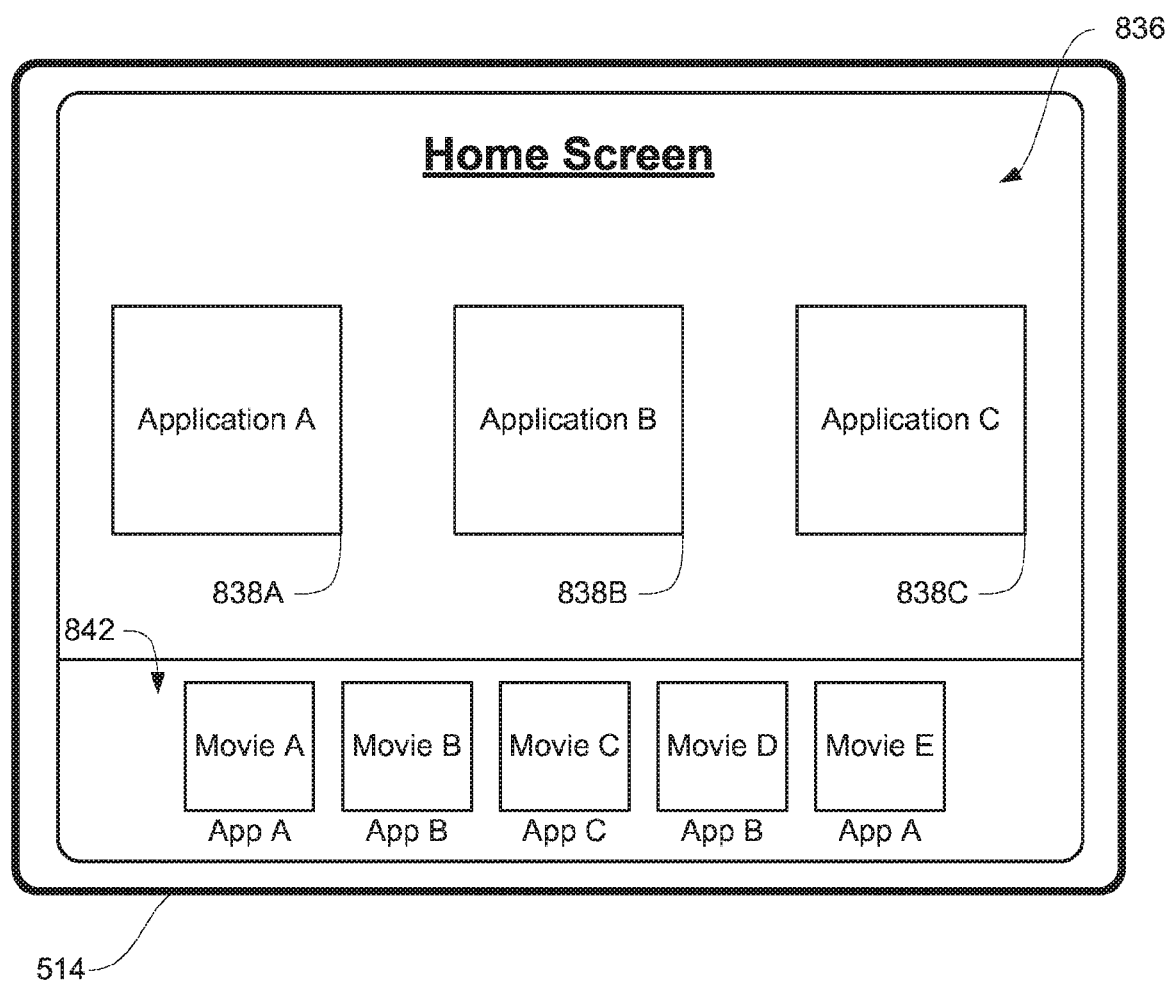

FIGS. 8A-8N illustrate exemplary ways in which an electronic device prompts a user to download one or more applications for viewing content based on authorization of the electronic device to view the content in accordance with some embodiments of the disclosure. The embodiments in these figures are used to illustrate the processes described below, including the processes described with reference to FIGS. 9A-9C.

As discussed with reference to FIGS. 6A-6HH, in some embodiments, content (e.g., recorded sports games, recorded movies, live sports games, etc.) is available to an electronic device via one or more applications. For example, applications associated with HBO and ESPN provide the electronic device with access to content from secondary content providers such as HBO (e.g., movies) and ESPN (e.g., sports), respectively. Such applications optionally require a user of the electronic device to have an account with a primary content provider, such as a cable or satellite provider, and authorize the applications, or the electronic device as a whole, with the account with the primary content provider before allowing the electronic device to access the content from those applications. However, a user of the electronic device may not know of the existence of such applications associated with the user's primary content provider. The examples of the disclosure provide for ways in which an electronic device prompts the user of the existence of applications associated with the user's primary content provider.

FIG. 8A illustrates exemplary display 514. Display 514 optionally displays one or more user interfaces that include various content. In the example illustrated in FIG. 8A, display 514 displays settings user interface 802 of an electronic device (e.g., electronic device 500 of FIG. 5A) of which display 514 is a part, or to which display 514 is connected. Settings user interface 802 is optionally a user interface of the operating system of the electronic device, and provides the user of the electronic device the ability to control various settings of the electronic device. Settings user interface 802 is optionally for controlling the primary content provider account information on the electronic device, as described with reference to FIG. 6B. In FIG. 8A, the electronic device has not yet been authorized with a primary content provider, as shown at 808. The settings user interface 802 includes button 806 for adding an account with a primary content provider to the electronic device (e.g., authorizing the electronic device with a primary content provider).

In FIG. 8B, the user has authorized the electronic device with primary content provider A (e.g., as described with reference to FIGS. 6B-6E). In response to being authorized with primary content provider A, the electronic device optionally prompts the user of the existence of additional applications that are available for download for accessing content associated with primary content provider A. For example, in FIG. 8B, the electronic device displays button 815 in settings user interface 602 (which was, optionally, not displayed in settings user interface 602 before the electronic device was authorized with primary content provider A). The existence of button 815 optionally signifies that additional applications, other than applications A, B and C, which are optionally already downloaded on the electronic device, that have access to content from primary content provider A are available to be downloaded to the electronic device. If the user selects button 815, the electronic device optionally displays a user interface in an application store on the electronic device that is specific to primary content provider A, and that includes links for downloading one or more applications associated with primary content provider A, as will be described in more detail below.

In some embodiments, in addition or alternatively to including button 815 when the electronic device is authorized with primary content provider A, settings user interface 802 includes information about, and direct download links for downloading, additional applications that are not downloaded on the electronic device, and that are associated with primary content provider A (e.g., that provide access to content from secondary content providers accessible by primary content provider A). For example, in FIG. 8C, settings user interface 802 displays representations of application D 820A and application E 820B, which are applications associated with primary content provider A, but are not yet downloaded on the electronic device. Settings user interface 802 also includes buttons 822A and 822B, which, when selected by the user, cause the electronic device to download application D and application E, respectively.

As previously mentioned with respect to FIG. 8B, selection of button 815 in settings user interface 802 optionally causes the electronic device to display a user interface in an application store on the electronic device that is specific to primary content provider A. In FIG. 8D, the user has selected button 815. In response, the electronic device displays user interface 824, which is optionally an application store user interface on the electronic device that is specific to primary content provider A, as shown in FIG. 8E. The application store is optionally a program built into the operating system of the electronic device (or an application separate from the operating system of the electronic device), and provides the user of the electronic device with the ability to download applications, whether or not associated with a primary content provider, to the electronic device. For example, applications such as calendar applications, camera applications, games, etc., are optionally available for download from the application store.

User interface 824 optionally includes representations of applications that are available for download and associated with primary content provider A, but are not yet installed on the electronic device. For example, in FIG. 8E, user interface 824 includes representations of application D 826A, application E 826B, application F 826C, and application G 826D (applications A, B and C are optionally already downloaded on the electronic device). User interface 824 also includes buttons 828A, 828B, 828C and 828D, which, when selected, cause the electronic device to download application D, application E, application F and application G, respectively. In this way, a user is able to quickly and easily determine which applications are available to download for viewing content via the user's account with the primary content provider, and download one or more of those applications, as desired.

In some embodiments, the electronic device includes applications for download in user interface 824, without regard to whether the user's account with the primary content provider gives the user access to content from those applications. For example, in FIG. 8E, the user's account with primary content provider A optionally gives the user access to content from secondary content providers A, B, D and E (e.g., the user's account with primary content provider A gives the user a subscription to secondary content providers A, B, D and E). However, the electronic device has included information and download links for applications F and G (corresponding to secondary content providers F and G, respectively) in user interface 824, because in this example, the electronic device optionally includes all applications associated with primary content provider A, irrespective of whether or not the user is subscribed to the secondary content providers corresponding to those applications.

In contrast, in FIG. 8F, the electronic device does account for whether the user's account with the primary content provider gives the user access to content from applications associated with the primary content provider. For example, in FIG. 8F, user interface 824 only includes information and download links for applications D and E (to which the user is subscribed), and excludes information and download links for applications F and G (to which the user is not subscribed). In this way, the electronic device facilitates the user's search for applications via which the user is entitled to access content.

In some embodiments, when the electronic device is authorized with a primary content provider, the application store includes a link to a page specific to the primary content provider from which applications associated with the primary content provider are downloadable (and, optionally, does not include such a link when the electronic device is not authorized with a primary content provider). For example, in FIG. 8G, the electronic device is authorized with primary content provider A. The electronic device is displaying user interface 824 of an application store of the electronic device. Multiple applications are available for download from user interface 824 of the application store. For example, sports applications, not associated with primary content provider A, are available for download at 832. Similarly, news applications, not associated with primary content provider A, are available for download at 834. Additionally, user interface 824 includes button 830, which, when selected by the user, causes the electronic device to display a page in the application store that is specific to primary content provider A, as described with reference to FIGS. 8E-8F. In FIG. 8G, the user has selected button 830. In response, as shown in FIG. 8H, the electronic device displays the page in the application store that is specific to primary content provider A, and from which various applications associated with primary content provider A are downloadable, as described with reference to FIGS. 8E-8F.

In some embodiments, a user of the electronic device is prompted to download applications associated with a primary content provider from within an application for viewing content from a secondary content provider that is utilizing the user's account with the primary content provider. For example, in FIG. 8I, the electronic device is displaying home screen 836, which includes icons 838A (corresponding to application A), 838B (corresponding to application B) and 838C (corresponding to application C), similar to as described with reference to FIG. 6G. The user has selected icon 838A. In response, the electronic device launches and displays application A, as shown in FIG. 8J. Application A (or the operating system of the electronic device) is prompting the user to authorize application A with a primary content provider in order to view content from secondary content provider A, as shown in user interface 840. User interface 840 optionally includes buttons 842A, 842B, 842C and 842D, which, when selected, optionally initiate a process for authorizing application A with primary content providers A, B, C and D, respectively. In FIG. 8J, the user has selected button 842A. In response, application A has been authorized with primary content provider A, as shown in FIG. 8K (it is understood that authorization of application A with a primary content provider optionally requires the user to enter authentication credentials, such as a username and password). In FIG. 8K, application A (or the operating system of the electronic device) has also prompted the user to download additional applications associated with primary content provider A. Specifically, user interface 840 in FIG. 8K includes button 815, which when selected by the user, causes the electronic device to display the page in the application store of the electronic device that is specific to primary content provider A, as described with reference to FIGS. 8E-8F. In FIG. 8K, the user has selected button 815, and as a result, the electronic device displays the page in the application store of the electronic device that is specific to primary content provider A, as shown in FIG. 8L.

In some embodiments, the electronic device includes a universal search functionality for searching for content available on the electronic device (e.g., content accessible from multiple applications on the electronic device) via a user interface of the electronic device, and not a user interface of applications for viewing the content on the electronic device. For example, in FIG. 8M, applications A, B and C are downloaded on the electronic device, as indicated by their icons being displayed on home screen 836. The user of the electronic device has provided a voice input requesting to find funny movies available on the electronic device while home screen 836 is displayed on the electronic device (e.g., using remote 510 in FIG. 5B to provide the voice input to the electronic device). This input is shown as overlay 840 displayed on home screen 836 of the electronic device. In response to the input, the electronic device optionally displays representations of content that is related to the input. For example, in FIG. 8N, the electronic device displays, within overlay 842 over home screen 836, representations of movies that it determines to be funny, in accordance with the user input. These movies optionally include movies accessible on applications on the electronic device that are downloaded on the electronic device (e.g., movies accessible from applications A, B and C that use the authorization of the electronic device with the primary content provider A to provide access to their content). For example, in FIG. 8N, movies A and E are optionally accessible from application A, movies B and D are optionally accessible from application B, and movie C is optionally accessible from application C. Thus, the electronic device is able to provide search results to the user of the electronic device that span across multiple applications downloaded on the electronic device. In some embodiments, the search results do not include applications that, while associated with primary content provider A, are not downloaded on the electronic device, such as applications D, E, F and G, described with reference to FIG. 8E.

Figure 9A:
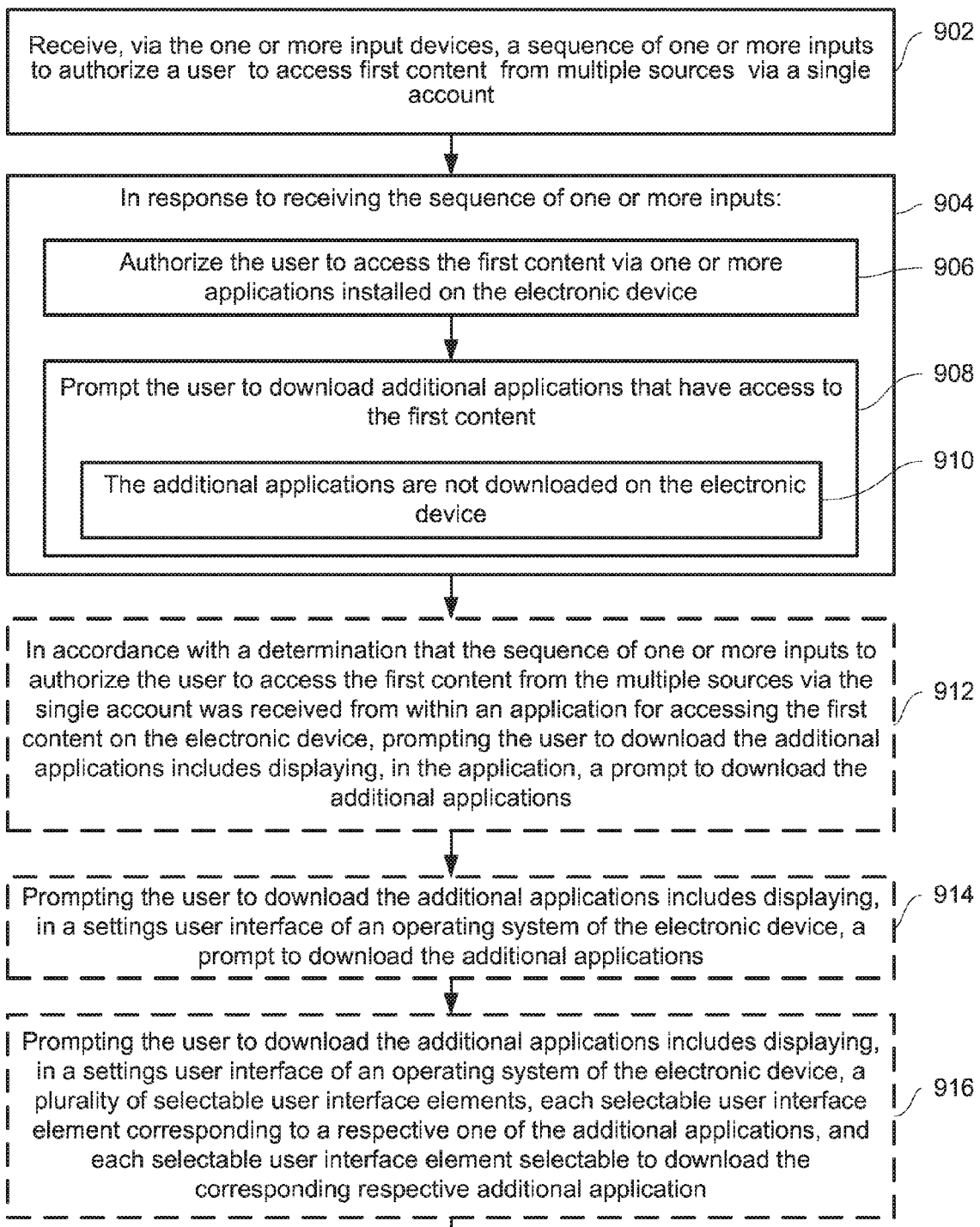
FIGS. 9A-9C are flow diagrams illustrating a method of prompting a user to download one or more applications for viewing content based on authorization of the electronic device to view the content in accordance with some embodiments of the disclosure.
Figure 9A:
Figure 9B:
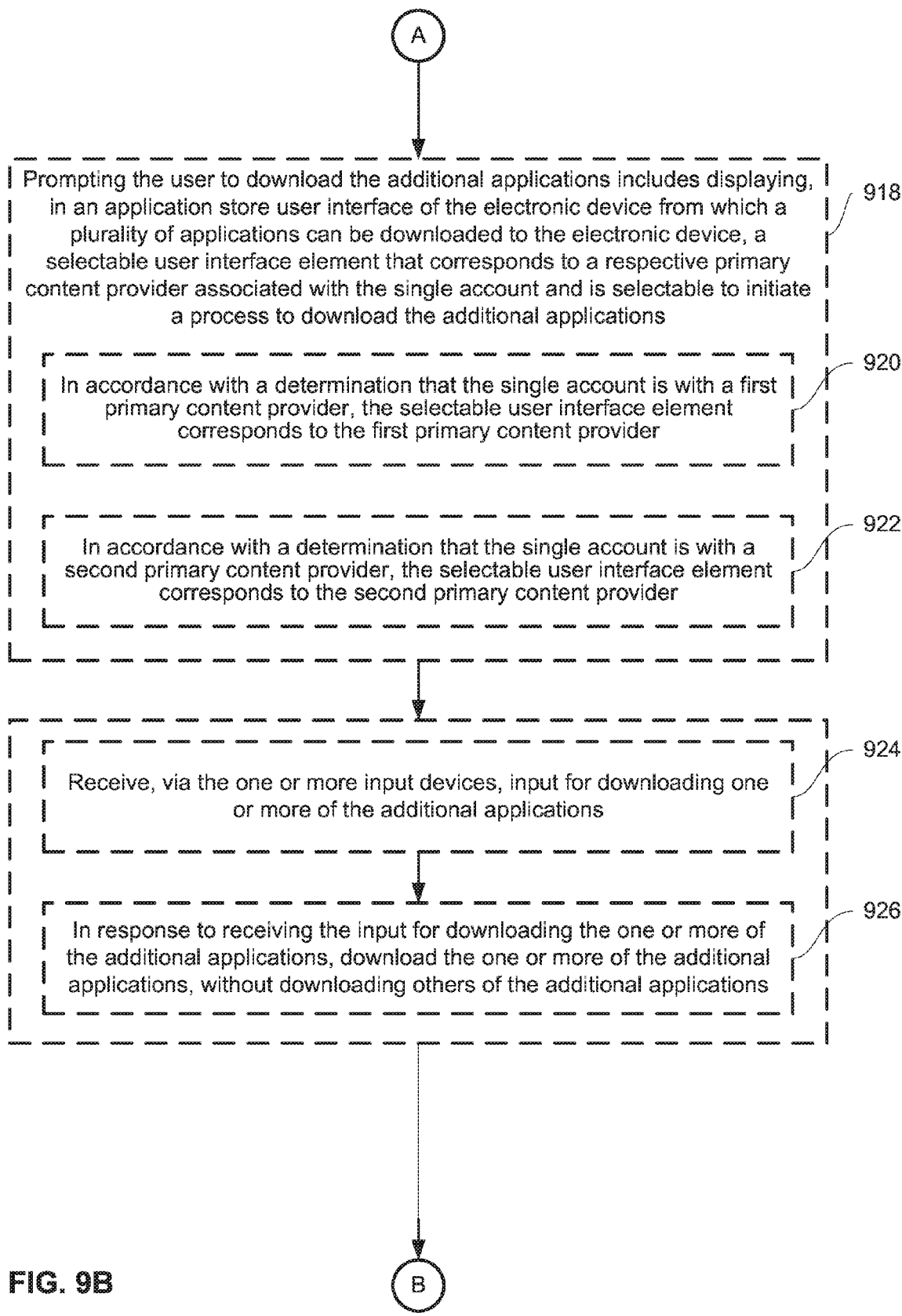
Figure 9C:
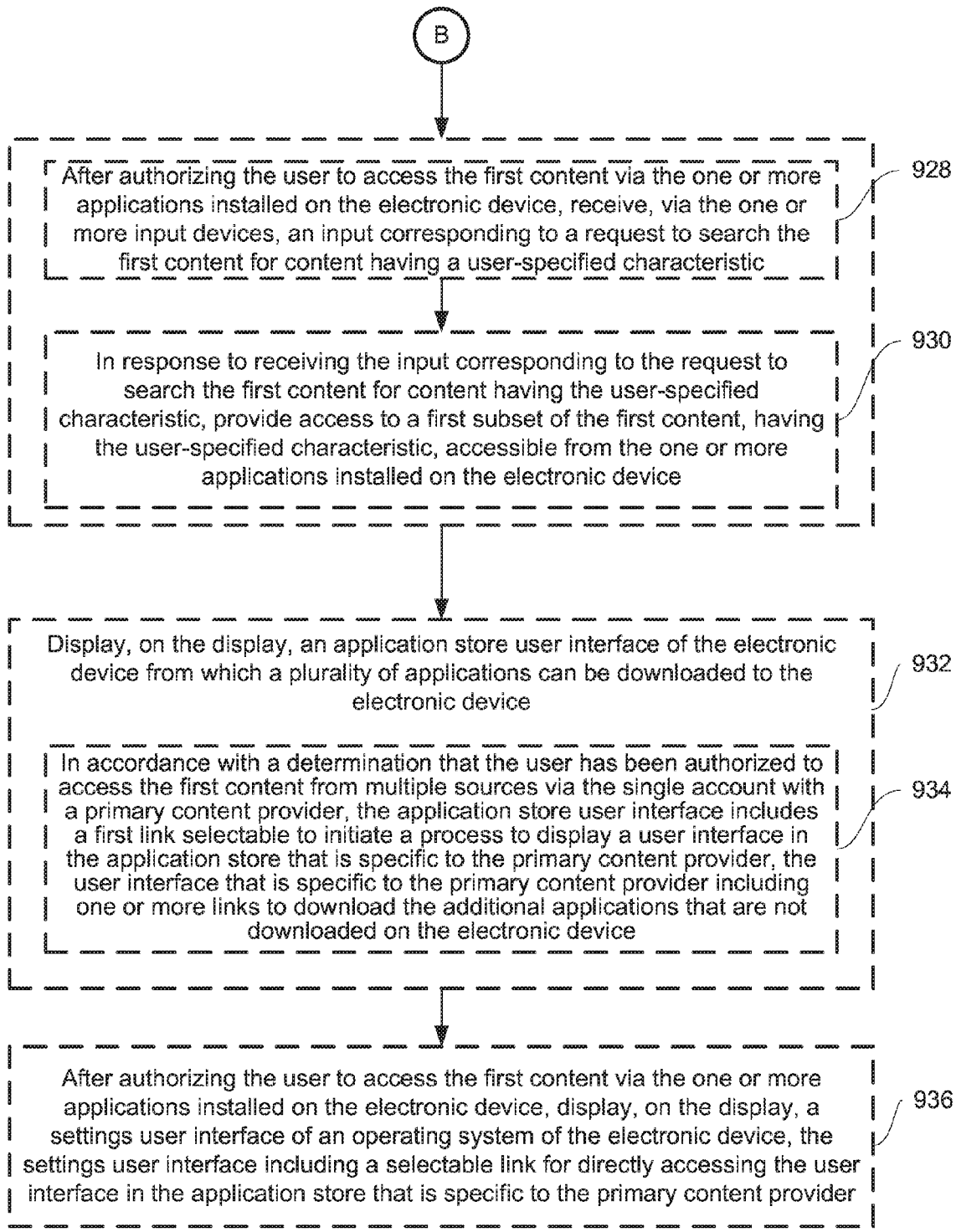

FIGS. 9A-9C are flow diagrams illustrating a method 900 of prompting a user to download one or more applications for viewing content based on authorization of the electronic device to view the content in accordance with some embodiments of the disclosure. The method 900 is optionally performed at an electronic device such as device 100, device 300, device 500 or remote 510 as described above with reference to FIGS. 1A-1B, 2-3 and 5A-5B. Some operations in method 900 are, optionally, combined and/or the order of some operations is, optionally, changed.

As described below, the method 900 provides ways to prompt a user to download one or more applications for viewing content based on authorization of an electronic device to view the content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, the method 900 is performed at an electronic device (e.g., a set-top box, a computer, etc., such as device 100, device 300 or device 500) that is in communication with a display (e.g., a television, a computer monitor, etc., such as display 514) and one or more input devices (e.g., a remote control, such as remote 510, a smartphone configured to control the electronic device, such as device 511, a wearable device configured to control the electronic device, etc.). In some embodiments, the method 900 is performed at an electronic device that includes the display and/or the one or more input devices, such as an electronic device with a touch screen (e.g., a tablet computer, a smartphone, etc.), or an electronic device (e.g., a computer) that includes a display and is in communication with an input device, such as a mouse or a trackpad. In some embodiments, the electronic device receives (902), via the one or more input devices, a sequence of one or more inputs (e.g., inputs providing user subscription credentials for a user account with a primary content provider) to authorize a user (e.g., a user of the electronic device) to access first content (e.g., movies, television shows, games, etc.) from multiple sources (e.g., from multiple secondary content providers, such as HBO, ESPN, ABC, etc.) via a single account, such as in FIGS. 8A-8B and method 700 (e.g., a user account with a primary content provider, such as a cable provider, or a satellite provider, that has access to content from multiple secondary content providers). In some embodiments, in response (904) to receiving the sequence of one or more inputs, the electronic device authorizes (906) the user to access the first content via one or more applications installed on the electronic device (e.g., allowing one or more applications associated with the secondary content providers to play content from the secondary content providers on the electronic device) and prompts (908) the user to download additional applications that have access to the first content, such as in FIG. 8B. In this way, the user is able to quickly and easily download applications that have access to content to which the user has access, increasing the efficiency of the human-machine interface. In some embodiments, the additional applications are not downloaded (910) on the electronic device, such as in FIG. 8B (e.g., prompt the user to download other applications, not yet installed on the electronic device, that can be authorized by the user's single account to provide the first content to the user).

In some embodiments, in accordance with a determination that the sequence of one or more inputs to authorize the user to access the first content from the multiple sources via the single account was received from within an application for accessing the first content on the electronic device, such as in FIGS. 8I-8J (e.g., signing-on to the single account was performed from within an application on the electronic device), prompting the user to download the additional applications includes (912) displaying, in the application, a prompt to download the additional applications, such as in FIG. 8K (e.g., as a pop-up notification in the application). In this way, the user is able to quickly and easily download applications that have access to content to which the user has access from within the application, increasing the efficiency of the human-machine interface.

In some embodiments, prompting the user to download the additional applications includes (914) displaying, in a settings user interface of an operating system of the electronic device (e.g., a settings user interface of the electronic device, not a user interface of an application for accessing the first content), a prompt to download the additional applications, such as in FIG. 8B (e.g., a prompt to go to an application store screen that shows additional applications that have access to the first content, specific to a primary content provider with which the single account is associated).

In some embodiments, prompting the user to download the additional applications includes (916) displaying, in a settings user interface of an operating system of the electronic device (e.g., a settings user interface of the electronic device, not a user interface of an application for accessing the first content), a plurality of selectable user interface elements, each selectable user interface element corresponding to a respective one of the additional applications, and each selectable user interface element selectable to download the corresponding respective additional application, such as in FIG. 8C (e.g., display, in the settings user interface, icons or representations for applications associated with the single account, but not yet downloaded to the electronic device, each icon or representation being a (or having an associated) button displayed that, when selected, downloads the corresponding application).

In some embodiments, prompting the user to download the additional applications includes (918) displaying, in an application store user interface (e.g., on the main page of the application store that is displayed first when the user opens the application store) of the electronic device from which a plurality of applications can be downloaded to the electronic device (e.g., an application store that allows the user to download applications to the electronic device, including applications associated with the multiple sources of the first content, and applications not associated with the multiple sources of the first content), a selectable user interface element that corresponds to a respective primary content provider (e.g., a cable or satellite provider) associated with the single account, such as in FIG. 8G (e.g., a user account with a primary content provider, such as a cable provider, or a satellite provider, that has access to content from multiple secondary content providers) and is selectable to initiate a process to download the additional applications, such as in FIGS. 8G-8H (e.g., selectable to navigate to a page in the application store with a listing of the additional applications, and buttons to download individual ones or all of the additional applications). In this way, the user is able to quickly and easily download applications that have access to content to which the user has access from a general application store on the electronic device, increasing the efficiency of the human-machine interface. In some embodiments, in accordance with a determination that the single account is with a first primary content provider, the selectable user interface element corresponds (920) to the first primary content provider. In some embodiments, in accordance with a determination that the single account is with a second primary content provider, the selectable user interface element corresponds (922) to the second primary content provider (e.g., the button displayed in the application store is selected based on the primary content provider that the user is logged into using the single account). Different primary content providers optionally have different applications for download to access the content from those primary content providers.

In some embodiments, the electronic device receives (924), via the one or more input devices, input for downloading one or more of the additional applications (e.g., an input for individually downloading one or more of the additional applications). In some embodiments, in response to receiving the input for downloading the one or more of the additional applications, the electronic device downloads (926) the one or more of the additional applications, without downloading others of the additional applications, such as described with reference to FIG. 8C (e.g., the additional applications are individually downloadable by the user).

In some embodiments, after authorizing the user to access the first content via the one or more applications installed on the electronic device, the electronic device receives (928), via the one or more input devices, an input corresponding to a request to search the first content for content having a user-specified characteristic, such as in FIG. 8M (e.g., a search for "Star Wars", or a search for "basketball"). In this way, the user is able to quickly and easily search for content across multiple applications, and to which the user has access, increasing the efficiency of the human-machine interface. The search is optionally performed from a user interface of the electronic device, and not a user interface of the applications for viewing the first content. For example, the search is optionally performed as a universal search across content accessible from multiple applications on the electronic device, such as in FIG. 8M. In some embodiments, in response to receiving the input corresponding to the request to search the first content for content having the user-specified characteristic, the electronic device provides (930) access to a first subset of the first content, having the user-specified characteristic, accessible from the one or more applications installed on the electronic device, such as in FIG. 8N (e.g., a search for "Star Wars" reveals "Star Wars" media accessible on a plurality of applications on the electronic device, a search for "basketball" reveals basketball media accessible on a plurality of applications on the electronic device). In some embodiments, content accessible from applications that are not downloaded on the electronic device is not accessible from the universal search, such as in FIG. 8N.

In some embodiments, the electronic device displays (932), on the display, an application store user interface (e.g., a main page of the application store that is displayed first when the user opens the application store) of the electronic device from which a plurality of applications can be downloaded to the electronic device, such as in FIG. 8G (e.g., an application store that allows the user to download applications to the electronic device, including applications associated with the multiple sources of the first content, and applications not associated with the multiple sources of the first content). In some embodiments, in accordance with a determination that the user has been authorized to access the first content from multiple sources via the single account with a primary content provider (e.g., the user has provided the single account credentials to authorize the electronic device with a primary content provider, such as a cable or satellite provider), the application store user interface includes (934) a first link selectable to initiate a process to display a user interface in the application store that is specific to the primary content provider, such as in FIGS. 8G-8H (e.g., a page in the application store that is customized to the primary content provider with which the single account is associated), the user interface that is specific to the primary content provider including one or more links to download the additional applications that are not downloaded on the electronic device, such as in FIG. 8H (e.g., the primary content provider-specific page of the application store includes information about, and buttons to download, applications that are not yet downloaded on the electronic device, and via which the user would be authorized to access content via the single account). In some embodiments, selection of the first link goes directly to the primary content provider-specific user interface. In some embodiments, selection of the first link displays an intermediate user interface for selecting the primary content provider associated with the user's single account from a list, and in response to the selection of the primary content provider from the intermediate user interface, the primary content provider-specific user interface is displayed. In some embodiments, the primary content provider-specific user interface includes links to all applications associated with the primary content provider (including applications to which the user's single account does not grant access), such as in FIG. 8E, while in other embodiments, the primary content provider-specific user interface includes links to applications associated with the primary content provider to which the user's single account provides access, such as in FIG. 8F.

In some embodiments, after authorizing the user to access the first content via the one or more applications installed on the electronic device, the electronic device displays (936), on the display, a settings user interface of an operating system of the electronic device (e.g., a settings user interface of the electronic device, not a user interface of an application for accessing the first content), the settings user interface including a selectable link for directly accessing the user interface in the application store that is specific to the primary content provider, such as in FIG. 8D (e.g., the operating system settings user interface includes a direct link that is selectable to access the page in the application store that is customized to the primary content provider with which the single account is associated, and from which additional applications associated with the primary content provider are downloadable). In this way, the user is able to quickly and easily navigate to a primary content provider-specific page for downloading applications for accessing content to which the user has access, increasing the efficiency of the human-machine interface.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9C. For example, the authorizations, applications, content, operating systems, primary content providers and settings user interfaces described above with reference to method 900 optionally have one or more of the characteristics of the authorizations, applications, content, operating systems, primary content providers and settings user interfaces described herein with reference to other methods described herein (e.g., method 700). For brevity, these details are not repeated here.

The operations in the information processing methods described above are, optionally, implemented by running one or more functional modules in an information processing apparatus such as general purpose processors (e.g., as described with respect to FIGS. 1A, 3, 5A, 10 and 11) or application specific chips. Further, the operations described above with reference to FIGS. 9A-9C are, optionally, implemented by components depicted in FIGS. 1A-1B. For example, receiving operation 902, authorizing operation 906 and prompting operation 908 are, optionally, implemented by event sorter 170, event recognizer 180, and event handler 190. Event monitor 171 in event sorter 170 detects a contact on a touch-sensitive surface, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 10:
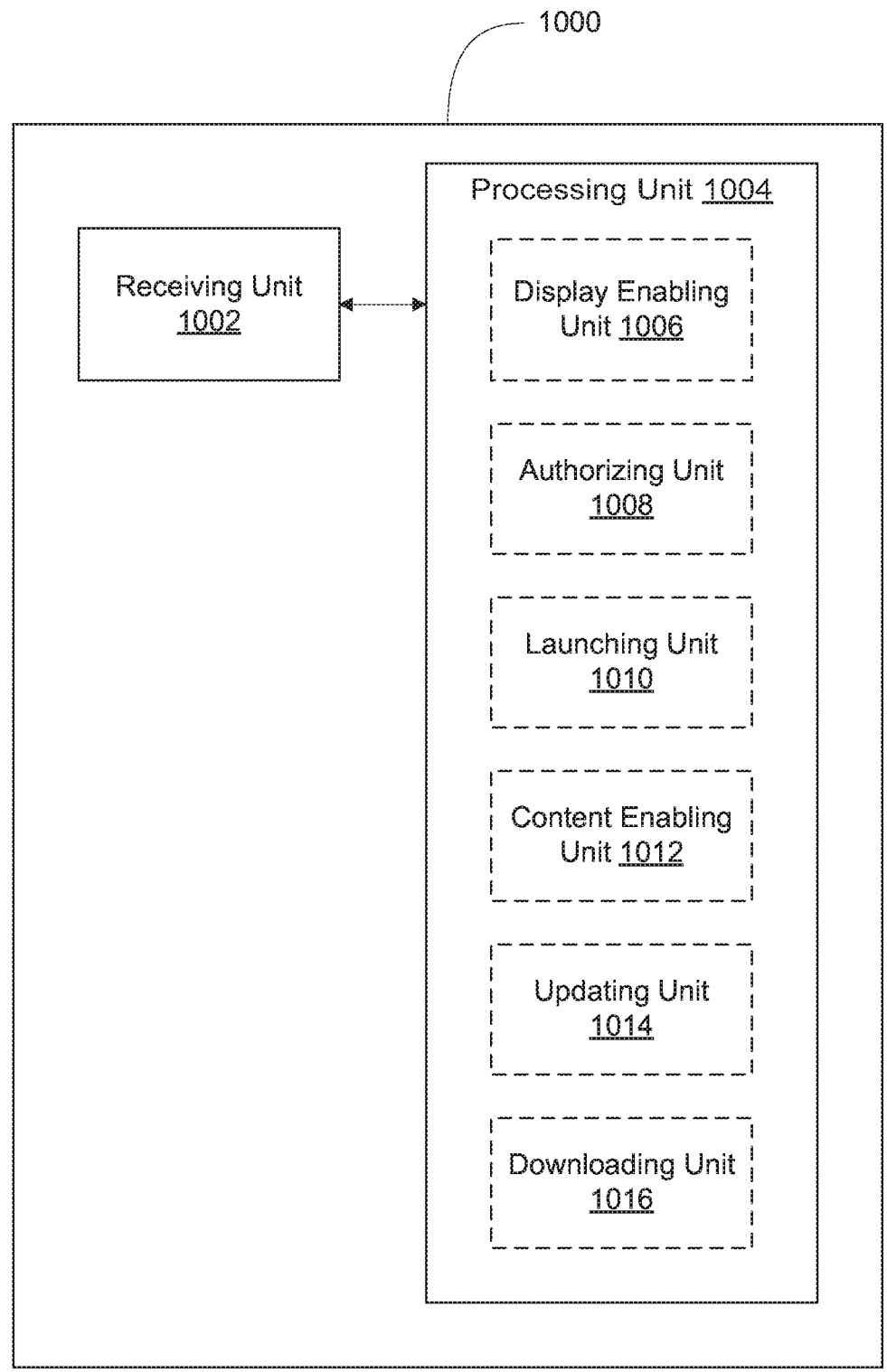
FIGS. 10-11 are functional block diagrams of electronic devices in accordance with some embodiments of the disclosure.

In accordance with some embodiments, FIG. 10 shows a functional block diagram of an electronic device 1000 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, an electronic device 1000 optionally includes a receiving unit 1002 configured to receive inputs, and a processing unit 1004 coupled to the receiving unit 1002. In some embodiments, the processing unit 1004 includes a display enabling unit 1006, an authorizing unit 1008, a launching unit 1010, a content enabling unit 1012, an updating unit 1014 and a downloading unit 1016.

In some embodiments, the receiving unit (1002) is configured to receive a sequence of one or more inputs that authorizes the electronic device with a primary content provider based on a user subscription to the primary content provider, the primary content provider having access (e.g., with authorizing unit 1008) to content from a plurality of secondary content providers that is accessible on the electronic device via a plurality of applications associated with the secondary content providers. In some embodiments, a processing unit (1004) is configured to, after authorizing the electronic device with the primary content provider, display, on a display (e.g., with display enabling unit 1006), a settings user interface of the electronic device from which access to the authorization of the electronic device with the primary content provider can be granted or denied (e.g., with authorizing unit 1008) to one or more applications on the electronic device. In some embodiments, the receiving unit (1002) is further configured to, while displaying (e.g., with display enabling unit 1006) the settings user interface, receive a sequence of one or more inputs that grant (e.g., with authorizing unit 1008) access to the authorization of the electronic device to a first application of the plurality of applications associated with a first secondary content provider, wherein the settings user interface is not a user interface of the first application.

In some embodiments, the processing unit (1004) is further configured to, after authorizing (e.g., with authorizing unit 1008) the electronic device with the primary content provider, launch (e.g., with launching unit 1010) a second application associated with a second secondary content provider of the plurality of secondary content providers. In some embodiments, the second application has not been granted access (e.g., with authorizing unit 1008) to the authorization of the electronic device. In some embodiments, in response to launching (e.g., with launching unit 1010) the second application, display (e.g., with display enabling unit 1006), on the display, an authorization access user interface for granting or denying (e.g., with authorizing unit 1008) the second application access to the authorization of the electronic device with the primary content provider. In some embodiments, the receiving unit (1002) is further configured to, while displaying (e.g., with display enabling unit 1006) the authorization access user interface, receive an input. In some embodiments, the processing unit (1002) is further configured to, in response to receiving (e.g., with receiving unit 1002) the input, in accordance with a determination that the input grants (e.g., with authorizing unit 1008) the second application access to the authorization of the electronic device with the primary content provider, provide (e.g., with content enabling unit 1012) content, from the second secondary content provider, in the second application.

In some embodiments, the processing unit (1004) is further configured to, in accordance with the determination that the input grants (e.g., with authorizing unit 1008) the second application access to the authorization of the electronic device with the primary content provider, update (e.g., with updating unit 1014) the settings user interface to reflect that the second application has access to the authorization of the electronic device with the primary content provider. In some embodiments, the processing unit (1004) is further configured to, in accordance with a determination that the input denies (e.g., with authorizing unit 1008) the second application access to the authorization of the electronic device with the primary content provider, require the user to separately authorize, from the second application, the second application with the primary content provider before providing (e.g., with content enabling unit 1012) content, from the second secondary content provider, in the second application. In some embodiments, after the user separately authorizes (e.g., with authorizing unit 1008) the second application with the primary content provider, the settings user interface indicates (e.g., with display enabling unit 1006) that the second application does not have access to the authorization of the electronic device with the primary content provider.

In some embodiments, the receiving unit (1002) is further configured to, while displaying (e.g., with display enabling unit 1006) the settings user interface, receive a sequence of one or more inputs that deny (e.g., with authorizing unit 1008) access to the authorization of the electronic device to a second application of the plurality of applications associated with a second secondary content provider. In some embodiments, the settings user interface includes (e.g., via display enabling unit 1006) a plurality of selectable user interface elements corresponding to the plurality of applications via which the content from the plurality of secondary content providers is accessible (e.g., with content enabling unit 1012), from which the access to the authorization of the electronic device with the primary content provider is granted or denied (e.g., with authorizing unit 1008) in response to selection (e.g., via receiving unit 1002) of respective ones of the plurality of user interface elements.

In some embodiments, the plurality of applications associated with the secondary content providers includes a first set of applications associated with a first set of secondary content providers to which the user subscription with the primary content provider permits (e.g., via authorizing unit 1010) access, and a second set of applications associated with a second set of secondary content providers to which the user subscription with the primary content provider does not permit access. In some embodiments, the settings user interface allows granting or denying (e.g., via authoring unit 1008) access to the authorization of the electronic device with the primary content provider to applications, on the electronic device, in the first set of applications and the second set of applications.

In some embodiments, the plurality of applications associated with the secondary content providers includes a first set of applications associated with a first set of secondary content providers to which the user subscription with the primary content provider permits (e.g., via authorizing unit 1008) access, and a second set of applications associated with a second set of secondary content providers to which the user subscription with the primary content provider does not permit access. In some embodiments, the settings user interface allows granting or denying (e.g., via authorizing unit 1008) access to the authorization of the electronic device with the primary content provider to applications, on the electronic device, in the first set of applications, but not to applications in the second set of applications.

In some embodiments, the processing unit (1004) is further configured to, after the first application is granted (e.g., via authorizing unit 1008) access to the authorization of the electronic device with the primary content provider, launch (e.g. via launching unit 1010) the first application on the electronic device. In some embodiments, in response to launching (e.g., via launching unit 1010) the first application, provide (e.g., via content enabling unit 1014) content, from the first secondary content provider associated with the first application, in the first application, without requiring the user to separately authorize (e.g. via authorizing unit 1008) the first application with the primary content provider.

In some embodiments, after authorizing the electronic device with the primary content provider, the settings user interface includes (e.g., via display enabling unit 1006) a link for downloading (e.g., via downloading unit 1016) an application associated with the primary content provider, wherein the settings user interface did not include the link before the electronic device was authorized (e.g., via authorizing unit 1008) with the primary content provider.

In some embodiments, the receiving unit (1002) is further configured to, after authorizing (e.g., via authorizing unit 1008) the electronic device with the primary content provider, receive a sequence of one or more inputs that revokes the authorization of the electronic device with the primary content provider. In some embodiments, the processing unit (1004) is further configured to, in response to the sequence of one or more inputs revoke (e.g., via authorizing unit 1008) the authorization with the primary content provider and prevent (e.g., via content enabling unit 1012) access to content from the secondary content providers that were authorized via the primary content provider.

In some embodiments, the receiving unit (1002) is further configured to, while the authorization of the electronic device with the primary content provider is revoked (e.g. with authorizing unit 1008), receive a sequence of one or more inputs that authorizes the electronic device with a second primary content provider based on a user subscription to the second primary content provider, the second primary content provider having access (e.g., with content enabling unit 1012) to content from a second plurality of secondary content providers, different from the plurality of secondary content providers, that is accessible on the electronic device via a second plurality of applications associated with the second plurality of secondary content providers. In some embodiments, the processing unit (1004) is further configured to, after authorizing (e.g., with authorizing unit 1008) the electronic device with the second primary content provider, display (e.g., with display enabling unit 1006), on the display, a second settings user interface of the electronic device, different from the settings user interface, from which access to the authorization of the electronic device with the second primary content provider can be granted or denied to one or more applications on the electronic device. In some embodiments, the receiving unit (1002) is further configured to, while displaying (e.g., with display enabling unit 1006) the second settings user interface, receive a sequence of one or more inputs that grant (e.g., via authorizing unit 1008) access to the authorization of the electronic device with the second primary content provider to a respective application of the second plurality of applications associated with a respective secondary content provider of the second plurality of secondary content providers, wherein the second settings user interface is not a user interface of the respective application of the second plurality of applications.

In some embodiments, authorizing (e.g., with authorizing unit 1008) the electronic device with the primary content provider occurs from a user interface of an operating system of the electronic device. In some embodiments, the sequence of one or more inputs that authorizes (e.g., via authorizing unit 1008) the electronic device with the primary content provider includes an input selecting the primary content provider from a list of primary content providers that support authorization with the electronic device. In some embodiments, authorizing (e.g., via authorizing unit 1008) the electronic device with the primary content provider occurs from a user interface of an operating system of the electronic device. In some embodiments, the sequence of one or more inputs that authorizes (e.g., via authorizing unit 1008) the electronic device with the primary content provider includes an input selecting the primary content provider from a list of primary content providers. In some embodiments, the processing unit (1004) is further configured to, in accordance with a determination that the primary content provider selected from the list of primary content providers does not support authorization with the electronic device to which applications on the electronic device can be granted (e.g., with authorizing unit 1008) access, display (e.g., with display enabling unit 1006) a link to instructions from the selected primary content provider as to how to authorize the applications on the electronic device to access content from their corresponding secondary content providers.

In some embodiments, authorizing (e.g., with authorizing unit 1008) the electronic device with the primary content provider occurs from a user interface of one of the plurality of applications associated with the secondary content providers. In some embodiments, the sequence of one or more inputs that authorizes (e.g., with authorizing unit 1008) the electronic device with the primary content provider includes an input selecting the primary content provider from a list of primary content providers that support authorization with the electronic device.

In some embodiments, the processing unit (1004) is further configured to, after authorizing (e.g., via authorizing unit 1008) the electronic device with the primary content provider, download (e.g., via downloading unit 1016) a second application of the plurality of applications associated with a second secondary content provider. In some embodiments, the electronic device (1000) launches (e.g., with launching unit 1010) the second application, wherein the second application has not been granted (e.g., with authorizing unit 1008) access to the authorization of the electronic device from the settings user interface. In some embodiments, in response to launching (e.g., with launching unit 1010) the second application, display (e.g., with display enabling unit 1006), on the display, an authorization access user interface for granting or denying (e.g., with authorizing unit 1008) the second application access to the authorization of the electronic device with the primary content provider. In some embodiments, the receiving unit (1002) is further configured to, while displaying (e.g., with display enabling unit 1006) the authorization access user interface, receive an input. In some embodiments, the processing unit (1004) is further configured to, in response to receiving (e.g., with receiving unit 1002) the input, in accordance with a determination that the input grants (e.g., with authorizing unit 1008) the second application access to the authorization of the electronic device with the primary content provider, provide (e.g., with content enabling unit 1012) content, from the second secondary content provider, in the second application.

In some embodiments, the processing unit (1004) is further configured to, after authorizing (e.g., with authorizing unit 1008) the electronic device with the primary content provider, download (e.g., with downloading unit 1016) a second application of the plurality of applications associated with a second secondary content provider and launch (e.g., with launching unit 1014) the second application. In some embodiments, in response to launching (e.g., with launching unit 1010) the second application, provide (e.g., with content enabling unit 1012) content, from the second secondary content provider associated with the second application, in the second application, without requiring the user to grant (e.g., with authorizing unit 1008) the second application access to the authorization of the electronic device with the primary content provider.

In some embodiments, the processing unit (1004) is further configured to, after authorizing (e.g., with authorizing unit 1008) the electronic device with the primary content provider, launch (e.g., with launching unit 1010) a second application associated with a second secondary content provider of the plurality of secondary content providers, wherein the second application has not been granted access to the authorization of the electronic device. In some embodiments, in response to launching (e.g., with launching unit 1010) the second application, in accordance with a determination that the second application supports being granted (e.g., with authorizing unit 1008) access to the authorization of the electronic device with the primary content provider, the electronic device (1000) displays (e.g., with display enabling unit 1006), on the display, an authorization access user interface for granting or denying the second application access to the authorization of the electronic device with the primary content provider. In some embodiments, in accordance with a determination that the second application does not support being granted (e.g., with authorizing unit 1008) access to the authorization of the electronic device with the primary content provider, the electronic device requires the user to separately authorize, from the second application, the second application with the primary content provider before providing (e.g., with content enabling unit 1012) content, from the second secondary content provider, in the second application.

In some embodiments, the processing unit (1004) is further configured to, while the electronic device is not authorized (e.g., with authorizing unit 1008) with the primary content provider, launch (e.g., with launching unit 1010) a respective application associated with a respective secondary content provider that is not yet authorized with a primary content provider. In some embodiments, in response to launching (e.g., with launching unit 1010) the respective application, display (e.g., with display enabling unit) an authorization user interface for authorizing (e.g., with authorizing unit 1008) the respective application with a respective primary content provider. In some embodiments, the receiving unit (1002) is further configured to receive input authorizing (e.g., with authorizing unit 1008) the respective application with the respective primary content provider. In some embodiments, the processing unit (1004) is further configured to, in response to receiving (e.g., with receiving unit 1002) the input authorizing (e.g., with authorizing unit 1008) the respective application with the respective primary content provide, in accordance with a determination that the respective primary content provider supports granting a plurality of applications access to an authorization of the electronic device with the respective primary content provider, authorize the respective application with the respective primary content provider, including authorizing the electronic device with the respective primary content provider, wherein applications other than the respective application can be granted access to the authorization of the electronic device with the respective primary content provider. In some embodiments, in accordance with a determination that the respective primary content provider does not support granting (e.g., with authorizing unit 1008) a plurality of applications access to the authorization of the electronic device with the respective primary content provider, the electronic device (1000) authorizes the respective application with the respective primary content provider without authorizing the electronic device with the respective primary content provider.

Figure 11:
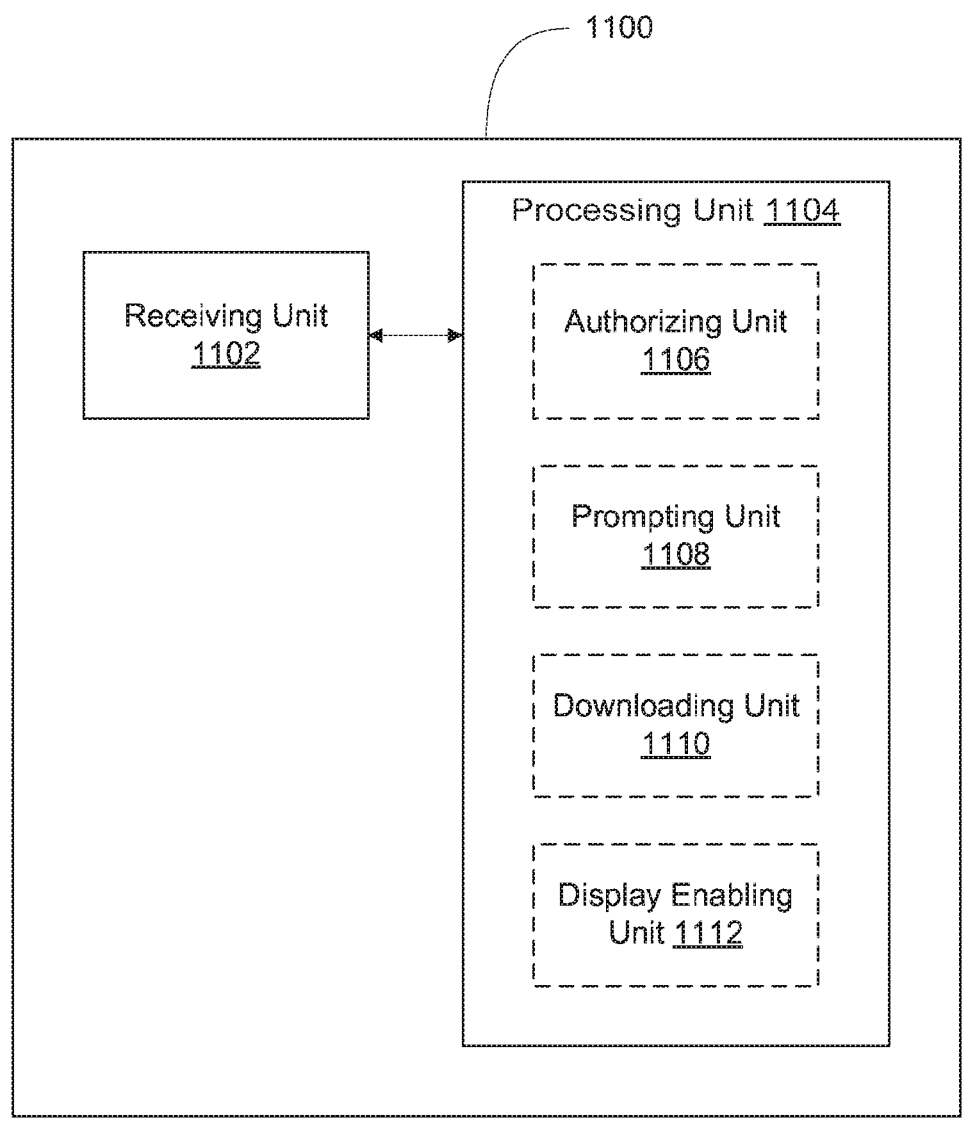

In accordance with some embodiments, FIG. 11 shows a functional block diagram of an electronic device 1100 (e.g., device 100 in FIG. 1A, 300 in FIG. 3 and/or 500 in FIG. 5A) configured in accordance with the principles of the various described embodiments. The functional blocks of the device are, optionally, implemented by hardware, software, or a combination of hardware and software, to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 optionally includes a receiving unit 1102 configured to receive inputs, and a processing unit 1104 coupled to the receiving unit 1102. In some embodiments, the processing unit 1104 includes an authorizing unit 1106, a prompting unit 1108, a downloading unit 1110 and a display enabling unit 1112.

In some embodiments, the receiving unit (1102) is configured to receive a sequence of one or more inputs to authorize (e.g., with authorizing unit 1106) a user to access first content from multiple sources via a single account. In some embodiments, the processing unit (1104) is configured to, in response to receiving the sequence of one or more inputs, authorize (e.g., with authorizing unit 1106) the user to access the first content via one or more applications installed on the electronic device. In some embodiments, the electronic device (1100) prompts (e.g., with prompting unit 1108) the user to download (e.g., with downloading unit 1110) additional applications that have access to the first content, wherein the additional applications are not downloaded on the electronic device.

In some embodiments, in accordance with a determination that the sequence of one or more inputs to authorize (e.g., with authorizing unit 1106) the user to access the first content from the multiple sources via the single account was received (e.g., with receiving unit 1102) from within an application for accessing the first content on the electronic device, the electronic device (1100) prompts (e.g., with prompting unit 1108) the user to download (e.g., with downloading unit 1110) the additional applications includes displaying, in the application, a prompt to download the additional applications.

In some embodiments, prompting (e.g., with prompting unit 1108) the user to download the additional applications includes displaying (e.g., with display enabling unit 1112), in a settings user interface of an operating system of the electronic device, a prompt to download (e.g., with downloading unit 1110) the additional applications. In some embodiments, prompting (e.g., with prompting unit 1108) the user to download (e.g., with downloading unit 1110) the additional applications includes displaying (e.g., with display enabling unit 1112), in a settings user interface of an operating system of the electronic device, a plurality of selectable user interface elements, each selectable user interface element corresponding to a respective one of the additional applications, and each selectable user interface element selectable to download the corresponding respective additional application.

In some embodiments, prompting (e.g., with prompting unit 1108) the user to download the additional applications includes displaying (e.g., with display enabling unit 1112), in an application store user interface of the electronic device from which a plurality of applications can be downloaded (e.g., with downloading unit 1110) to the electronic device, a selectable user interface element that corresponds to a respective primary content provider associated with the single account and is selectable to initiate a process to download the additional applications. In some embodiments, in accordance with a determination that the single account is with a first primary content provider, the selectable user interface element corresponds to the first primary content provider. In some embodiments, in accordance with a determination that the single account is with a second primary content provider, the selectable user interface element corresponds to the second primary content provider.

In some embodiments, the receiving unit (1102) is further configured to receive input for downloading (e.g., with downloading unit 1110) one or more of the additional applications. In some embodiments, the processing unit (1104) is further configured to, in response to receiving (e.g., with receiving unit 1102) the input for downloading (e.g., with downloading unit 1110) the one or more of the additional applications, download the one or more of the additional applications, without downloading others of the additional applications.

In some embodiments, the receiving unit (1102) is further configured to, after authorizing (e.g., with authorizing unit 1106) the user to access the first content via the one or more applications installed on the electronic device, receive an input corresponding to a request to search the first content for content having a user-specified characteristic. In some embodiments, the processing unit (1104) is further configured to, in response to receiving (e.g., with receiving unit 1102) the input corresponding to the request to search the first content for content having the user-specified characteristic, provide (e.g., with authorizing unit 1106) access to a first subset of the first content, having the user-specified characteristic, accessible from the one or more applications installed on the electronic device.

In some embodiments, the processing unit (1104) is further configured to display (e.g., with display enabling unit 1112), on a display, an application store user interface of the electronic device from which a plurality of applications can be downloaded (e.g., with downloading unit 1110) to the electronic device. In some embodiments, in accordance with a determination that the user has been authorized (e.g., with authorizing unit 1106) to access the first content from multiple sources via the single account with a primary content provider, the application store user interface includes (e.g., with display enabling unit 1112) a first link selectable to initiate a process to display a user interface in the application store that is specific to the primary content provider, the user interface that is specific to the primary content provider including one or more links to download (e.g., with downloading unit 1110) the additional applications that are not downloaded on the electronic device.

In some embodiments, the processing unit (1104) is further configured to, after authorizing (e.g., with authorizing unit 1106) the user to access the first content via the one or more applications installed on the electronic device, display (e.g., with display enabling unit 1112), on a display, a settings user interface of an operating system of the electronic device, the settings user interface including a selectable link for directly accessing the user interface in the application store that is specific to the primary content provider.

The operations described above with reference to FIGS. 7A-7L and 9A-9C are, optionally, implemented by components depicted in FIGS. 1A-1B, FIG. 10 or FIG. 11. For example, receiving operations 702, 706 and 902, authorizing operation 906, displaying operation 704 and prompting operation 908 are, optionally, implemented by event sorter 170, event recognizer 180, and event handler 190. Event monitor 171 in event sorter 170 detects a contact on a touch-sensitive surface or touch screen, and event dispatcher module 174 delivers the event information to application 136-1. A respective event recognizer 180 of application 136-1 compares the event information to respective event definitions 186, and determines whether a first contact at a first location on the touch-sensitive surface or touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B, FIG. 10 or FIG. 11.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device that is in communication with a display and one or more input devices:
receiving, via the one or more input devices, a sequence of one or more inputs that authorizes the electronic device with a primary content provider based on a user subscription to the primary content provider, the primary content provider having access to content from a plurality of secondary content providers that is accessible on the electronic device via a plurality of applications associated with the secondary content providers, wherein the plurality of applications are installed on the electronic device;
after authorizing the electronic device with the primary content provider, displaying, on the display, a settings user interface of the electronic device from which access to the authorization of the electronic device with the primary content provider can be granted or denied to one or more applications on the electronic device; and
while displaying the settings user interface, receiving, via the one or more input devices, a sequence of one or more inputs that grant access to the authorization of the electronic device to a first application of the plurality of applications associated with a first secondary content provider, wherein the settings user interface is not a user interface of the first application, and granting the access to the authorization of the electronic device, with the primary content provider, to the first application authorizes the first application to provide content, on the electronic device, from the first secondary content provider.

2. The method of claim 1, further comprising:
after authorizing the electronic device with the primary content provider, launching a second application associated with a second secondary content provider of the plurality of secondary content providers, wherein the second application has not been granted access to the authorization of the electronic device; and
in response to launching the second application, displaying, on the display, an authorization access user interface for granting or denying the second application access to the authorization of the electronic device with the primary content provider;

while displaying the authorization access user interface, receiving an input; and in response to receiving the input, in accordance with a determination that the input grants the second application access to the authorization of the electronic device with the primary content provider, providing content, from the second secondary content provider, in the second application.

3. The method of claim 2, further comprising:
in accordance with the determination that the input grants the second application access to the authorization of the electronic device with the primary content provider, updating the settings user interface to reflect that the second application has access to the authorization of the electronic device with the primary content provider.

4. The method of claim 2, further comprising:
in accordance with a determination that the input denies the second application access to the authorization of the electronic device with the primary content provider, requiring the user to separately authorize, from the second application, the second application with the primary content provider before providing content, from the second secondary content provider, in the second application,
wherein after the user separately authorizes the second application with the primary content provider, the settings user interface indicates that the second application does not have access to the authorization of the electronic device with the primary content provider.

5. The method of claim 1, further comprising:
while displaying the settings user interface, receiving, via the one or more input devices, a sequence of one or more inputs that deny access to the authorization of the electronic device to a second application of the plurality of applications associated with a second secondary content provider.

6. The method of claim 1, wherein the settings user interface includes a plurality of selectable user interface elements corresponding to the plurality of applications via which the content from the plurality of secondary content providers is accessible, from which the access to the authorization of the electronic device with the primary content provider is granted or denied in response to selection of respective ones of the plurality of user interface elements.

7. The method of claim 1, wherein:
the plurality of applications associated with the secondary content providers includes a first set of applications associated with a first set of secondary content providers to which the user subscription with the primary content provider permits access, and a second set of applications associated with a second set of secondary content providers to which the user subscription with the primary content provider does not permit access, and
the settings user interface allows granting or denying access to the authorization of the electronic device with the primary content provider to applications, on the electronic device, in the first set of applications and the second set of applications.

8. The method of claim 1, wherein:
the plurality of applications associated with the secondary content providers includes a first set of applications associated with a first set of secondary content providers to which the user subscription with the primary content provider permits access, and a second set of applications associated with a second set of secondary content providers to which the user subscription with the primary content provider does not permit access, and
the settings user interface allows granting or denying access to the authorization of the electronic device with the primary content provider to applications, on the electronic device, in the first set of applications, but not to applications in the second set of applications.

9. The method of claim 1, further comprising:
after the first application is granted access to the authorization of the electronic device with the primary content provider, launching the first application on the electronic device; and
in response to launching the first application, providing content, from the first secondary content provider associated with the first application, in the first application, without requiring the user to separately authorize the first application with the primary content provider.

10. The method of claim 1, wherein:
after authorizing the electronic device with the primary content provider, the settings user interface includes a link for downloading an application associated with the primary content provider, wherein the settings user interface did not include the link before the electronic device was authorized with the primary content provider.

11. The method of claim 1, further comprising:
after authorizing the electronic device with the primary content provider, receiving, via the one or more input devices, a sequence of one or more inputs that revokes the authorization of the electronic device with the primary content provider; and
in response to the sequence of one or more inputs:
revoking the authorization with the primary content provider; and
preventing access to content from the secondary content providers that were authorized via the primary content provider.

12. The method of claim 11, further comprising:
while the authorization of the electronic device with the primary content provider is revoked, receiving, via the one or more input devices, a sequence of one or more inputs that authorizes the electronic device with a second primary content provider based on a user subscription to the second primary content provider, the second primary content provider having access to content from a second plurality of secondary content providers, different from the plurality of secondary content providers, that is accessible on the electronic device via a second plurality of applications associated with the second plurality of secondary content providers;
after authorizing the electronic device with the second primary content provider, displaying, on the display, a second settings user interface of the electronic device, different from the settings user interface, from which access to the authorization of the electronic device with the second primary content provider can be granted or denied to one or more applications on the electronic device; and
while displaying the second settings user interface, receiving, via the one or more input devices, a sequence of one or more inputs that grant access to the authorization of the electronic device with the second primary content provider to a respective application of the second plurality of applications associated with a respective secondary content provider of the second plurality of secondary content providers, wherein the second settings user interface is not a user interface of the respective application of the second plurality of applications.

13. The method of claim 1, wherein:
authorizing the electronic device with the primary content provider occurs from a user interface of an operating system of the electronic device, and
the sequence of one or more inputs that authorizes the electronic device with the primary content provider includes an input selecting the primary content provider from a list of primary content providers that support authorization with the electronic device.

14. The method of claim 1, wherein:
authorizing the electronic device with the primary content provider occurs from a user interface of an operating system of the electronic device,
the sequence of one or more inputs that authorizes the electronic device with the primary content provider includes an input selecting the primary content provider from a list of primary content providers, and
the method further comprises:
in accordance with a determination that the primary content provider selected from the list of primary content providers does not support authorization with the electronic device to which applications on the electronic device can be granted access, displaying a link to instructions from the selected primary content provider as to how to authorize the applications on the electronic device to access content from their corresponding secondary content providers.

15. The method of claim 1, wherein:
authorizing the electronic device with the primary content provider occurs from a user interface of one of the plurality of applications associated with the secondary content providers, and
the sequence of one or more inputs that authorizes the electronic device with the primary content provider includes an input selecting the primary content provider from a list of primary content providers that support authorization with the electronic device.

16. The method of claim 1, further comprising:
after authorizing the electronic device with the primary content provider, downloading a second application of the plurality of applications associated with a second secondary content provider;
launching the second application, wherein the second application has not been granted access to the authorization of the electronic device from the settings user interface; and
in response to launching the second application, displaying, on the display, an authorization access user interface for granting or denying the second application access to the authorization of the electronic device with the primary content provider;
while displaying the authorization access user interface, receiving an input; and
in response to receiving the input, in accordance with a determination that the input grants the second application access to the authorization of the electronic device with the primary content provider, providing content, from the second secondary content provider, in the second application.

17. The method of claim 1, further comprising:
after authorizing the electronic device with the primary content provider, downloading a second application of the plurality of applications associated with a second secondary content provider; and
launching the second application; and
in response to launching the second application, providing content, from the second secondary content provider associated with the second application, in the second application, without requiring the user to grant the second application access to the authorization of the electronic device with the primary content provider.

18. The method of claim 1, further comprising:
after authorizing the electronic device with the primary content provider, launching a second application associated with a second secondary content provider of the plurality of secondary content providers, wherein the second application has not been granted access to the authorization of the electronic device; and
in response to launching the second application:
in accordance with a determination that the second application supports being granted access to the authorization of the electronic device with the primary content provider:
displaying, on the display, an authorization access user interface for granting or denying the second application access to the authorization of the electronic device with the primary content provider; and
in accordance with a determination that the second application does not support being granted access to the authorization of the electronic device with the primary content provider:
requiring the user to separately authorize, from the second application, the second application with the primary content provider before providing content, from the second secondary content provider, in the second application.

19. The method of claim 1, further comprising:
while the electronic device is not authorized with the primary content provider, launching a respective application associated with a respective secondary content provider that is not yet authorized with a primary content provider;
in response to launching the respective application, displaying an authorization user interface for authorizing the respective application with a respective primary content provider;
receiving, via the one or more input devices, input authorizing the respective application with the respective primary content provider; and
in response to receiving the input authorizing the respective application with the respective primary content provider:
in accordance with a determination that the respective primary content provider supports granting a plurality of applications access to an authorization of the electronic device with the respective primary content provider, authorizing the respective application with the respective primary content provider, including authorizing the electronic device with the respective primary content provider, wherein applications other than the respective application can be granted access to the authorization of the electronic device with the respective primary content provider; and
in accordance with a determination that the respective primary content provider does not support granting a plurality of applications access to the authorization of the electronic device with the respective primary content provider, authorizing the respective application with the respective primary content provider without authorizing the electronic device with the respective primary content provider.

20. An electronic device, comprising:
one or more processors in communication with a display and one or more input devices;
memory; and
one or more programs, wherein the one or more programs are stored in the memory and configured to be executed by the one or more processors, the one or more programs including instructions for:
receiving, via the one or more input devices, a sequence of one or more inputs that authorizes the electronic device with a primary content provider based on a user subscription to the primary content provider, the primary content provider having access to content from a plurality of secondary content providers that is accessible on the electronic device via a plurality of applications associated with the secondary content providers, wherein the plurality of applications are installed on the electronic device;
after authorizing the electronic device with the primary content provider, displaying, on the display, a settings user interface of the electronic device from which access to the authorization of the electronic device with the primary content provider can be granted or denied to one or more applications on the electronic device; and
while displaying the settings user interface, receiving, via the one or more input devices, a sequence of one or more inputs that grant access to the authorization of the electronic device to a first application of the plurality of applications associated with a first secondary content provider, wherein the settings user interface is not a user interface of the first application, and granting the access to the authorization of the electronic device, with the primary content provider, to the first application authorizes the first application to provide content, on the electronic device, from the first secondary content provider.

21. The electronic device of claim 20, wherein the one or more programs include further instructions for:
after authorizing the electronic device with the primary content provider, launching a second application associated with a second secondary content provider of the plurality of secondary content providers, wherein the second application has not been granted access to the authorization of the electronic device; and
in response to launching the second application, displaying, on the display, an authorization access user interface for granting or denying the second application access to the authorization of the electronic device with the primary content provider;
while displaying the authorization access user interface, receiving an input; and
in response to receiving the input, in accordance with a determination that the input grants the second application access to the authorization of the electronic device with the primary content provider, providing content, from the second secondary content provider, in the second application.

22. The electronic device of claim 21, wherein the one or more programs include further instructions for:
in accordance with the determination that the input grants the second application access to the authorization of the electronic device with the primary content provider, updating the settings user interface to reflect that the second application has access to the authorization of the electronic device with the primary content provider.

23. The electronic device of claim 21, wherein the one or more programs include further instructions for:
in accordance with a determination that the input denies the second application access to the authorization of the electronic device with the primary content provider, requiring the user to separately authorize, from the second application, the second application with the primary content provider before providing content, from the second secondary content provider, in the second application,
wherein after the user separately authorizes the second application with the primary content provider, the settings user interface indicates that the second application does not have access to the authorization of the electronic device with the primary content provider.

24. The electronic device of claim 20, wherein the one or more programs include further instructions for:
while displaying the settings user interface, receiving, via the one or more input devices, a sequence of one or more inputs that deny access to the authorization of the electronic device to a second application of the plurality of applications associated with a second secondary content provider.

25. The electronic device of claim 20, wherein:
the plurality of applications associated with the secondary content providers includes a first set of applications associated with a first set of secondary content providers to which the user subscription with the primary content provider permits access, and a second set of applications associated with a second set of secondary content providers to which the user subscription with the primary content provider does not permit access, and
the settings user interface allows granting or denying access to the authorization of the electronic device with the primary content provider to applications, on the electronic device, in the first set of applications and the second set of applications.

26. The electronic device of claim 20, wherein:
the plurality of applications associated with the secondary content providers includes a first set of applications associated with a first set of secondary content providers to which the user subscription with the primary content provider permits access, and a second set of applications associated with a second set of secondary content providers to which the user subscription with the primary content provider does not permit access, and
the settings user interface allows granting or denying access to the authorization of the electronic device with the primary content provider to applications, on the electronic device, in the first set of applications, but not to applications in the second set of applications.

27. The electronic device of claim 20, wherein the one or more programs include further instructions for:
after the first application is granted access to the authorization of the electronic device with the primary content provider, launching the first application on the electronic device; and
in response to launching the first application, providing content, from the first secondary content provider associated with the first application, in the first application, without requiring the user to separately authorize the first application with the primary content provider.

28. The electronic device of claim 20, wherein:
authorizing the electronic device with the primary content provider occurs from a user interface of an operating system of the electronic device, and
the sequence of one or more inputs that authorizes the electronic device with the primary content provider includes an input selecting the primary content provider from a list of primary content providers that support authorization with the electronic device.

29. The electronic device of claim 20, wherein:
authorizing the electronic device with the primary content provider occurs from a user interface of an operating system of the electronic device,
the sequence of one or more inputs that authorizes the electronic device with the primary content provider includes an input selecting the primary content provider from a list of primary content providers, and
the method further comprises:
in accordance with a determination that the primary content provider selected from the list of primary content providers does not support authorization with the electronic device to which applications on the electronic device can be granted access, displaying a link to instructions from the selected primary content provider as to how to authorize the applications on the electronic device to access content from their corresponding secondary content providers.

30. The electronic device of claim 20, wherein:
authorizing the electronic device with the primary content provider occurs from a user interface of one of the plurality of applications associated with the secondary content providers, and
the sequence of one or more inputs that authorizes the electronic device with the primary content provider includes an input selecting the primary content provider from a list of primary content providers that support authorization with the electronic device.

31. The electronic device of claim 20, wherein the one or more programs include further instructions for:
after authorizing the electronic device with the primary content provider, downloading a second application of the plurality of applications associated with a second secondary content provider;
launching the second application, wherein the second application has not been granted access to the authorization of the electronic device from the settings user interface; and
in response to launching the second application, displaying, on the display, an authorization access user interface for granting or denying the second application access to the authorization of the electronic device with the primary content provider;
while displaying the authorization access user interface, receiving an input; and
in response to receiving the input, in accordance with a determination that the input grants the second application access to the authorization of the electronic device with the primary content provider, providing content, from the second secondary content provider, in the second application.

32. The electronic device of claim 20, wherein the one or more programs include further instructions for:
after authorizing the electronic device with the primary content provider, downloading a second application of the plurality of applications associated with a second secondary content provider;
launching the second application; and
in response to launching the second application, providing content, from the second secondary content provider associated with the second application, in the second application, without requiring the user to grant the second application access to the authorization of the electronic device with the primary content provider.

33. The electronic device of claim 20, wherein the one or more programs include further instructions for:
after authorizing the electronic device with the primary content provider, launching a second application associated with a second secondary content provider of the plurality of secondary content providers, wherein the second application has not been granted access to the authorization of the electronic device; and
in response to launching the second application:
in accordance with a determination that the second application supports being granted access to the authorization of the electronic device with the primary content provider:
displaying, on the display, an authorization access user interface for granting or denying the second application access to the authorization of the electronic device with the primary content provider; and
in accordance with a determination that the second application does not support being granted access to the authorization of the electronic device with the primary content provider:
requiring the user to separately authorize, from the second application, the second application with the primary content provider before providing content, from the second secondary content provider, in the second application.

34. The electronic device of claim 20, wherein the one or more programs include further instructions for:
while the electronic device is not authorized with the primary content provider, launching a respective application associated with a respective secondary content provider that is not yet authorized with a primary content provider;
in response to launching the respective application, displaying an authorization user interface for authorizing the respective application with a respective primary content provider;
receiving, via the one or more input devices, input authorizing the respective application with the respective primary content provider; and
in response to receiving the input authorizing the respective application with the respective primary content provider:
in accordance with a determination that the respective primary content provider supports granting a plurality of applications access to an authorization of the electronic device with the respective primary content provider, authorizing the respective application with the respective primary content provider, including authorizing the electronic device with the respective primary content provider, wherein applications other than the respective application can be granted access to the authorization of the electronic device with the respective primary content provider; and
in accordance with a determination that the respective primary content provider does not support granting a plurality of applications access to the authorization of the electronic device with the respective primary content provider, authorizing the respective application with the respective primary content provider without authorizing the electronic device with the respective primary content provider.

35. A non-transitory computer readable storage medium storing one or more programs, the one or more programs comprising instructions, which when executed by one or more processors of an electronic device in communication with a display device and one or more input devices, cause the electronic device to:
- receive, via the one or more input devices, a sequence of one or more inputs that authorizes the electronic device with a primary content provider based on a user subscription to the primary content provider, the primary content provider having access to content from a plurality of secondary content providers that is accessible on the electronic device via a plurality of applications associated with the secondary content providers, wherein the plurality of applications are installed on the electronic device;
- after authorizing the electronic device with the primary content provider, display, on the display, a settings user interface of the electronic device from which access to the authorization of the electronic device with the primary content provider can be granted or denied to one or more applications on the electronic device; and
- while displaying the settings user interface, receive, via the one or more input devices, a sequence of one or more inputs that grant access to the authorization of the electronic device to a first application of the plurality of applications associated with a first secondary content provider, wherein the settings user interface is not a user interface of the first application, and granting the access to the authorization of the electronic device, with the primary content provider, to the first application authorizes the first application to provide content, on the electronic device, from the first secondary content provider.

36. The non-transitory computer readable storage medium of claim 35, wherein the one or more programs include further instructions that cause the electronic device to:
- after authorizing the electronic device with the primary content provider, launch a second application associated with a second secondary content provider of the plurality of secondary content providers, wherein the second application has not been granted access to the authorization of the electronic device; and
- in response to launching the second application, display, on the display, an authorization access user interface for granting or denying the second application access to the authorization of the electronic device with the primary content provider;
- while displaying the authorization access user interface, receive an input; and
- in response to receiving the input, in accordance with a determination that the input grants the second application access to the authorization of the electronic device with the primary content provider, provide content, from the second secondary content provider, in the second application.

37. The non-transitory computer readable storage medium of claim 36, wherein the one or more programs include further instructions that cause the electronic device to:
- in accordance with the determination that the input grants the second application access to the authorization of the electronic device with the primary content provider, update the settings user interface to reflect that the second application has access to the authorization of the electronic device with the primary content provider.

38. The non-transitory computer readable storage medium of claim 36, wherein the one or more programs include further instructions that cause the electronic device to:
- in accordance with a determination that the input denies the second application access to the authorization of the electronic device with the primary content provider, require the user to separately authorize, from the second application, the second application with the primary content provider before providing content, from the second secondary content provider, in the second application,
- wherein after the user separately authorizes the second application with the primary content provider, the settings user interface indicates that the second application does not have access to the authorization of the electronic device with the primary content provider.

39. The non-transitory computer readable storage medium of claim 35, wherein the one or more programs include further instructions that cause the electronic device to:
- while displaying the settings user interface, receive, via the one or more input devices, a sequence of one or more inputs that deny access to the authorization of the electronic device to a second application of the plurality of applications associated with a second secondary content provider.

40. The non-transitory computer readable storage medium of claim 35, wherein:
- the plurality of applications associated with the secondary content providers includes a first set of applications associated with a first set of secondary content providers to which the user subscription with the primary content provider permits access, and a second set of applications associated with a second set of secondary content providers to which the user subscription with the primary content provider does not permit access, and
- the settings user interface allows granting or denying access to the authorization of the electronic device with the primary content provider to applications, on the electronic device, in the first set of applications and the second set of applications.

41. The non-transitory computer readable storage medium of claim 35, wherein:
- the plurality of applications associated with the secondary content providers includes a first set of applications associated with a first set of secondary content providers to which the user subscription with the primary content provider permits access, and a second set of applications associated with a second set of secondary content providers to which the user subscription with the primary content provider does not permit access, and
- the settings user interface allows granting or denying access to the authorization of the electronic device with the primary content provider to applications, on the electronic device, in the first set of applications, but not to applications in the second set of applications.

42. The non-transitory computer readable storage medium of claim 35, wherein the one or more programs include further instructions that cause the electronic device to:
- after the first application is granted access to the authorization of the electronic device with the primary content provider, launch the first application on the electronic device; and in response to launching the first application, provide content, from the first secondary content provider associated with the first application, in the first application, without requiring the user to separately authorize the first application with the primary content provider.

43. The non-transitory computer readable storage medium of claim 35, wherein:
authorizing the electronic device with the primary content provider occurs from a user interface of an operating system of the electronic device, and
the sequence of one or more inputs that authorizes the electronic device with the primary content provider includes an input selecting the primary content provider from a list of primary content providers that support authorization with the electronic device.

44. The non-transitory computer readable storage medium of claim 35, wherein:
authorizing the electronic device with the primary content provider occurs from a user interface of an operating system of the electronic device,
the sequence of one or more inputs that authorizes the electronic device with the primary content provider includes an input selecting the primary content provider from a list of primary content providers, and
the method further comprises:
in accordance with a determination that the primary content provider selected from the list of primary content providers does not support authorization with the electronic device to which applications on the electronic device can be granted access, displaying a link to instructions from the selected primary content provider as to how to authorize the applications on the electronic device to access content from their corresponding secondary content providers.

45. The non-transitory computer readable storage medium of claim 35, wherein:
authorizing the electronic device with the primary content provider occurs from a user interface of one of the plurality of applications associated with the secondary content providers, and
the sequence of one or more inputs that authorizes the electronic device with the primary content provider includes an input selecting the primary content provider from a list of primary content providers that support authorization with the electronic device.

46. The non-transitory computer readable storage medium of claim 35, wherein the one or more programs include further instructions that cause the electronic device to:
after authorizing the electronic device with the primary content provider, download a second application of the plurality of applications associated with a second secondary content provider;
launch the second application, wherein the second application has not been granted access to the authorization of the electronic device from the settings user interface; and
in response to launching the second application, display, on the display, an authorization access user interface for granting or denying the second application access to the authorization of the electronic device with the primary content provider;
while displaying the authorization access user interface, receive an input; and
in response to receiving the input, in accordance with a determination that the input grants the second application access to the authorization of the electronic device with the primary content provider, provide content, from the second secondary content provider, in the second application.

47. The non-transitory computer readable storage medium of claim 35, wherein the one or more programs include further instructions that cause the electronic device to:
after authorizing the electronic device with the primary content provider, download a second application of the plurality of applications associated with a second secondary content provider;
launch the second application; and
in response to launching the second application, provide content, from the second secondary content provider associated with the second application, in the second application, without requiring the user to grant the second application access to the authorization of the electronic device with the primary content provider.

48. The non-transitory computer readable storage medium of claim 35, wherein the one or more programs include further instructions that cause the electronic device to:
after authorizing the electronic device with the primary content provider, launch a second application associated with a second secondary content provider of the plurality of secondary content providers, wherein the second application has not been granted access to the authorization of the electronic device; and
in response to launching the second application:
in accordance with a determination that the second application supports being granted access to the authorization of the electronic device with the primary content provider:
display, on the display, an authorization access user interface for granting or denying the second application access to the authorization of the electronic device with the primary content provider; and
in accordance with a determination that the second application does not support being granted access to the authorization of the electronic device with the primary content provider:
require the user to separately authorize, from the second application, the second application with the primary content provider before providing content, from the second secondary content provider, in the second application.

49. The non-transitory computer readable storage medium of claim 35, wherein the one or more programs include further instructions that cause the electronic device to:
while the electronic device is not authorized with the primary content provider, launch a respective application associated with a respective secondary content provider that is not yet authorized with a primary content provider;
in response to launching the respective application, display an authorization user interface for authorizing the respective application with a respective primary content provider;
receive, via the one or more input devices, input authorizing the respective application with the respective primary content provider; and
in response to receiving the input authorizing the respective application with the respective primary content provider:
in accordance with a determination that the respective primary content provider supports granting a plurality of applications access to an authorization of the electronic device with the respective primary content provider, authorize the respective application with the respective primary content provider, including authorizing the electronic device with the respective primary content provider, wherein applications other than the respective application can be granted access to the authorization of the electronic device with the respective primary content provider; and in accordance with a determination that the respective primary content provider does not support granting a plurality of applications access to the authorization of the electronic device with the respective primary content provider, authorize the respective application with the respective primary content provider without authorizing the electronic device with the respective primary content provider.

* * * * *